United States Patent
Huo et al.

(10) Patent No.: US 12,416,088 B2
(45) Date of Patent: *Sep. 16, 2025

(54) MEMBRANE ELECTRODE ASSEMBLY FOR COx REDUCTION

(71) Applicant: Twelve Benefit Corporation, Berkeley, CA (US)

(72) Inventors: Ziyang Huo, Moraga, CA (US); Lihui Wang, Alameda, CA (US); Kenneth X. Hua, San Jose, CA (US); Sichao Ma, Dublin, CA (US); Edward Izett, Berkeley, CA (US); Sara Hunegnaw, Oakland, CA (US); Ajay R. Kashi, Berkeley, CA (US); Etosha R. Cave, Berkeley, CA (US); Kendra P. Kuhl, Oakland, CA (US); Maxwell Goldman, Berkeley, CA (US); Angelica L. Reyes, Berkeley, CA (US); Kathryn L. Corp, Berkeley, CA (US)

(73) Assignee: Twelve Benefit Corporation, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,380

(22) Filed: Apr. 13, 2023

(65) Prior Publication Data

US 2024/0133058 A1  Apr. 25, 2024

Related U.S. Application Data

(63) Continuation of application No. 17/247,036, filed on Nov. 24, 2020, now Pat. No. 11,680,328.

(Continued)

(51) Int. Cl.
*C25B 9/23* (2021.01)
*C08F 293/00* (2006.01)
(Continued)

(52) U.S. Cl.
CPC .............. *C25B 9/23* (2021.01); *C08F 293/00* (2013.01); *C25B 1/23* (2021.01); *C25B 13/02* (2013.01); *C25B 13/08* (2013.01)

(58) Field of Classification Search
None
See application file for complete search history.

(56) References Cited

U.S. PATENT DOCUMENTS

| | | |
|---|---|---|
| 4,042,496 A | 8/1977 | Tsushima et al. |
| 4,089,758 A | 5/1978 | McAloon |

(Continued)

FOREIGN PATENT DOCUMENTS

| | | |
|---|---|---|
| CA | 1071143 A | 2/1980 |
| CA | 2960595 A1 | 3/2016 |

(Continued)

OTHER PUBLICATIONS

Hao et al, Preparation of solvent-resistant anion-exchange membranes, Desalination, vol. 129, No. 1, Jun. 2000, pp. 15-22 (Year: 2000).*

(Continued)

*Primary Examiner* — Harry D Wilkins, III
(74) *Attorney, Agent, or Firm* — Weaver Austin Villeneuve & Sampson LLP

(57) ABSTRACT

Provided herein are membrane electrode assemblies (MEAs) for $CO_x$ reduction. According to various embodiments, the MEAs are configured to address challenges particular to $CO_x$ including managing water in the MEA. Bipolar and anion-exchange membrane (AEM)-only MEAs are described along with components thereof and related methods of fabrication.

20 Claims, 13 Drawing Sheets

Related U.S. Application Data

(60) Provisional application No. 62/939,960, filed on Nov. 25, 2019.

(51) Int. Cl.
*C25B 1/23* (2021.01)
*C25B 13/02* (2006.01)
*C25B 13/08* (2006.01)

(56) References Cited

U.S. PATENT DOCUMENTS

| | | | |
|---|---|---|---|
| 4,116,889 A * | 9/1978 | Chlanda | B01J 47/12 |
| | | | 52/27 |
| 4,176,215 A | 11/1979 | Molnar et al. | |
| 4,253,900 A * | 3/1981 | Dege | C09J 5/00 |
| | | | 210/500.36 |
| 4,355,116 A * | 10/1982 | Lee | C08F 8/32 |
| | | | 521/27 |
| 4,609,440 A | 9/1986 | Frese, Jr. et al. | |
| 4,655,886 A | 4/1987 | Oda et al. | |
| 4,766,161 A * | 8/1988 | Chlanda | C08J 5/2275 |
| | | | 428/522 |
| 4,828,941 A | 5/1989 | Sterzel | |
| 4,921,586 A | 5/1990 | Molter | |
| 5,039,389 A | 8/1991 | McMichael | |
| 5,601,937 A | 2/1997 | Isenberg | |
| 5,992,008 A | 11/1999 | Kindler | |
| 6,358,651 B1 | 3/2002 | Chen et al. | |
| 7,605,293 B2 | 10/2009 | Olah et al. | |
| 7,608,356 B2 | 10/2009 | Risen, Jr. et al. | |
| 7,704,369 B2 | 4/2010 | Olah et al. | |
| 7,883,817 B2 | 2/2011 | Hori et al. | |
| 8,131,859 B2 | 3/2012 | Fujii et al. | |
| 8,137,859 B2 | 3/2012 | Shin et al. | |
| 8,268,026 B2 | 9/2012 | Norbeck et al. | |
| 8,277,631 B2 | 10/2012 | Eastman et al. | |
| 8,652,104 B2 | 2/2014 | Goral et al. | |
| 8,652,704 B2 | 2/2014 | Sano et al. | |
| 8,658,016 B2 | 2/2014 | Lakkaraju et al. | |
| 8,697,129 B2 | 4/2014 | Qian et al. | |
| 8,721,866 B2 | 5/2014 | Sivasankar et al. | |
| 8,845,875 B2 | 9/2014 | Teamey et al. | |
| 8,845,878 B2 | 9/2014 | Cole et al. | |
| 8,956,990 B2 | 2/2015 | Masel et al. | |
| 9,012,345 B2 | 4/2015 | Masel et al. | |
| 9,145,615 B2 | 9/2015 | Zhai et al. | |
| 9,181,625 B2 | 11/2015 | Masel et al. | |
| 9,193,593 B2 | 11/2015 | Masel et al. | |
| 9,370,773 B2 | 6/2016 | Masel et al. | |
| 9,464,359 B2 | 10/2016 | Masel et al. | |
| 9,481,939 B2 | 11/2016 | Masel et al. | |
| 9,486,480 B2 | 11/2016 | Ayoub et al. | |
| 9,555,367 B2 | 1/2017 | Masel et al. | |
| 9,566,574 B2 | 2/2017 | Masel et al. | |
| 9,580,824 B2 | 2/2017 | Masel et al. | |
| 9,587,071 B2 | 3/2017 | Sun et al. | |
| 10,092,661 B2 | 10/2018 | Qian et al. | |
| 10,435,504 B2 | 10/2019 | Bae et al. | |
| 10,648,091 B2 | 5/2020 | Kuhl et al. | |
| 10,822,709 B2 * | 11/2020 | Kuhl | C25B 11/057 |
| 10,975,480 B2 | 4/2021 | Masel | |
| 10,975,481 B2 | 4/2021 | Guo et al. | |
| 11,011,756 B2 | 5/2021 | Pintauro et al. | |
| 11,124,886 B2 * | 9/2021 | Kuhl | C25B 9/23 |
| 11,221,330 B2 | 1/2022 | Alocilja et al. | |
| 11,268,200 B2 | 3/2022 | Oener et al. | |
| 11,271,220 B2 | 3/2022 | Morin et al. | |
| 11,299,810 B2 | 4/2022 | Suchsland et al. | |
| 11,512,403 B2 | 11/2022 | Kuhl et al. | |
| 11,578,415 B2 | 2/2023 | Cave et al. | |
| 11,680,327 B2 | 6/2023 | Kuhl et al. | |
| 11,680,328 B2 * | 6/2023 | Huo | C08F 293/00 |
| | | | 204/252 |
| 12,043,912 B2 | 7/2024 | Cave et al. | |
| 2003/0059658 A1 * | 3/2003 | Kohler | H01M 4/926 |
| | | | 429/481 |
| 2004/0028992 A1 | 2/2004 | Jaouen | |
| 2005/0147859 A1 | 7/2005 | Kiefer et al. | |
| 2005/0239912 A1 | 10/2005 | Arcella et al. | |
| 2006/0016685 A1 | 1/2006 | Hawkins et al. | |
| 2008/0283411 A1 | 11/2008 | Eastman et al. | |
| 2008/0318093 A1 | 12/2008 | Lee et al. | |
| 2009/0004528 A1 | 1/2009 | Fritsch et al. | |
| 2009/0014336 A1 | 1/2009 | Olah et al. | |
| 2009/0117436 A1 | 5/2009 | Choi et al. | |
| 2009/0155102 A1 | 6/2009 | Park et al. | |
| 2010/0028736 A1 | 2/2010 | Unlu et al. | |
| 2010/0137457 A1 | 6/2010 | Kaplan | |
| 2010/0142123 A1 | 6/2010 | Smith et al. | |
| 2010/0159347 A1 | 6/2010 | Choi et al. | |
| 2010/0273087 A1 | 10/2010 | Choi et al. | |
| 2010/0324256 A1 | 12/2010 | Ooms et al. | |
| 2011/0166241 A1 | 7/2011 | Choi et al. | |
| 2011/0237830 A1 | 9/2011 | Masel | |
| 2012/0171583 A1 | 7/2012 | Bocarsly et al. | |
| 2012/0252091 A1 * | 10/2012 | Rasmussen | B01D 71/56 |
| | | | 530/421 |
| 2012/0328942 A1 | 12/2012 | Thomas-Alyea et al. | |
| 2013/0098772 A1 | 4/2013 | Bocarsly et al. | |
| 2013/0105304 A1 | 5/2013 | Kaczur et al. | |
| 2013/0118911 A1 | 5/2013 | Sivasankar et al. | |
| 2013/0345325 A1 | 12/2013 | Lecomte et al. | |
| 2014/0027303 A1 | 1/2014 | Cole et al. | |
| 2014/0034506 A1 | 2/2014 | Teamey et al. | |
| 2014/0093799 A1 | 4/2014 | Masel et al. | |
| 2014/0151240 A1 | 6/2014 | Bedell et al. | |
| 2014/0202875 A1 | 7/2014 | Mofakhami | |
| 2014/0206894 A1 | 7/2014 | Cole et al. | |
| 2014/0206896 A1 | 7/2014 | Sivasankar et al. | |
| 2014/0287347 A1 | 9/2014 | Vincent et al. | |
| 2014/0291163 A1 | 10/2014 | Kanan et al. | |
| 2015/0010804 A1 | 1/2015 | Laramie et al. | |
| 2015/0030888 A1 | 1/2015 | Popat et al. | |
| 2015/0064602 A1 | 3/2015 | Lee et al. | |
| 2015/0068915 A1 | 3/2015 | Hoch et al. | |
| 2015/0136613 A1 | 5/2015 | Li et al. | |
| 2015/0232999 A1 | 8/2015 | Busskamp et al. | |
| 2015/0329979 A1 | 11/2015 | Reytier et al. | |
| 2016/0107154 A1 | 4/2016 | Masel et al. | |
| 2016/0161869 A1 | 6/2016 | Avneri et al. | |
| 2017/0037522 A1 | 2/2017 | Kaczur et al. | |
| 2017/0113182 A1 | 4/2017 | Voskian et al. | |
| 2017/0183789 A1 * | 6/2017 | Matthews | C25B 9/19 |
| 2017/0259206 A1 | 9/2017 | Masel et al. | |
| 2017/0321333 A1 | 11/2017 | Kuhl et al. | |
| 2017/0321334 A1 * | 11/2017 | Kuhl | C25B 13/08 |
| 2017/0327655 A1 | 11/2017 | Choi et al. | |
| 2017/0328239 A1 | 11/2017 | Fleischer et al. | |
| 2017/0355811 A1 | 12/2017 | Bae et al. | |
| 2018/0057950 A1 | 3/2018 | Co et al. | |
| 2018/0086985 A1 | 3/2018 | Von Olshausen et al. | |
| 2018/0111083 A1 | 4/2018 | Masel | |
| 2018/0194632 A1 | 7/2018 | Jakobsson et al. | |
| 2018/0257057 A1 | 9/2018 | Motoshige et al. | |
| 2018/0264429 A1 | 9/2018 | Sugano et al. | |
| 2018/0265440 A1 | 9/2018 | Kudo et al. | |
| 2018/0274109 A1 | 9/2018 | Kudo et al. | |
| 2019/0032228 A1 | 1/2019 | Krause et al. | |
| 2019/0036143 A1 | 1/2019 | Yan et al. | |
| 2019/0062931 A1 | 2/2019 | Stark et al. | |
| 2019/0093241 A1 | 3/2019 | Baldauf et al. | |
| 2019/0127865 A1 * | 5/2019 | Li | C25B 3/26 |
| 2019/0134570 A1 * | 5/2019 | Pintauro | H01M 8/0202 |
| 2019/0226103 A1 | 7/2019 | Kuhl et al. | |
| 2019/0233350 A1 | 8/2019 | Sankaranarayanan et al. | |
| 2019/0359894 A1 | 11/2019 | Heidel et al. | |
| 2020/0080211 A1 | 3/2020 | Schmid et al. | |
| 2020/0087805 A1 | 3/2020 | Ono et al. | |
| 2020/0095124 A1 | 3/2020 | Rueger | |
| 2020/0216968 A1 | 7/2020 | Hunegnaw et al. | |
| 2020/0220185 A1 | 7/2020 | Ma et al. | |
| 2020/0240023 A1 * | 7/2020 | Cave | C25B 9/23 |
| 2020/0270756 A1 | 8/2020 | Kofuji et al. | |

(56) References Cited

U.S. PATENT DOCUMENTS

| | | |
|---|---|---|
| 2020/0308341 A1 | 10/2020 | Yan et al. |
| 2020/0308718 A1 | 10/2020 | Patru et al. |
| 2020/0318247 A1 | 10/2020 | Fernandez Sanchis et al. |
| 2020/0325587 A1 | 10/2020 | Fernandez Sanchis et al. |
| 2020/0354843 A1 | 11/2020 | Kuhl et al. |
| 2020/0358120 A1 | 11/2020 | Park et al. |
| 2020/0370188 A1 | 11/2020 | Oener et al. |
| 2020/0376479 A1 | 12/2020 | Masel |
| 2021/0002775 A1 | 1/2021 | Matsumoto et al. |
| 2021/0047743 A1 | 2/2021 | Goetheer et al. |
| 2021/0164116 A1 | 6/2021 | Kuhl et al. |
| 2021/0207275 A1 | 7/2021 | Huo et al. |
| 2021/0299608 A1 | 9/2021 | Liu et al. |
| 2021/0381116 A1 | 12/2021 | Kashi et al. |
| 2021/0387139 A1 | 12/2021 | Voskian et al. |
| 2021/0395908 A1* | 12/2021 | Kuhl ............... C08J 5/2281 |
| 2022/0010437 A1 | 1/2022 | Kuhl et al. |
| 2022/0119636 A1 | 4/2022 | Wang et al. |
| 2022/0119641 A1 | 4/2022 | Wang et al. |
| 2022/0136119 A1 | 5/2022 | Flanders et al. |
| 2022/0153656 A1 | 5/2022 | Flanders et al. |
| 2022/0267916 A1 | 8/2022 | Zhao et al. |
| 2023/0136397 A1 | 5/2023 | Cave et al. |
| 2023/0175088 A1 | 6/2023 | Cintron et al. |
| 2023/0175146 A1 | 6/2023 | Kashi et al. |
| 2023/0202840 A1 | 6/2023 | Flanders et al. |
| 2023/0264148 A1 | 8/2023 | Boettcher et al. |
| 2023/0265568 A1 | 8/2023 | Kuhl et al. |
| 2023/0366110 A1 | 11/2023 | Kuhl et al. |
| 2023/0415104 A1 | 12/2023 | Huo et al. |
| 2024/0141514 A1 | 5/2024 | Zhao et al. |
| 2024/0254641 A1 | 8/2024 | Wu et al. |
| 2024/0327999 A1 | 10/2024 | Cave et al. |
| 2024/0417510 A1 | 12/2024 | Huo et al. |

FOREIGN PATENT DOCUMENTS

| | | |
|---|---|---|
| CN | 1471740 A | 1/2004 |
| CN | 101090158 A | 12/2007 |
| CN | 101553946 A | 10/2009 |
| CN | 101981744 A | 2/2011 |
| CN | 102308028 A | 1/2012 |
| CN | 102576902 A | 7/2012 |
| CN | 102912374 A | 2/2013 |
| CN | 102978653 A | 3/2013 |
| CN | 103367780 A | 10/2013 |
| CN | 104247118 A | 12/2014 |
| CN | 104619886 A | 5/2015 |
| CN | 104919088 A | 9/2015 |
| CN | 106148992 A | 11/2016 |
| CN | 106463743 A | 2/2017 |
| CN | 106715760 A | 5/2017 |
| CN | 107735512 A | 2/2018 |
| CN | 109921060 A | 6/2019 |
| CN | 110247088 A | 9/2019 |
| DE | 102015201132 A1 | 7/2016 |
| DE | 102015214592 A1 | 2/2017 |
| DE | 102016207420 A1 | 10/2017 |
| EP | 1261058 A2 | 11/2002 |
| EP | 3378968 A1 | 9/2018 |
| EP | 3434810 A1 | 1/2019 |
| EP | 3626861 A1 | 3/2020 |
| EP | 3670700 A1 | 6/2020 |
| EP | 4166586 A1 | 4/2023 |
| GB | 1269841 A | 4/1972 |
| JP | H01502673 A | 9/1989 |
| JP | H02166128 A | 6/1990 |
| JP | H04228591 A | 8/1992 |
| JP | H0625444 A | 2/1994 |
| JP | H06145379 A | 5/1994 |
| JP | H10507305 A | 7/1998 |
| JP | 2000251906 A | 9/2000 |
| JP | 2002306975 A | 10/2002 |
| JP | 2002352810 A | 12/2002 |
| JP | 2009540130 A | 11/2009 |
| JP | 2010526214 A | 7/2010 |
| JP | 2013520779 A | 6/2013 |
| JP | 2014022249 A | 2/2014 |
| JP | 2014504424 A | 2/2014 |
| JP | 2014525115 A | 9/2014 |
| JP | 2014194079 A | 10/2014 |
| JP | 2015054994 A | 3/2015 |
| JP | 2015056315 A | 3/2015 |
| JP | 2015513615 A | 5/2015 |
| JP | 2015513616 A | 5/2015 |
| JP | 2015533944 A | 11/2015 |
| JP | 2016538420 A | 12/2016 |
| JP | 2017048442 A | 3/2017 |
| JP | 2017053013 A | 3/2017 |
| JP | 2017527701 A | 9/2017 |
| JP | 2018003059 A | 1/2018 |
| JP | 2019515142 A | 6/2019 |
| JP | 2021059788 A | 4/2021 |
| KR | 100962903 B1 | 6/2010 |
| KR | 20140142185 A | 12/2014 |
| KR | 20150073651 A | 7/2015 |
| WO | WO-9611507 A1 | 4/1996 |
| WO | WO-2007041872 A1 | 4/2007 |
| WO | WO-2008124538 A1 | 10/2008 |
| WO | WO-2011104542 A1 | 9/2011 |
| WO | WO-2011108546 A1 | 9/2011 |
| WO | WO-2011136296 A1 | 11/2011 |
| WO | WO-2012006240 A1 | 1/2012 |
| WO | WO-2012174463 A1 | 12/2012 |
| WO | WO-2013006710 A2 | 1/2013 |
| WO | WO-2013016447 A2 | 1/2013 |
| WO | WO-2014018091 A1 | 1/2014 |
| WO | WO-2014032000 A1 | 2/2014 |
| WO | WO-2014042781 A2 | 3/2014 |
| WO | WO-2014043651 A2 | 3/2014 |
| WO | WO-2014046797 A2 | 3/2014 |
| WO | WO-2014154253 A1 | 10/2014 |
| WO | WO-2014160529 A1 | 10/2014 |
| WO | WO-2015035521 A1 | 3/2015 |
| WO | WO-2015184388 A1 | 12/2015 |
| WO | WO-2016039999 A1 | 3/2016 |
| WO | WO-2016064440 A1 | 4/2016 |
| WO | WO-2016081432 A1 | 5/2016 |
| WO | WO-2016108603 A1 | 7/2016 |
| WO | WO-2017014635 A1 | 1/2017 |
| WO | WO-2017021083 A1 | 2/2017 |
| WO | WO-2017144395 A1 | 8/2017 |
| WO | WO-2017169682 A1 | 10/2017 |
| WO | WO-2017171115 A1 | 10/2017 |
| WO | WO-2017176306 A1 | 10/2017 |
| WO | WO-2017192787 A1 | 11/2017 |
| WO | WO-2018001637 A1 | 1/2018 |
| WO | WO-2018195045 A1 | 10/2018 |
| WO | WO-2019020239 A1 | 1/2019 |
| WO | WO-2019051609 A1 | 3/2019 |
| WO | WO-2019136018 A2 | 7/2019 |
| WO | WO-2020020691 A1 | 1/2020 |
| WO | WO-2020057998 A1 | 3/2020 |
| WO | WO-2020112919 A1 | 6/2020 |
| WO | WO-2020212139 A1 | 10/2020 |
| WO | WO-2020245070 A1 | 12/2020 |
| WO | WO-2021007508 A1 | 1/2021 |
| WO | WO-2021108446 A1 | 6/2021 |
| WO | WO-2021252535 A2 | 12/2021 |
| WO | WO-2022031726 A2 | 2/2022 |

OTHER PUBLICATIONS

Xu et al, Preparation of PVA-GA-CS/PVA-Fe-SA bipolar membrane and its application in electrogeneration of 2,2-dimethyl-3-hydroxypropionic acid, Journal of Membrane Science, vol. 307, No. 2, Jan. 2008, pp. 218-224 (Year: 2008).*

Yang et al, Preparation of a bipolar membrane by photografting polymerization, Frontiers of Chemistry in China, vol. 3, No. 1, Jan. 2008, pp. 10-13 (Year: 2008).*

Balster et al, Tailoring the interface layer of the bipolar membrane, Journal of Membrane Science, vol. 365, No. 1-2, Dec. 2010, pp. 389-398 (Year: 2010).*

(56) References Cited

OTHER PUBLICATIONS

Adabi, et al., "High-performing Commercial Fe—N—C Cathode Electrocatalyst for Anion-exchange Membrane Fuel Cells," Nature Energy, 2021, pp. 1-10.
AE Search Report and Examination Report dated Jun. 20, 2024 in AE Application No. P6000880 /2021.
Aeshala, L.M. et al., "Effect of Cationic and Anionic Solid Polymer Electrolyte on Direct Electrochemical Reduction of Gaseous $CO_2$ to Fuel", Journal of $CO_2$ Utilization, Dec. 1, 2013, vol. 3-4, pp. 49-55.
Aeshala, L.M. et al., "Effect of solid polymer electrolyte on electrochemical reduction of CO2, Separation and Purification Technology," 94, (2012), pp. 131-137.
Ahlfield J., et al., "PEM/AEM Junction Design for Bipolar Membrane Fuel Cells," Journal of The Electrochemical Society, 2017, vol. 164 (12), pp. F1165-F1171.
AU Office Action dated Sep. 7, 2022, in Application No. AU2019210132.
Badami, M. "Leakage effects on the performance characteristics of a regenerative blower for the hydrogen recirculation of a PEM fuel cell," Energy Conversion and Management, vol. 55, Mar. 2012, pp. 20-25.
Badami, M., "Theoretical model with experimental validation of a regenerative blower for hydrogen recirculation in a PEM fuel cell system," Energy Conversion and Management, vol. 51, Issue 3, Mar. 2010, pp. 553-560.
Bakshi M., et al., "How Surfactants Control Crystal Growth of Nanomaterials," ACS Crystal Growth & Design, 2016, vol. 16, pp. 1104-1133.
Blaszczyk, J., "In-Situ Anode Recirculation Rate Measurement Method (Draft)," Ogura Industrial Corporation, Ballard Power Systems, Full Cell Seminar & Exposition 2011, Oct. 31-Nov. 3, 2011, 22 pages.
BR Office Action dated Aug. 15, 2023, in Application No. BR1120210103686 with English translation.
BR Office Action dated Nov. 28, 2022, in Application No. BR1120200149381 with English translation.
CA First Office Action issued on Oct. 15, 2019, in Application No. 3,022,807.
CA First Office Action issued on Sep. 30, 2019, in Application No. 3,022,812.
CA Office Action dated Feb. 28, 2024 in CA Application No. 3120748.
CA Office Action dated Jan. 9, 2023 in Application No. CA20173022812.
CA Office Action dated Jun. 21, 2023, in Application No. CA20173124239.
CA Office Action dated May 3, 2022 in Application No. CA20173124239.
CA Second Office Action issued on Aug. 28, 2020, in Application No. 3,022,812.
CA Second Office Action issued on Oct. 14, 2020, in Application No. 3,022,807.
Casebolt, R., et al., "Effect of Electrolyte Composition and Concentration on Pulsed Potential Electrochemical CO2 Reduction," ChemElectroChem, Chemistry Europe, Accepted Manuscript, 25 pp.
Chen, et al., "Poly(Alkyl-terphenyl Piperidinium) Ionomers and Membranes With an Outstanding Alkaline-membrane Fuel-cell Performance of 2.58 Wcm@2, "Fuel Cells Hot Paper, 2021, vol. 60, pp. 7710-7718.
Chen, et al., "Poly(Fluorenyl Aryl Piperidinium) Membranes and Ionomers for Anion Exchange Membrane Fuel Cells," Nature Communications, 2021, vol. 12, pp. 1-12.
Chen L., et al., "Design Principles for Water Dissociation Catalysts in High-performance Bipolar Membranes," Nature Communications, 2022, vol. 13 Article No. 3846, pp. 1-10.
Choo et al. Modulated Ionomer Distribution in the Catalyst Layer of Polymer Electrolyte Membrane Fuel Cells for High Temperature Operation, Chemsuschem, vol. 7, Issue 8, Aug. 2014, pp. 2335-2341.

CN First Office Action issued on Jul. 28, 2021, in Application No. 201780036099.2.
CN First Office Action issued on Jul. 7, 2021, in Application No. 201780035746.8.
CN Office Action dated Jan. 4, 2023, in CN Application No. CN201980021305.1 with English translation.
CN Office Action dated Feb. 7, 2022, in Application No. CN2017800357468.
CN Office Action dated Jul. 5, 2022 in Application No. CN20178035746 With English translation.
CN Office Action dated Jun. 27, 2024 in CN Application No. 201980086718.8 with English translation.
Delacourt, C., "Electrochemical reduction of carbon dioxide and water to syngas (CO+H2) at room temperature," Manuscript, Environmental Energy Technologies Division, Lawrence Berkeley National Laboratory and Department of Chemical Engineering, University of California Berkeley, 2006-2007, 171 pages.
Delacourt et al., "Design of an Electrochemical Cell Making Syngas (CO+H2) from CO2 and H2O Reduction at Room Temperature," Journal of The Electrochemical Society, 155 (1), (2008), pp. B42-B49.
Digdaya, et al., "A Direct Coupled Electrochemical System for Capture and Conversion of Co2 From Oceanwater," Nature Communications, 2020, vol. 11, pp. 1-10.
Endrodi, B., "Multilayer Electrolyzer Stack Converts Carbon Dioxide to Gas Products at High Pressure with Multilayer Electrolyzer Stack Converts Carbon," acs Energy Lett. 2019, 4, 1770-1777.
EP office action dated May 23, 2023, in application No. EP21152137.2.
EP Office Action issued on Sep. 4, 2020, in Application No. 17793299.3.
EP search report dated Sep. 14, 2021, in application No. EP19741371.9.
EP Search Report issued on Apr. 20, 2021, in Application No. 21152137.2.
EP Search Report issued on Dec. 2, 2019, in Application No. 17793299.3.
EP Search Report issued on Dec. 4, 2019, in Application No. 17793300.9.
Extended European search report dated May 27, 2022, in Application No. EP21181985.9.
Fan, et al., "Poly(Bis-arylimidazoliums) Possessing High Hydroxide Ion Exchange Capacity and High Alkaline Stability," Nature Communications, 2019, vol. 10, pp. 1-10.
Final Office Action issued in issued on Apr. 2, 2019, in U.S. Appl. No. 15/586,182.
Final Office Action issued in issued on Jan. 8, 2020, in U.S. Appl. No. 15/586,173.
Gao, M., et al., "The Role of Adsorbed Oleylamine on Gold Catalysts During Synthesis for Highly Selective Electrocatalytic Reduction of CO2 to CO," The Royal Society of Chemistry, 2020, vol. 56, pp. 7021-7024.
Ge, et al., "Oxygen Reduction in Alkaline Media: From Mechanisms to Recent Advances of Catalysts," ACS Catalysis, 2015, vol. 5, pp. 1-97.
Gerhardt, et al., "Along-the-channel Impacts Ofwater Management and Carbon-dioxide Contamination in Hydroxide-exchange-membrane Fuel Cells: a Modeling Study," Journal of the Electrochemical Society, 2019, vol. 166(7), pp. F3180-F3192.
Gu, et al., "Electrochemical Energy Engineering: a New Frontier of Chemical Engineering Innovation," Annual Review of Chemical and Biomolecular Engineering, 2014, vol. 5, pp. 429-454.
Gurkan, B., et al., "Quinone Reduction in Ionic Liquids for Electrochemical CO 2 Separation," ACS Sustainable Chemistry & Engineering, Jun. 5, 2015, vol. 3(7), pp. 1394-1405.
Hassan, N., et al., "Achieving High-Performance and 2000 h Stability in Anion Exchange Membrane Fuel Cells by Manipulating Ionomer Properties and Electrode Optimization," Advanced Energy Materials, 2020, pp. 1-8.
Hori, Y., "Chapter 48: Co2-reduction, catalyzed by metal electrodes," Handbook of Fuel Cells—Fundamentals, Technology and Applications, vol. 2, Electrocatalysis, 2003. pp. 720-733.

(56) References Cited

OTHER PUBLICATIONS

Huang, et al., "Composite Poly(Norbornene) Anion Conducting Membranes for Achieving Durability, water Management and High Power 3.4 W/cm2) in Hydrogen/oxygen Alkaline Fuel Cells, "Journal of The Electrochemical Society, 2019, vol. 10, pp. F637-F644.
IN Office Action dated Feb. 16, 2022, in Application No. IN202037034886.
IN Office Action dated Feb. 2, 2022 in Application No. IN202118009885.
IN Office Action dated Feb. 7, 2022 in Application No. IN202118007175.
IN Office Action dated Jan. 31, 2023 in Application No. IN202117028812.
IN Office Action issued on Aug. 10, 2020, in Application No. 201817041221.
IN Office Action issued on Aug. 19, 2020, in Application No. 201817041222.
Inaba, et al., "Effects of Carbon Dioxide on the Performance of Anion-exchange Membrane Fuel Cells, "Electrochemistry, 2011, vol. 79(5), pp. 322-325.
International Preliminary Report on Patentability and Written opinion dated Jun. 9, 2022 in Application No. PCT/US2020/062080.
International Search Report and Written Opinion dated Feb. 23, 2022, in Application No. PCT/US2021/55902.
International Preliminary Report on Patentability dated Feb. 16, 2023 in PCT Application No. PCT/US2021/044378.
International Preliminary Report on Patentability dated Jun. 10, 2021 in Application No. PCT/US2019/063471.
International Preliminary Report on Patentability dated May 4, 2023, in Application No. PCT/US2021/055900.
International Preliminary Report on Patentability dated May 4, 2023, in Application No. PCT/US2021/055902.
International Preliminary Report on Patentability issued on Jun. 10, 2021, in PCT Application No. PCT/US2019/063471.
International Preliminary Report on Patentability issued on Nov. 15, 2018, in PCT Application No. PCT/US2017/030935.
International Search Report and Written Opinion dated Apr. 10, 2023 in PCT Application No. PCT/US2022/079335.
International Search Report and Written Opinion dated Apr. 26, 2024 in PCT Application No. PCT/US2023/075864.
International Search Report and Written Opinion dated Apr. 30, 2019, for application No. PCT/US19/014586.
International Search Report and Written Opinion dated Feb. 24, 2022, in Application No. PCT/US2021/055900.
International Search Report and Written Opinion dated Feb. 28, 2022, in Application No. PCT/US2021/044378.
International Search Report and Written Opinion dated Mar. 7, 2023 in PCT Application No. PCT/US2022/081034.
International Search Report and Written Opinion dated Nov. 27, 2023 in PCT Application No. PCT/US2023/024184.
International Search Report and Written Opinion issued in PCT Application No. PCT/US2020/062080 on Mar. 16, 2021.
International Search Report and Written Opinion issued on Aug. 7, 2017, in PCT Application No. PCT/US2017/030935.
International Search Report and Written Opinion issued on Mar. 19, 2020, in PCT Application No. PCT/US2019/063471.
International Search Report and Written Opinion issued on Sep. 13, 2017, in PCT Application No. PCT/US2017/030936.
James, B.D., et al. 2017 DOE Hydrogen and Fuel Cells Program Review, Fuel Cell Systems Analysis, Strategic Analysis, Project IDI FC163, Jun. 8, 2017, 34 pages.
JP Office Action dated Dec. 5, 2023 in JP Application No. 2021-528976 with English translation.
JP Office Action dated Dec. 7, 2021, in Application No. JP2020-213422 with English translation.
JP Office Action dated Feb. 6, 2024 in JP Application No. 2022-187975, with English Translation.
JP Office Action dated Jan. 4, 2023, in Application No. JP2020-561577 with English translation.
JP Office Action dated Sep. 5, 2023, in Application No. JP2021-528976 with English translation.
JP Office Action issued on Jan. 28, 2020, in Application No. 2018-558130.
JP Office Action issued on Jan. 28, 2020, in Application No. 2018-558138.
Kang, J S., et al., "Redox-responsive Sorbents and Mediators for Electrochemically Based $Co_2$ Capture," Current Opinion in Green and Sustainable Chemistry, Oct. 1, 2021, vol. 31, p. 100504.
Keith, et al., "A Process for Capturing Co2 From the Atmosphere," Cell Press, 2018, vol. 2, pp. 1573-1594.
Kim, C., et al., "Impact of Pulsed Electrochemical Reduction of CO2 on the formation of C2+ Products over Cu," ACS Catal., 2020, 10, 12403-12413.
Kimura, K.W., et al., "Selective Electrochemical CO2 Reduction During Pulsed Potential Stems From Dynamic Interface," ACS Catalysis, ACS Paragon Plus Environment, University of Illinois at Urbana-Champaign, Downloaded from pubs.acs.org on Jun. 30, 2020, 31 pages.
Kortlever R., et al., "Catalysts and Reaction Pathways for the Electrochemical Reduction of Carbon Dioxide ," The Journal of Physical Chemistry Letters, 2015, vol. 6(20), pp. 4073-4082.
Kriescher, Stefanie M.A. et al., "A membrane electrode assembly for the electrochemical synthesis of hydrocarbons from C02(g) and Ho2(g), Electrochemistry Communications," 50 (2015), pp. 64-68.
Kungas R., "Review—Electrochemical CO2 Reduction for CO Production: Comparison of Low- and High-Temperature Electrolysis Technologies," Journal of The Electrochemical Society, 2020, vol. 167, 044508, 12 Pages.
Li, et al., "Electrolysis of Co2 to Syngas in Bipolar Membrane-Based Electrochemical Cells," ACS Publications, ACS Energy Letters, 2016, 1, pp. 1149-1153.
Li, et al., "Electrolytic Conversion of Bicarbonate into CO in a Flow Cell," Cell Press, Joule 3, Jun. 19, 2019, pp. 1487-1497.
Li, W., "Electrocatalytic Reduction of $CO_2$ to Small Organic Molecule Fuels on Metal Catalysts," Chapter 5, Department of Chemical Engineering, Michigan Technological University, American Chemical Society, 2010, pp. 55-76.
Liew, F. et al., "Gas Fermentation—A Flexible Platform for Commercial Scale Production of Low-Carbon-Fuels and Chemicals from Waste and Renewable Feedstocks", Frontiers in Microbiology, May 11, 2016, vol. 7, No. 694, pp. 1-28.
Lin, B. et al., "Alkaline Stable C2-Substituted Imidazolium-Based Anion-Exchange Membranes," Chemistry of Material, 2013, vol. 25, pp. 1858-1867.
Liu C., et al., "Constructing a Multifunctional Interface Between Membrane and Porous Transport Layer for Water Electrolyzers," ACS Applied Materials & Interfaces, 2021, vol. 13, pp. 16182-16196.
Liu, Y., et al., "Electrochemically Mediated Carbon Dioxide Separation with Quinone Chemistry in Salt-concentrated Aqueous Media," Nature Communications, May 8, 2020, vol. 11(1), pp. 1-11.
Lobato, J. et al., "Study of the influence of the amount of PBI—H3PO4 in the catalytic layer of a high temperature PEMFC", International Journal of Hydrogen Energy, 2010, vol. 35, pp. 1347-1355.
Lu et al. "A selective and efficient electrocatalyst for carbon dioxide reduction," Nature communication, Jau. 30, 2014.
Lu, et al., "Halloysite-derived Nitrogen Doped Carbon Electrocatalysts for Anion Exchange Membrane Fuel Cells," Journal of Power Sources, 2017, vol. 372, pp. 82-90.
Machine translation of Kang et al KR20150073651A, 2015.
Machine translation of Shin et al WO2016108603A1, 2016.
Maheswari, S. et al., "Oxygen Reduction Catalysts for Alkaline Polymer Electrolyte Fuel Cells", ECS Transactions, 2010, vol. 33, No. 1, pp. 1795-1807.
Mandal M., et al., "Improved Polymer Electrolyte Membrane Water Electrolyzer Performance by Using Carbon Black as a Pore Former in the Anode Catalyst Layer," Journal of Power Sources, 2022, vol. 541, pp. 1-13.
Matz, et al., "Demonstration of Electrochemically-driven Co2 Separation Using Hydroxide Exchange Membranes," Journal of the Electrochemical Society, 2021, vol. 168, pp. 1-12.

(56) References Cited

OTHER PUBLICATIONS

Mayerhofer B., et al., "Bipolar Membrane Electrode Assemblies for Water Electrolysis," ACS Applied Energy Materials, 2020, vol. 3, pp. 9635-9644.

McDonald M., et al., "Graphene Oxide as a Water Dissociation Catalyst in the Bipolar Membrane Interfacial Layer," ACS Applied Materials & Interfaces, 2014, vol. 6, pp. 13790-13797.

Morsy S., et al., "Role of Surfactants in Nanotechnology and Their Applications," International Journal of current Microbiology and Applied Sciences, 2014, vol. 3(5), pp. 237-260.

Muroyama, et al., "Review—CO2 Separation and Transport via Electrochemical Methods," Journal of the Electrochemical Society, 2020, vol. 167, pp. 1-13.

Nakashima T., et al., "Preparation of Fusion Materials Based on Ionic Liquids and Cationic Gold Nanoparticles", Polymer Journal, 2015, vol. 47, pp. 171-176.

Narayanan, S.R., et al., "Electrochemical Conversion of Carbon Dioxide to Formate in Alkaline Polymer Electrolyte Membrane Cells," Journal of The Electrochemical Society, 2011, vol. 158, No. 2, pp. A167-A173.

Notice of Allowance dated Aug. 16, 2021, in U.S. Appl. No. 16/842,659.

Notice of Allowance issued in issued on Apr. 13, 2021, in U.S. Appl. No. 16/842,659.

Notice of Allowance issued in issued on Jan. 29, 2020, in U.S. Appl. No. 15/586,173.

Notice of Allowance issued on Sep. 16, 2020, in U.S. Appl. No. 15/586,182.

O'Brien, C.P. et al., Single Pass CO2 Conversion exceeding 85% in the Electrosynthesis of Multicarbon Products via Local CO2 Regeneration, ACS Energy Let., 2021, vol. 6, 21 pages.

Office Action issued in issued on Apr. 2, 2019, in U.S. Appl. No. 15/586,173.

Office Action issued in issued on Nov. 1, 2018, in U.S. Appl. No. 15/586,173.

Office Action issued in issued on Nov. 1, 2018, in U.S. Appl. No. 15/586,182.

Office Action issued in issued on Sep. 16, 2020, in U.S. Appl. No. 16/842,659.

Office Action issued on Apr. 1, 2021, in U.S. Appl. No. 16/254,255.

Office Action issued on Dec. 30, 2019, in U.S. Appl. No. 15/586,182.

Office Action issued on Jul. 2, 2020, in U.S. Appl. No. 15/586,182.

Parrondo, J. et al., "Degradation of Anion Exchange Membranes Used for Hydrogen Production by Ultrapure Water Electrolysis," Including Supplemental Material, RSC Advances, 2014, vol. 4, 17 Pages.

Patru, A., et al., "Design Principles of Bipolar Electrochemical Co-Electrolysis Cells for Efficient Reduction of Carbon Dioxide from Gas Phase at Low Temperature," Journal of The Electrochemical Society, 166 (2), (2019), pp. F34-F43.

Peng, et al., "Nitrogen-doped Carbon-coox Nanohybrids: a Precious Metal Free Cathode That Exceeds 1.0 Wcm@2 Peak Power and 100 H Life in Anion-Exchange Membrane Fuel Cells," Angewandte Chemie, 2019, vol. 58(4), pp. 1058-1063.

Peng, et al., "Using Operando Techniques to Understand and Design High Performance and Stable Alkaline Membrane Fuel Cells, "Nature Communications, 2020, vol. 11, pp. 1-10.

Phan C., et al., "Role of Capping Agent in Wet Synthesis of Nanoparticles," The Journal of Physical Chemistry A, 2017, vol. 121, pp. 3213-3219.

Pickup, P. et al., "Electronically Conducting Cation-exchange Polymer Powders: Synthesis, Characterization and Applications in PEM Fuel Cells and Supercapacitors", Journal of New Materials for Electrochemical Systems, 2000, vol. 3. pp. 21-26.

Preliminary Report on Patentability issued on Nov. 6, 2018, in PCT Application No. PCT/US2017/030936.

Rucareanu S., et al., 4-(N,N-Dimethylamino)pyridine-Protected Au Nanoparticles: Versatile Precursors for Water and Organic-Soluble Gold Nanoparticles, Chem. Mater, 2006, vol. 18, pp. 4674-4680.

SA Examination Report dated Aug. 8, 2023, in Application No. 521422124 with English Translation.

SA Examination Report dated Feb. 6, 2024, in SA Application No. 521422124, with English Translation.

Sharifian, et al., "Electrochemical Carbon Dioxide Capture to Close the Carbon Cycle," Energy & Environmental Science, 2021, vol. 14, pp. 781 814.

Sharma, et al., "Electrocatalytic Conversion of Carbon Dioxide to Fuels: A Review on the Interaction Between Co2 and the Liquid Electrolyte," WIREs Energy and Environment 2017, vol. 6, pp. 1-21.

Shi, et al., "Editors' Choice—uncovering the Role of Alkaline Pretreatment for Hydroxide Exchange Membrane Fuel Cells," Journal of the Electrochemical Society, 2020, vol. 167, pp. 1-10.

Shi, L. et al., "A shorted membrane electrochemical cell powered by hydrogen to remove $CO_2$ from the air feed of hydroxide exchange membrane fuel cells", Nature Energy, Mar. 2022, vol. 7, 36 pages.

Shi, X., et al., "Sorbents for the Direct Capture of Co2 From Ambient Air," Angewandte Chemie, 2020, vol. 59(18), pp. 1-25.

Shironita S., et al., "Methanol Generation by Co2 Reduction at a Pt-ru/c Electrocatalyst Using a Membrane Electrode Assembly," Journal of Power Sources, Oct. 2013, vol. 240(15), pp. 404-410.

Shu, Q., et al., "Electrochemical Regeneration of Spent Alkaline Absorbent from Direct Air Capture," Environmental science & technology, 2020, vol. 54(14), pp. 8990-8998.

Spets et al. "Direct Glucose Fuel Cell With Anion Exchange Membrane in the Near Neutral State Electrolyte, International Journal of Electrochemical Science," 7, 11696-11705, Dec. 1, 2012, entire document, http.electrochemsci .org/papers/vol? /71211696 .pdf.

Srinivasan, S. et al., "Advances in Solid Polymer Electrolyte Fuel Cell Technology with Low Platinum Loading Electrodes," Journal of Power Sources, 22 (1988) pp. 359-375.

U.S. Notice of Allowance dated Sep. 1, 2022 in U.S. Appl. No. 16/254,255.

U.S. Corrected Notice of Allowance dated Jan. 9, 2023 in U.S. Appl. No. 16/697,066.

U.S. Corrected Notice of Allowance dated Mar. 19, 2024 in U.S. Appl. No. 18/145,702.

U.S. Final Office Action dated Apr. 24, 2024 in U.S. Appl. No. 18/324,929.

U.S. Final Office Action dated Feb. 8, 2024 in U.S. Appl. No. 18/327,835.

U.S. Final Office Action dated Jul. 2, 2024 in U.S. Appl. No. 18/327,835.

U.S. Final Office Action dated Jul. 17, 2024 in U.S. Appl. No. 17/303,329.

U.S. Final Office Action dated Jul. 18, 2024 in U.S. Appl. No. 18/306,928.

U.S. Final Office Action dated Mar. 12, 2024 in U.S. Appl. No. 18/328,524.

U.S. Final office Action dated Nov. 21, 2022 in U.S. Appl. No. 17/247,036.

U.S. Final Office Action dated Sep. 10, 2024 in U.S. Appl. No. 18/299,672.

U.S. Non Final Office Action dated Feb. 23, 2022 in U.S. Appl. No. 16/697,066.

U.S. Non-Final office Action dated Jan. 20, 2023 in U.S. Appl. No. 17/452,395.

U.S. Non-Final Office Action dated Aug. 15, 2023, in U.S. Appl. No. 18/328,524.

U.S. Non-Final Office Action dated Dec. 11, 2023 in U.S. Appl. No. 17/451,630.

U.S. Non-Final Office Action dated Jan. 19, 2024 in U.S. Appl. No. 17/303,329.

U.S. Non-Final Office Action dated Jan. 19, 2024 in U.S. Appl. No. 18/306,928.

U.S. Non-Final office Action dated Jan. 20, 2023 in U.S. Appl. No. 16/949,538.

U.S. Non-Final Office Action dated Jan. 22, 2024 in U.S. Appl. No. 17/369,952.

U.S. Non-Final Office Action dated Jan. 23, 2024 in U.S. Appl. No. 18/299,672.

(56) References Cited

OTHER PUBLICATIONS

U.S. Non-Final Office Action dated Jul. 5, 2024 in U.S. Appl. No. 17/369,952.
U.S. Non-Final Office Action dated Jul. 25, 2024 in U.S. Appl. No. 18/328,524.
U.S. Non-Final Office Action dated May 24, 2022, in U.S. Appl. No. 17/247,036.
U.S. Non-Final Office Action dated Nov. 8, 2023 in U.S. Appl. No. 18/145,702.
U.S. Non-Final Office Action dated Nov. 15, 2023 in U.S. Appl. No. 18/324,929.
US Non-Final Office Action dated Oct. 22, 2021, in U.S. Appl. No. 16/254,255.
U.S. Non-Final Office Action dated Sep. 22, 2023, in U.S. Appl. No. 18/327,835.
U.S. Notice of Allowance dated Apr. 4, 2024 in U.S. Appl. No. 17/451,630.
U.S. Notice of Allowance dated Feb. 10, 2023 in U.S. Appl. No. 17/247,036.
U.S. Notice of Allowance dated Mar. 2, 2023 in U.S. Appl. No. 17/247,036.
U.S. Notice of Allowance dated Mar. 6, 2024 in U.S. Appl. No. 18/145,702.
U.S. Notice of Allowance dated Mar. 8, 2023 in U.S. Appl. No. 16/949,538.
U.S. Notice of Allowance dated May 22, 2023 in U.S. Appl. No. 16/949,538.
U.S. Notice of Allowance dated May 24, 2024 in U.S. Appl. No. 17/451,630.
U.S. Notice of Allowance dated Sep. 29, 2022 in U.S. Appl. No. 16/697,066.
U.S. Appl. No. 17/030,172, inventors Kuhl et al., filed Sep. 23, 2020.
U.S. Appl. No. 18/051,944, inventors Kuhl et al., filed Nov. 2, 2022.
U.S. Appl. No. 18/299,672, inventors Kuhl et al., filed Apr. 12, 2023.
U.S. Appl. No. 18/735,025, inventors Huo Z, et al., filed Jun. 5, 2024.
U.S. Appl. No. 62/939,960, inventors Huo, et al., filed Nov. 25, 2019.
U.S. Appl. No. 63/060,583, inventors Kuhl, et al., filed Aug. 3, 2020.
U.S Restriction requirement dated Aug. 1, 2023 in U.S. Appl. No. 18/324,929.
U.S. Restriction Requirement dated Dec. 15, 2022 in U.S. Appl. No. 17/452,395.
U.S. Restriction requirement dated Jul. 28, 2023, in U.S. Appl. No. 17/451,630.
U.S. Restriction requirement dated Jun. 23, 2023, in U.S. Appl. No. 17/444,356.
U.S. Restriction requirement dated Jun. 27, 2024, in U.S. Appl. No. 17/451,628.
U.S. Restriction Requirement dated Oct. 29, 2021, in U.S. Appl. No. 16/697,066.
Van Bavel, S., et al., "Integrating $CO_2$ Electrolysis into the Gas-to-Liquids-Power-to-Liquids Process," ACS Energy Letters, Jul. 24, 2020, vol. 5(8), pp. 2597-2601.
Varcoe, J.R., "Anion-exchange Membranes in Electrochemical Energy Systems," Energy & Environmental Science, 2014, vol. 7, pp. 3135-3191.
Verma, et al., "The effect of electrolyte composition on the electroreduction of CO2 to CO on Ag based gas diffusion electrodes," Phys. Chem. Chem. Phys., 2016, 18, pp. 7075-7084.
Voskian, S. et al., "Faradaic electro-swing reactive adsorption for $CO_2$ capture", Energy & Environmental Science, 2019, vol. 12, pp. 3530-3547.
Wallace, G G., et al., "Manipulating and Monitoring Biomolecular Interactions with Conducting Electroactive Polymers," Advanced Materials, VCH Publishers, DE, Jul. 4, 2002, vol. 14(13-14), pp. 953-960.
Wang, et al., "Approaches for the preparation of non-linear amphiphilic polymers and their applications to drug delivery", Advanced Drug Delivery Reviews, 2012, vol. 64, pp. 852-865.
Wang, L., et al., "A High Conductivity Ultrathin Anion-exchange Membrane With 500+ H Alkali Stability for Use in Alkaline Membrane Fuel Cells That Can Achieve 2 W $Cm^{-2}$ at 80° C.," Journal of Materials Chemistry A, 2018, vol. 6, pp. 15404-15412.
Wang, L., "Radiation-grafted anion-exchange membranes: the switch from low- to high-density polyethylene leads to remarkably enhanced fuel cell performance," Energy and Environmental Science, 2019, vol. 12, 1575-1579.
Wang, Y., et al., "Synergistic Mn—Co Catalyst Outperforms Pt on High-rate Oxygen Reduction for Alkaline Polymer Electrolyte Fuel Cells," Nature Communications, 2019, vol. 10(1), pp. 1-8.
Woo, J., et al., "Promoting Oxygen Reduction Reaction Activity of Fe—N/C Electrocatalysts by Silica-Coating-Mediated Synthesis for Anion- Exchange Membrane Fuel Cells," Chemistry of Materials, 2018, vol. 30, pp. 6684-6701.
Wurzbacher, J., et al., "Concurrent Separation of Co2 and H2o From Air by a Temperature-vacuum Swing Adsorption/desorption Cycle," Environmental science & technology, 2012, vol. 46(16), pp. 9191-9198.
Xia, Chuan, et al., "Continuous production of pure liquid fuel solutions via electrocatalytic CO2 reduction using solid electrolyte devices," Nature Energy, http://www.nature.com/natureenergy ; https://doi.org/10.1038/s41560-019-0451-x.
Xie K., et al., "Bipolar Membrane Electrolyzers Enable High Single Pass $CO_2$ Electroreduction to Multicarbon Products," Nature Communications 2022, vol. 13 (1), pp. 1-13.
Xin, L., et al., Carbon Supported Ag Nanoparticles as High Performance Cathode Catalyst for H2/O2 anion exchange membrane fuel cell, Frontiers in Chemistry, 2013, vol. 1(16), pp. 1-5.
Xu, Y., et al., "Self-Cleaning CO2 Reduction Systems: Unsteady Electrochemical Forcing Enables Stability," ACS Energy Letters, 2021, 6, pp. 809-815.
Zhan, et al., "Multiarm Star Poly(epsilon-caprolactone) with Hyperbranched Polyamidoamine as Core Capable of Selective Accommodating Cationic or Anionic Guests", Chinese Journal of Polymer Science, 2015. vol. 33, No. 6, pp. 920-930.
Zhang, J., et al., "Recent Insights on Catalyst Layers for Anion Exchange Membrane Fuel Cells," Advanced Science, 2021, vol. 8(15), pp. 1-26.
Zheng, et al., "Hyperbranched polymers: advances from synthesis to applications", Chemical Society Reviews, 2015, vol. 44, pp. 4091-4130.
Zheng, et al., "Editors' Choice—power-generating Electrochemical Co2 Scrubbing From Air Enabling Practical Aemfc Application," Journal of the Electrochemical Society, 2012, vol. 168, pp. 1-8.
Zheng, Y., et al., Quantifying and Elucidating the Effect of Co2 On the Thermodynamics, Kinetics and Charge Transport of AEMFC, Energy and Environmental Science, 2019, vol. 12, pp. 1-14.
Zhu, Wenlei et al., "Active and Selective Conversion of CO2 to CO on Ultrathin Au Nanowires," Journal of American Chemical Society, 2014, 136, pp. 16132-16135.
Zhu, Wenlei et al., "Monodisperse Au Nanoparticles for Selective Electrocatalytic Reduction of CO2 to CO.Journal of the American Chemical Society," 2013, 135, pp. 16833-16836.
Australian Examination Report dated Oct. 22, 2024, in AU Application No. 2019386085.
BR Office Action and Search Report dated Sep. 11, 2024 in BR Application No. 112022010144-9, with English Translation.
EP Extended European Search report dated Oct. 22, 2024 in EP Application No. 21883835.7.
Galvan, V., et al., "Ionomer Significance in Alkaline Direct Methanol Fuel Cell to Achieve High Power with a Quarternized Poly(terphenylene) Membrane," ACS Applied Energy Materials, 2021, vol. 4(6), pp. 5858-5867.
International Preliminary Report on Patentability and Written Opinion dated Jan. 2, 2025 in PCT Application No. PCT/US2023/024184.
International Search Report and Written Opinion dated Dec. 3, 2024, (Applicant first notified on Nov. 28, 2024) for Application No. PCT/US2024/032344.

(56) References Cited

OTHER PUBLICATIONS

International Search Report and Written Opinion dated Jan. 31, 2025, (Applicant first notified on Jan. 27, 2025) for Application No. PCT/US2024/052879.

Invitation to Pay Additional Fees dated Oct. 11, 2024 (Applicant first notified on Oct. 7, 2024) for Application No. PCT/US2024/032344.

Jiang, T., et al., "Highly Stable Poly(P-quaterphenylene Alkylene)-based Anion Exchange Membranes," Journal of Membrane Science, 2022, vol. 647, pp. 1-12.

JP Office Action dated Oct. 29, 2024 in JP Application No. 2022-187975 with English translation.

KR Office Action dated Oct. 16, 2024 in KR Application No. 10-2021-7019873 with English Translation.

Li, D., et al., " Highly Quaternized Polystyrene Ionomers For High Performance Anion Exchange Membrane Water Electrolysers," Nature Energy, 2020, vol. 5, pp. 378-385.

SA Office Action dated Sep. 16, 2024 in SA Application No. 524452150 with English translation.

U.S. Corrected Notice of Allowance dated Dec. 16, 2024 in U.S. Appl. No. 17/303,329.

U.S. Non-Final Office Action dated Oct. 15, 2024 in U.S. Appl. No. 17/451,628.

U.S. Non-Final Office Action dated Sep. 24, 2024 in U.S. Appl. No. 18/324,929.

U.S. Notice of Allowance dated Jan. 15, 2025 in U.S. Appl. No. 18/299,672.

U.S. Notice of Allowance dated Jan. 23, 2025 in U.S. Appl. No. 18/327,835.

U.S. Notice of Allowance dated Nov. 14, 2024 in U.S. Appl. No. 17/303,329.

U.S. Appl. No. 18/926,864, inventors Shen C, et al., filed Oct. 25, 2024.

CN Office Action dated Feb. 13, 2025 in CN Application No. 201980086718.8, with English Translation.

JP Office Action dated Jan. 28, 2025 in JP Application No. 2022-530995, with English Translation.

U.S. Final Office Action dated Feb. 27, 2025 in U.S. Appl. No. 18/324,929.

U.S. Final Office Action dated Mar. 14, 2025 in U.S. Appl. No. 17/451,628.

U.S. Notice of Allowance dated Mar. 13, 2025 in U.S. Appl. No. 17/303,329.

CN Office Action dated Mar. 13, 2025 in CN Application No. 202080092846.6, with English Translation.

\* cited by examiner

MEMBRANE ELECTRODE ASSEMBLY FOR COx REDUCTION

STATEMENTS OF GOVERNMENTAL SUPPORT

This invention was made with government support under Award Number NNX17CJ02C awarded by the National Aeronautics and Space Administration, Award Number 1738554 awarded by the National Science Foundation, and Award Number DE-FE0031712 awarded by the Department of Energy. The government has certain rights in the invention.

The Government has rights in this invention pursuant to a User Agreement No. FP00003032 between Opus 12, Inc. and The Regents of the University of California, which manages and operates Ernest Orlando Lawrence Berkeley National Laboratory for the US Department of Energy.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

SUMMARY

Provided herein are membrane electrode assemblies (MEAs) for $CO_x$ reduction. According to various embodiments, the MEAs are configured to address challenges particular to $CO_x$ including managing water in the MEA. Bipolar and anion-exchange membrane (AEM)-only MEAs are described.

One aspect of the disclosure relates to a membrane electrode assembly including a cathode catalyst layer; an anode catalyst layer; and a bipolar membrane disposed between the cathode catalyst layer and the anode catalyst layer, wherein the bipolar membrane includes an anion-conducting polymer layer, a cation-conducting polymer layer, and a bipolar interface between the anion-conducting polymer layer and the cation-conducting polymer layer, wherein the cation-conducting polymer layer is disposed between the anode catalyst layer and the anion-conducting polymer layer, and wherein the bipolar interface is characterized by or includes one or more of:
- covalent cross-linking of the cation-conducting polymer layer with the anion-conducting polymer layer;
- interpenetration of the anion-conducting polymer layer and the cation-conducting polymer layer; and
- a layer of a second anion-conducting polymer, wherein the ion exchange capacity of the second anion-conducting polymer is higher than the ion exchange capacity of the anion-conducting polymer of the anion-conducting polymer layer.

In some embodiments, the bipolar interface is characterized by interpenetration of the anion-conducting polymer layer and the cation-conducting polymer layer and the region of interpenetration is between 10% and 75% of the total thickness of the anion-conducting layer including the interpenetration region. In some embodiments, the bipolar interface includes protrusions having a dimension of between 10 µm-1 mm in a plane parallel to the anion-conducting polymer layer (the in-plane dimension). In some embodiments, the bipolar interface is characterized by interpenetration of the anion-conducting polymer layer and the cation-conducting polymer layer and wherein the bipolar interface includes protrusions each having a thickness of between 10% to 75% of the total thickness of the anion-conducting polymer layer. In some embodiments, the bipolar interface is characterized by interpenetration of the anion-conducting polymer layer and the cation-conducting polymer layer and wherein the bipolar interface includes a gradient of the anion-conducting polymer and/or the cation-conducting polymer. In some embodiments, the bipolar interface is characterized by interpenetration of the anion-conducting polymer layer and the cation-conducting polymer layer and wherein the bipolar interface includes a mixture of the anion-conducting polymer and/or the cation-conducting polymer.

In some embodiments, the bipolar interface includes a layer of a second anion-conducting polymer, and further wherein the thickness of the layer of the second anion-conducting polymer is between 0.1% and 10% of the thickness of the anion-conducting polymer layer. In some embodiments, the bipolar interface includes a layer of a second anion-conducting polymer and further wherein the second anion-conducting polymer has an ion exchange capacity (IEC) of between 2.5 and 3.0 mmol/g. ISSE, the anion-conducting polymer has an IEC of between 1.5 and 2.5 mmol/g. In some embodiments, the bipolar interface includes a layer of a second anion-conducting polymer and wherein the second anion-conducting polymer has a lower water uptake than that of the anion-conducting polymer of the anion-conducting polymer layer.

In some embodiments, bipolar interface includes covalent crosslinking of the cation-conducting polymer layer with the anion-conducting polymer layer and the covalent crosslinking includes a material including a structure of one of formulas (I)-(V), (X)-(XXXIV) as described further below, or a salt thereof.

In some embodiments, the bipolar interface includes covalent crosslinking of the cation-conducting polymer layer with the anion-conducting polymer layer and wherein the covalent crosslinking includes a material including a structure of one of formulas (I)-(V):

(I)

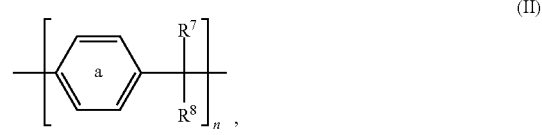

(II)

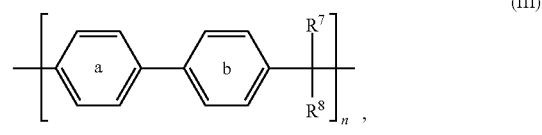

(III)

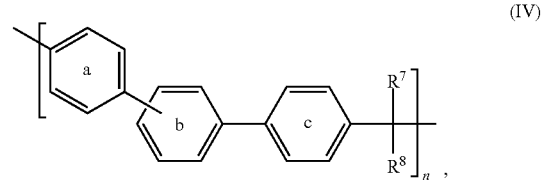

(IV)

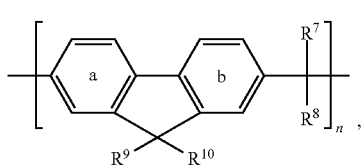

(V)

or a salt thereof, wherein:

each of $R^7$, $R^8$, $R^9$, and $R^{10}$ is, independently, an electron-withdrawing moiety, H, optionally substituted aliphatic, alkyl, heteroaliphatic, heteroalkylene, aromatic, aryl, or arylalkylene, wherein at least one of $R^7$ or $R^8$ can include the electron-withdrawing moiety or wherein a combination of $R^7$ and $R^8$ or $R^9$ and $R^{10}$ can be taken together to form an optionally substituted cyclic group;

Ar includes or is an optionally substituted aromatic or arylene;

each of n is, independently, an integer of 1 or more;

each of rings a-c can be optionally substituted; and rings a-c, $R^7$, $R^8$, $R^9$, and $R^{10}$ can optionally include an ionizable or ionic moiety.

ISSE, $R^7$ or $R^8$ includes the electron-withdrawing moiety selected from the group consisting of an optionally substituted haloalkyl, cyano, phosphate, sulfate, sulfonic acid, sulfonyl, difluoroboranyl, borono, thiocyanato, and piperidinium.

In some embodiments, the bipolar interface includes covalent crosslinking of the cation-conducting polymer layer with the anion-conducting polymer layer and wherein the covalent crosslinking includes a material including a structure of one of the following formulas:

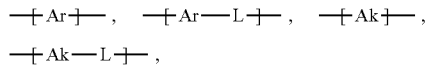

or a salt thereof, wherein:

Ar is or includes an optionally substituted arylene or aromatic;

Ak is or includes an optionally substituted alkylene, haloalkylene, aliphatic, heteroalkylene, or heteroaliphatic; and L is a linking moiety, and wherein one or Ar, Ak, and/or L is optionally substituted with one or more ionizable or ionic moieties.

In some embodiments, the bipolar interface includes covalent crosslinking of the cation-conducting polymer layer with the anion-conducting polymer layer and wherein the covalent crosslinking includes a crosslinker including a structure of one of the following formulas:

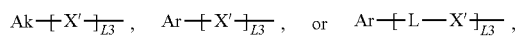

wherein:

Ak is an optionally substituted aliphatic or an optionally substituted alkylene;

Ar is an optionally substituted aromatic or an optionally substituted arylene;

L is a linking moiety;

L3 is an integer that is 2 or more; and

X' is absent, —O—, —$NR^{N1}$—, —C(O)—, or -Ak-, in which $R^{N1}$ is H or optionally substituted alkyl, and Ak is optionally substituted alkylene, optionally substituted heteroalkylene, optionally substituted aliphatic, or optionally substituted heteroaliphatic.

In some embodiments, the covalent crosslinking includes a material including one or more ionizable or ionic moieties selected from the group consisting of -$L^A$-$X^A$, -$L^A$-($L^{A'}$-$X^A$)$_{L2}$, -$L^A$-($X^A$-$L^{A'}$-$X^{A'}$)$_{L2}$, and -$L^A$-$X^A$-$L^{A'}$-$X^{A'}$-$L^{A''}$-$X^{A''}$;

wherein:

each $L^A$, $L^{A'}$, and $L^{A''}$ is, independently, a linking moiety;

each $X^A$, $X^{A'}$, and $X^{A''}$ includes, independently, an acidic moiety, a basic moiety, a multi-ionic moiety, a cationic moiety, or an anionic moiety; and L2 is an integer of 1 or more.

In some such embodiments, each $X^A$, $X^{A'}$, and $X^{A''}$ includes, independently, carboxy, carboxylate anion, guanidinium cation, sulfo, sulfonate anion, sulfonium cation, sulfate, sulfate anion, phosphono, phosphonate anion, phosphate, phosphate anion, phosphonium cation, phosphazenium cation, amino, ammonium cation, heterocyclic cation, or a salt form thereof.

In some embodiments, the linking moiety includes a covalent bond, spirocyclic bond, —O—, —$NR^{N1}$—, —C(O)—, —C(O)O—, —OC(O)—, —$SO_2$—, optionally substituted aliphatic, alkylene, alkyleneoxy, haloalkylene, hydroxyalkylene, heteroaliphatic, heteroalkylene, aromatic, arylene, aryleneoxy, heteroaromatic, heterocycle, or heterocyclyldiyl.

Another aspect of the disclosure relates to a membrane electrode assembly (MEA) including: a cathode layer; an anode layer; and a bipolar membrane disposed between the cathode layer and the anode layer, wherein the bipolar membrane includes a cation-conducting polymer layer and an anion-conducting polymer layer, wherein the cation-conducting polymer layer is disposed between the anode layer and the anion-conducting polymer layer, and wherein the thickness of the anion-conducting polymer layer is between 5 and 80 micrometers.

In some embodiments, thickness of the anion-conducting polymer layer is between 5 and 50 micrometers. In some embodiments, the thickness of the anion-conducting polymer layer is between 5 and 40 micrometers. In some embodiments, the thickness of the anion-conducting polymer layer is between 5 and 30 micrometers.

In some embodiments, the molecular weight of the anion-conducting polymer is at least 30 kg/mol, at least 45 kg/mol, or at least 60 kg/mol.

In some embodiments, wherein the ratio of the thickness of the cation-conducting polymer layer to the thickness anion-conducting polymer layer is at least 3:1. In some embodiments, the ratio of the thickness of the cation-conducting polymer layer to the thickness of the anion-conducting polymer layer is at least 7:1. In some embodiments, the ratio of the thickness of the cation-conducting polymer layer to the anion-conducting polymer layer is at least 13:1.

In some embodiments, the ratio of the thickness of the cation-conducting polymer layer to the thickness of the anion-conducting polymer layer is no more than 3:1. In some embodiments, the ratio of the thickness of the cation-conducting polymer layer to the thickness anion-conducting polymer layer is no more than 2:1. In some embodiments, the ratio of the thickness of the cation-conducting polymer layer to the thickness of the anion-conducting polymer layer is no more than 1:1.

Another aspect of the disclosure relates to a membrane electrode assembly including a cathode catalyst layer; an anode catalyst layer; and a bipolar membrane disposed between the cathode catalyst layer and the anode catalyst layer, wherein the bipolar membrane includes an anion-conducting polymer layer, a cation-conducting polymer layer, and a bipolar interface between the anion-conducting polymer layer and the cation-conducting polymer layer, wherein the cation-conducting polymer layer is disposed between the anode catalyst layer and the anion-conducting polymer layer, and wherein the bipolar interface is characterized by or includes one or more of:
- a material selected from an ionic liquid, a non-ionically conductive polymer; a metal, an oxide ion donor, a catalyst; a $CO_2$ absorbing material, and a $H_2$ absorbing material; and
- a material that extends across and mechanically reinforces the interface.

Another aspect of the disclosure relates to a membrane electrode assembly (MEA) including: a cathode layer; an anode layer; and a bipolar membrane disposed between the cathode layer and the anode layer, wherein the bipolar membrane includes a cation-conducting polymer layer and an anion-conducting polymer layer, wherein the cation-conducting polymer layer is disposed between the anode layer and the anion-conducting polymer layer, and wherein the molecular weight of the anion-conducting polymer is at least 30 kg/mol. In some embodiments, it is at least 45 kg/mol or at least 60 kg/mol.

Also provided are methods of fabrication of MEAs and anion-exchange membrane (AEM)-only MEAs. These and other aspects of the disclosure are discussed further below with reference to the drawings.

DETAILED DESCRIPTION

Introduction and Goals of MEA

Figure 1:
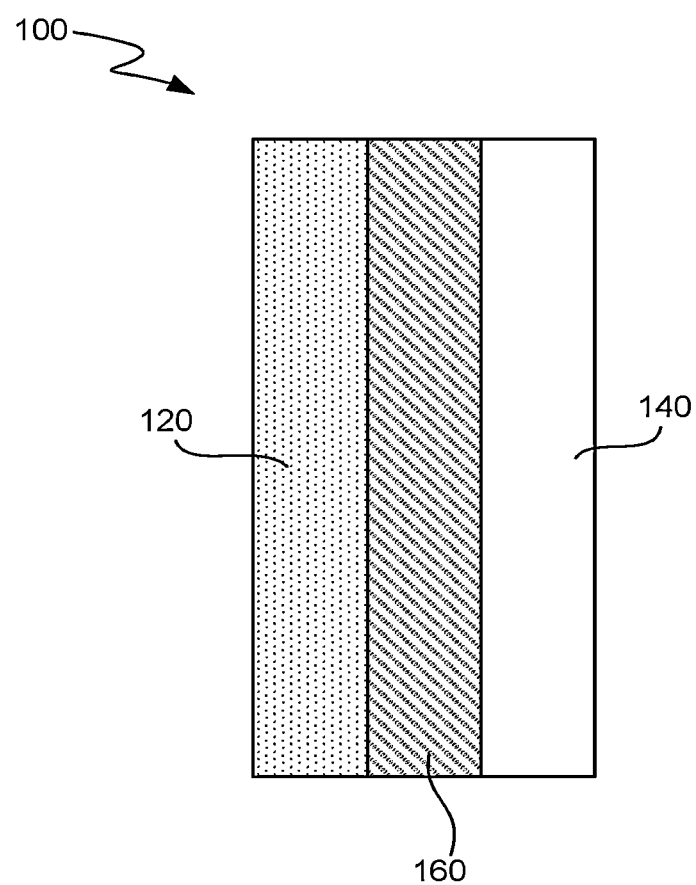
FIG. 1 shows a membrane electrode assembly used in a water electrolysis reactor, which makes hydrogen and oxygen.

A membrane electrode assembly (MEA) is described here. It may be used in a $CO_x$ reduction reactor. $CO_x$ may be carbon dioxide ($CO_2$), carbon monoxide (CO), $CO_3^{2-}$ (carbonate ion), $HCO_3^-$ (bicarbonate ion), or combinations thereof. The MEA contains an anode layer, a cathode layer, electrolyte, and optionally one or more other layers. The layers may be solids and/or soft materials. The layers may include polymers such as ion-conducting polymers.

When in use, the cathode of an MEA promotes electrochemical reduction of $CO_x$ by combining three inputs: $CO_x$, ions (e.g., protons) that chemically react with $CO_x$, and electrons. The reduction reaction may produce CO, hydrocarbons, and/or oxygen and hydrogen containing organic compounds such as methanol, ethanol, and acetic acid. When in use, the anode of an MEA promotes an electrochemical oxidation reaction such as electrolysis of water to produce elemental oxygen and protons. The cathode and anode may each contain catalysts to facilitate their respective reactions.

The compositions and arrangements of layers in the MEA may promote high yield of a $CO_x$ reduction products. To this end, the MEA may facilitate any one or more of the following conditions: (a) minimal parasitic reduction reactions (non-$CO_x$ reduction reactions) at the cathode; (b) low loss of $CO_x$ reactants at anode or elsewhere in the MEA; (c) maintain physical integrity of the MEA during the reaction (e.g., prevent delamination of the MEA layers); (d) prevent $CO_x$ reduction product cross-over; (e) prevent oxidation production (e.g., 02) cross-over; (f) maintain a suitable environment at the cathode/anode for oxidation/reduction as appropriate; (g) provide pathway for desired ions to travel between cathode and anode while blocking undesired ions; and (h) minimize voltage losses.

$CO_x$ Reduction Specific Problems

Polymer-based membrane assemblies such as MEAs have been used in various electrolytic systems such as water electrolyzers and in various galvanic systems such as fuel cells. However, $CO_x$ reduction presents problems not encountered, or encountered to a lesser extent, in water electrolyzers and fuel cells.

For example, for many applications, an MEA for $CO_x$ reduction requires a lifetime on the order of about 50,000 hours or longer (approximately five years of continuous operation), which is significantly longer than the expected lifespan of a fuel cell for automotive applications; e.g., on the order of 5,000 hours. And for various applications, an MEA for $CO_x$ reduction employs electrodes having a relatively large geometric surface area by comparison to MEAs used for fuel cells in automotive applications. For example, MEAs for $CO_x$ reduction may employ electrodes having geometric surface areas (without considering pores and other nonplanar features) of at least about 500 cm².

$CO_x$ reduction reactions may be implemented in operating environments that facilitate mass transport of particular reactant and product species, as well as to suppress parasitic reactions. Fuel cell and water electrolyzer MEAs often cannot produce such operating environments. For example, such MEAs may promote undesirable parasitic reactions such as gaseous hydrogen evolution at the cathode and/or gaseous $CO_2$ production at the anode.

In some systems, the rate of a $CO_x$ reduction reaction is limited by the availability of gaseous $CO_x$ reactant at the cathode. By contrast, the rate of water electrolysis is not significantly limited by the availability of reactant:liquid water tends to be easily accessible to the cathode and anode, and electrolyzers can operate close to highest current density possible.

MEA Configurations

MEA General Arrangement

In certain embodiments, an MEA has a cathode layer, an anode layer, and a polymer electrolyte membrane (PEM) between the anode layer and the cathode layer. The polymer electrolyte membrane provides ionic communication between the anode layer and the cathode layer, while preventing electronic communication, which would produce a short circuit. The cathode layer includes a reduction catalyst and a first ion-conducting polymer. The cathode layer may also include an ion conductor and/or an electron conductor. The anode layer includes an oxidation catalyst and a second ion-conducting polymer. The anode layer may also include an ion conductor and/or an electron conductor. The PEM includes a third ion-conducting polymer.

In certain embodiments, the MEA has a cathode buffer layer between the cathode layer and the polymer electrolyte membrane. The cathode buffer includes a fourth ion-conducting polymer.

In certain embodiments, the MEA has an anode buffer layer between the anode layer and the polymer electrolyte membrane. The anode buffer includes a fifth ion-conducting polymer.

In connection with certain MEA designs, there are three available classes of ion-conducting polymers: anion-conductors, cation-conductors, and mixed cation-and-anion-conductors. In certain embodiments, at least two of the first, second, third, fourth, and fifth ion-conducting polymers are from different classes of ion-conducting polymers.

For context, as shown in FIG. 1, a membrane electrode assembly (MEA) 100 used for water electrolysis has a cathode 120 and an anode 140 separated by an ion-conducting polymer layer 160 that provides a path for ions to travel between the cathode 120 and the anode 140. The cathode 120 and the anode 140 each contain ion-conducting polymer and catalyst particles. One or both may also include electronically conductive catalyst support. The ion-conducting polymer in the cathode 120, anode 140, and ion-conducting polymer layer 160 are either all cation-conductors or all anion-conductors.

The MEA 100 is not suitable for use in a carbon oxide reduction reactor (CRR). When all of the ion-conducting polymers are cation-conductors, the environment favors $H_2$ generation, an unwanted side reaction, at the cathode layer. The production of hydrogen lowers the rate of $CO_x$ product production and lowers the overall efficiency of the process.

When all of the ion-conducting polymers are anion-conductors, then $CO_2$ reacts with hydroxide anions in the ion-conducting polymer at the cathode to form bicarbonate anions. The electric field in the reactor moves the bicarbonate anions from the cathode side of the cell to the anode side of the cell. At the anode, bicarbonate anions can decompose back into $CO_2$ and hydroxide. This results in the net movement of $CO_2$ from the cathode to the anode of the cell, where it does not react and is diluted by the anode reactants and products. This loss of $CO_2$ to the anode side of the cell reduces the efficiency of the process.

Conductivity and Selectivity of Ion-Conducting Polymers for MEA Layers

The term "ion-conducting polymer" is used herein to describe a polymer electrolyte having greater than about 1 mS/cm specific conductivity for anions and/or cations. The term "anion-conductor" describes an ion-conducting polymer that conducts anions primarily (although there will still be some small amount of cation conduction) and has a transference number for anions greater than about 0.85 at around 100 micron thickness. The terms "cation-conductor" and/or "cation-conducting polymer" describe an ion-conducting polymer that conducts cations primarily (e.g., there can still be an incidental amount of anion conduction) and has a transference number for cations greater than approximately 0.85 at around 100 micron thickness. For an ion-conducting polymer that is described as conducting both anions and cations (a "cation-and-anion-conductor"), neither the anions nor the cations has a transference number greater than approximately 0.85 or less than approximately 0.15 at around 100 micron thickness. To say a material conducts ions (anions and/or cations) is to say that the material is an ion-conducting material or ionomer. Examples of ion-conducting polymers of each class are provided in the below Table.

| | Ion-Conducting Polymers | | | |
|---|---|---|---|---|
| Class | Description | | Common Features | Examples |
| A. Anion-conducting | Greater than approximately 1 mS/cm specific conductivity for anions, which have a transference number greater than approximately 0.85 at around 100 micron thickness | | Positively charged functional groups are covalently bound to the polymer backbone | aminated tetramethyl polyphenylene; poly(ethylene-co-tetrafluoroethylene)-based quaternary' ammonium polymer, quaternized polysulfone |
| B. Conducts both anions and cations | Greater than approximately 1 mS/cm conductivity for ions (including both cations and anions), which have a transference number between approximately 0.15 and 0.85 at around 100 micron thickness | | Salt is soluble in the polymer and the salt ions can move through the polymer material | polyethylene oxide; polyethylene glycol; poly(vinylidene fluoride); polyurethane |
| C. Cation-conducting | Greater than approximately 1 mS/cm specific conductivity for cations, which have a transference number greater than approximately 0.85 at around 100 micron thickness | | Negatively charged functional groups are covalently bound to the polymer backbone | perfluorosulfonic acid polytetrafluoroethylene co-polymer; sulfonated poly(ether ketone); poly(styrene sulfonic acid-co-maleic acid) |

Some Class A ion-conducting polymers are known by tradenames such as 2259-60 (Pall RAI), AHA by Tokuyama Co, Fumasep® FAA—(fumatech GbbH), Sustanion®, Morgane ADP by Solvay, or Tosflex® SF-17 by Tosoh anion exchange membrane material. Further class A ion-conducting polymers include HNN5/HNN8 by Ionomr, FumaSep by Fumatech, TM1 by Orion, and PAP-TP by W7energy. Some Class C ion-conducting polymers are known by tradenames such as various formulations of Nafion® (DuPont™), GORE-SELECT® (Gore), Fumapem® (fumatech GmbH), and Aquivion® PFSA (Solvay).

Polymeric Structures

Examples of polymeric structures that can include an ionizable moiety or an ionic moiety and be used as ion-conducting polymers in the MEAs described here are provided below. The ion-conducting polymers may be used as appropriate in any of the MEA layers that include an ion-conducting polymer. Charge conduction through the material can be controlled by the type and amount of charge (e.g., anionic and/or cationic charge on the polymeric structure) provided by the ionizable/ionic moieties. In addition, the composition can include a polymer, a homopolymer, a copolymer, a block copolymer, a polymeric blend, other polymer-based forms, or other useful combinations of repeating monomeric units. As described below, an ion conducting polymer layer may include one or more of crosslinks, linking moieties, and arylene groups according to various embodiments. In some embodiments, two or more ion conducting polymers (e.g., in two or more ion conducting polymer layers of the MEA) may be crosslinked.

Non-limiting monomeric units can include one or more of the following:

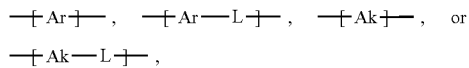

in which Ar is an optionally substituted arylene or aromatic; Ak is an optionally substituted alkylene, haloalkylene, aliphatic, heteroalkylene, or heteroaliphatic; and L is a linking moiety (e.g., any described herein) or can be —C(R$^7$)(R$^8$)—. Yet other non-limiting monomeric units can include optionally substituted arylene, aryleneoxy, alkylene, or combinations thereof, such as optionally substituted (aryl)(alkyl)ene (e.g., -Ak-Ar— or -Ak-Ar-Ak- or —Ar-Ak-, in which Ar is an optionally substituted arylene and Ak is an optionally substituted alkylene). One or more monomeric units can be optionally substituted with one or more ionizable or ionic moieties (e.g., as described herein).

One or more monomeric units can be combined to form a polymeric unit. Non-limiting polymeric units include any of the following:

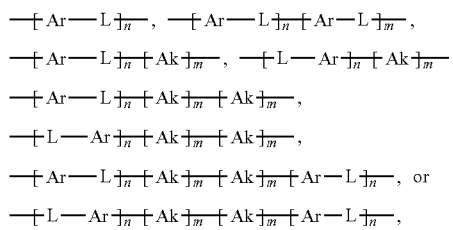

in which Ar, Ak, L, n, and m can be any described herein. In some embodiments, each m is independently 0 or an integer of 1 or more. In other embodiments, Ar can include two or more arylene or aromatic groups.

Other alternative configurations are also encompassed by the compositions herein, such as branched configurations, diblock copolymers, triblock copolymers, random or statistical copolymers, stereoblock copolymers, gradient copolymers, graft copolymers, and combinations of any blocks or regions described herein.

Examples of polymeric structures include those according to any one of formulas (I)-(V) and (X)-(XXXIV), or a salt thereof. In some embodiments, the polymeric structures are copolymers and include a first polymeric structure selected from any one of formulas (I)-(V) or a salt thereof; and a second polymeric structure including an optionally substituted aromatic, an optionally substituted arylene, a structure selected from any one of formulas (I)-(V) and (X)-(XXXIV), or a salt thereof.

In one embodiment, the MW of the ion-conducting polymer is a weight-average molecular weight (Mw) of at least 10,000 g/mol; or from about 5,000 to 2,500,000 g/mol. In another embodiment, the MW is a number average molecular weight (Mn) of at least 20,000 g/mol; or from about 2,000 to 2,500,000 g/mol.

In any embodiment herein, each of n, n1, n2, n3, n4, m, m1, m2, or m3 is, independently, 1 or more, 20 or more, 50 or more, 100 or more; as well as from 1 to 1,000,000, such as from 10 to 1,000,000, from 100 to 1,000,000, from 200 to 1,000,000, from 500 to 1,000,000, or from 1,000 to 1,000,000.

Non-limiting polymeric structures can include the following:

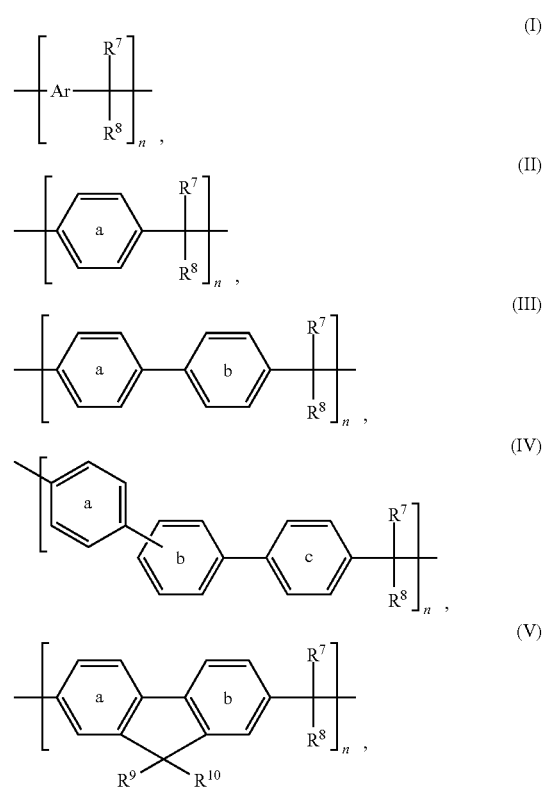

or a salt thereof, wherein:

each of $R^7$, $R^8$, $R^9$, and $R^{10}$ is, independently, an electron-withdrawing moiety, H, optionally substituted aliphatic, alkyl, heteroaliphatic, heteroalkylene, aromatic, aryl, or arylalkylene, wherein at least one of $R^7$ or $R^8$ can include the electron-withdrawing moiety or wherein a combination of $R^7$ and $R^8$ or $R^9$ and $R^{10}$ can be taken together to form an optionally substituted cyclic group;

Ar comprises or is an optionally substituted aromatic or arylene (e.g., any described herein);

each of n is, independently, an integer of 1 or more;

each of rings a-c can be optionally substituted; and rings a-c, $R^7$, $R^8$, $R^9$, and $R^{10}$ can optionally comprise an ionizable or ionic moiety.

Further non-limiting polymeric structures can include one or more of the following:

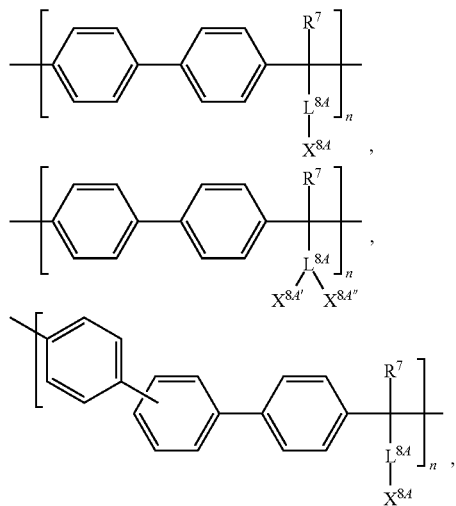

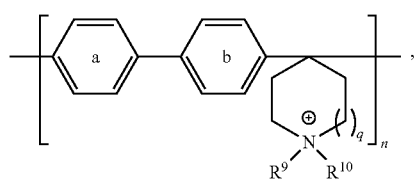

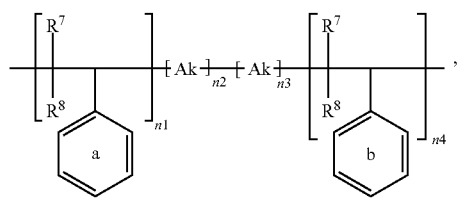

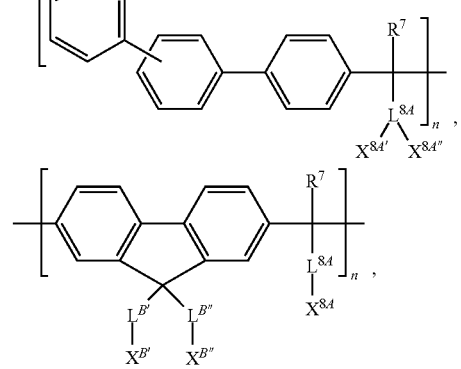

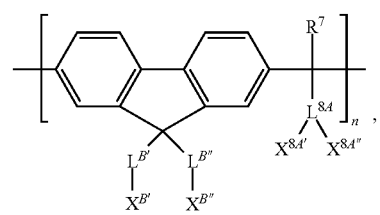

or a salt thereof, wherein:

$R^7$ can be any described herein (e.g., for formulas (I)-(V));

n is from 1 or more;

each $L^{8A}$, $L^{B'}$, and $L^{B''}$ is, independently, a linking moiety; and each $X^{8A}$, $X^{8A'}$, $X^{8A''}$, $X^{B'}$, and $X^{B''}$ is, independently, an ionizable or ionic moiety.

Yet other polymeric structures include the following:

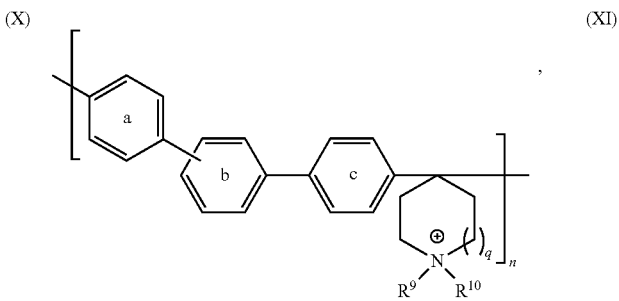

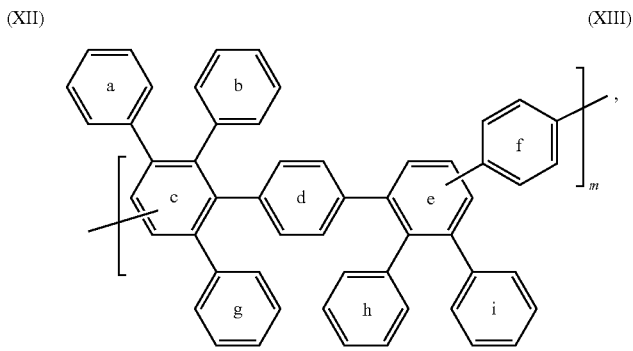

-continued
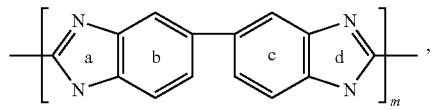
(XIV)
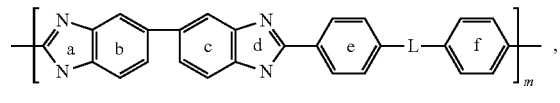
(XV)
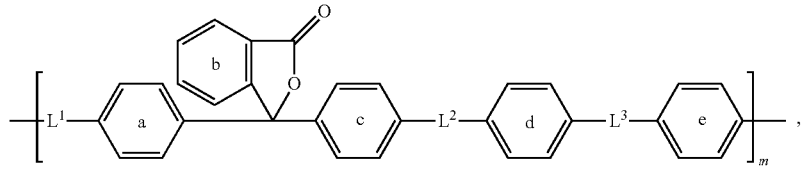
(XVI)
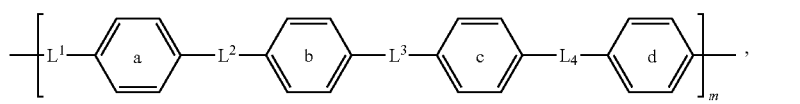
(XVII)
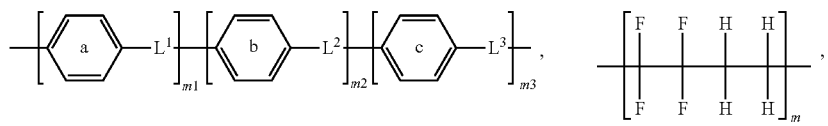
(XVIII)
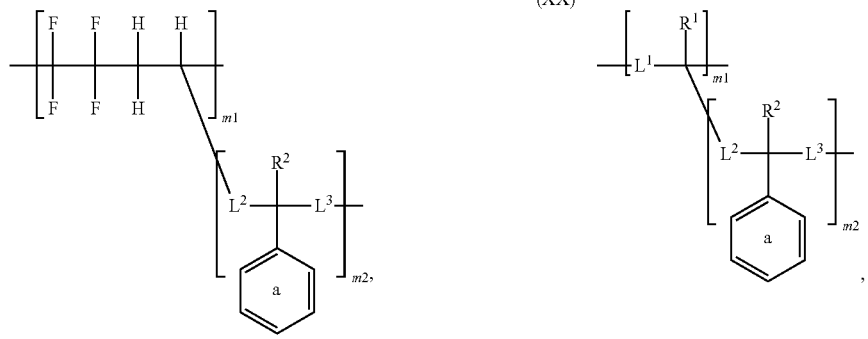
(XIX) (XX) (XXI)
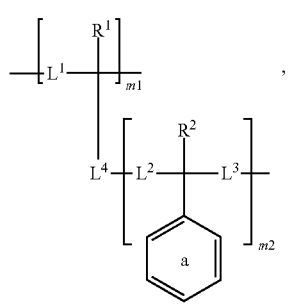
(XXII)
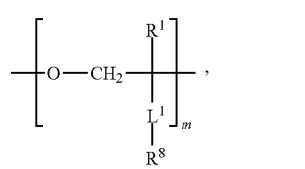
(XXIII)
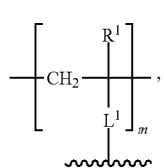
(XXIV)
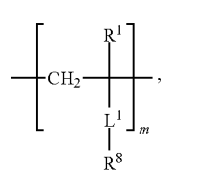
(XXV)
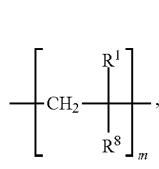
(XXVI)
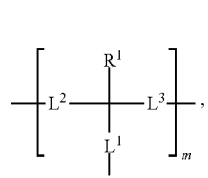
(XXVII)

-continued

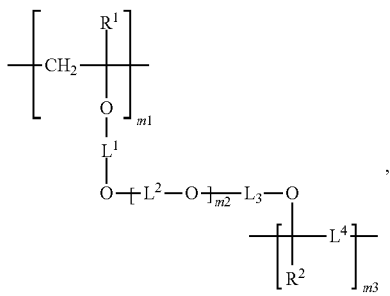

(XXVIII)

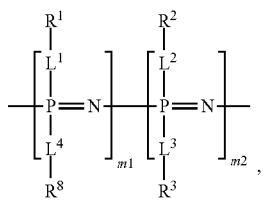

(XXIX)

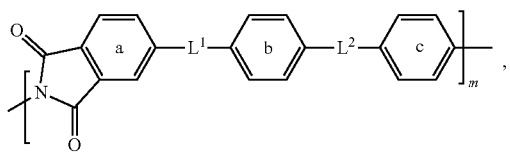

(XXX)

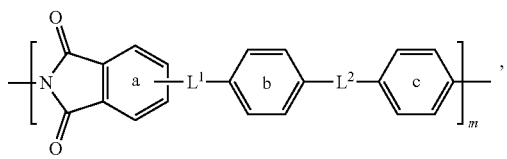

(XXXI)

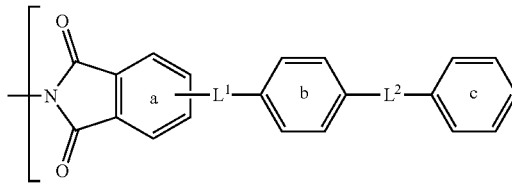

(XXXII)

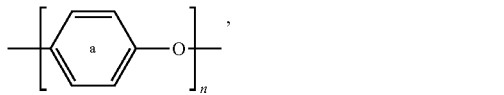

(XXXIII)

$-\!\!\!-\!\!\{Ar\}\!-\!\!\!-$ , (XXXIV)

or a salt thereof, wherein:

each of $R^1$, $R^2$, $R^3$, $R^7$, $R^8$, $R^9$, and $R^{10}$ is, independently, an electron-withdrawing moiety, H, optionally substituted aliphatic, alkyl, heteroaliphatic, heteroalkylene, aromatic, aryl, or arylalkylene, wherein at least one of $R^7$ or $R^8$ can include the electron-withdrawing moiety or wherein a combination of $R^7$ and $R^8$ or $R^9$ and $R^{10}$ can be taken together to form an optionally substituted cyclic group;

each Ak is or comprises an optionally substituted aliphatic, alkylene, haloalkylene, heteroaliphatic, or heteroalkylene;

each Ar is or comprises an optionally substituted arylene or aromatic;

each of L, $L^1$, $L^2$, $L^3$, and $L^4$ is, independently, a linking moiety;

each of n, n1, n2, n3, n4, m, m1, m2, and m3 is, independently, an integer of 1 or more;

q is 0, 1, 2, or more;

each of rings a-i can be optionally substituted; and rings a-i, $R^7$, $R^8$, $R^9$, and $R^{10}$ can optionally include an ionizable or ionic moiety.

In particular embodiments (e.g., of formula (XIV) or (XV)), each of the nitrogen atoms on rings a and/or b are substituted with optionally substituted aliphatic, alkyl, aromatic, aryl, an ionizable moiety, or an ionic moiety. In some embodiments, one or more hydrogen or fluorine atoms (e.g., in formula (XIX) or (XX)) can be substituted to include an ionizable moiety or an ionic moiety (e.g., any described herein). In other embodiments, the oxygen atoms present in the polymeric structure (e.g., in formula XXVIII) can be associated with an alkali dopant (e.g., K+).

In particular examples, Ar, one or more of rings a-i (e.g., rings a, b, f, g, h, or i), L, $L^1$, $L^2$, $L^3$, $L^4$, Ak, $R^7$, $R^8$, $R^9$, and/or $R^{10}$ can be optionally substituted with one or more ionizable or ionic moieties and/or one or more electron-withdrawing groups. Yet other non-limiting substituents for Ar, rings (e.g., rings a-i), L, Ak, $R^7$, $R^8$, $R^9$, and $R^{10}$ include one or more described herein, such as cyano, hydroxy, nitro, and halo, as well as optionally substituted aliphatic, alkyl, alkoxy, alkoxyalkyl, amino, aminoalkyl, aryl, arylalkylene, aryloyl, aryloxy, arylalkoxy, hydroxyalkyl, and haloalkyl.

In some embodiments, each of $R^1$, $R^2$, and $R^3$ is, independently, H, optionally substituted aromatic, aryl, aryloxy, or arylalkylene. In other embodiments (e.g., of formulas (I)-(V) or (XII)), $R^7$ includes the electron-withdrawing moiety. In yet other embodiments, $R^8$, $R^9$, and/or $R^{10}$ includes an ionizable or ionic moiety.

In one instance, a polymeric subunit can lack ionic moieties. Alternatively, the polymeric subunit can include an ionic moiety on the Ar group, the L group, both the Ar and L groups, or be integrated as part of the L group. Non-limiting examples of ionizable and ionic moieties include cationic, anionic, and multi-ionic group, as described herein.

In any embodiment herein, the electron-withdrawing moiety can include or be an optionally substituted haloalkyl, cyano (CN), phosphate (e.g., —O(P=O)(OR$^{P1}$)(OR$^{P2}$) or —O—[P(=O)(OR$^{P1}$)—O]$_{P3}$—R$^{P2}$), sulfate (e.g., —O—S(=O)$_2$(OR$^{S1}$)), sulfonic acid (—SO$_3$H), sulfonyl (e.g., —SO$_2$—CF$_3$), difluoroboranyl (—BF$_2$), borono (B(OH)$_2$), thiocyanato (—SCN), or piperidinium. Yet other non-limiting phosphate groups can include derivatives of phosphoric acid, such as orthophosphoric acid, pyrophosphoric acid, tripolyphosphoric acid, tetrapolyphosphoric acid, trimetaphosphoric acid, and/or phosphoric anhydride, or combinations thereof.

Yet other polymeric units can include poly(benzimidazole) (PBI), polyphenylene (PP), polyimide (PI), poly(ethyleneimine) (PEI), sulfonated polyimide (SPI), polysulfone (PSF), sulfonated polysulfone (SPSF), poly(ether ketone) (PEEK), PEEK with cardo groups (PEEK-WC), polyethersulfone (PES), sulfonated polyethersulfone (SPES), sulfonated poly(ether ketone) (SPEEK), SPEEK with cardo groups (SPEEK-WC), poly(p-phenylene oxide) (PPO), sulfonated polyphenylene oxide (SPPO), ethylene tetrafluoroethylene (ETFE), polytetrafluoroethylene (PTFE), poly(epichlorohydrin) (PECH), poly(styrene) (PS), sulfonated poly(styrene) (SPS), hydrogenated poly(butadiene-styrene) (HPBS), styrene divinyl benzene copolymer (SDVB), styrene-ethylene-butylene-styrene (SEBS), sulfonated bisphenol-A-polysulfone (SPSU), poly(4-phenoxy benzoyl-1,4-phenylene) (PPBP), sulfonated poly(4-phenoxy benzoyl-1,4-phenylene) (SPPBP), poly(vinyl alcohol) (PVA), poly(phosphazene), poly(aryloxyphosphazene), polyetherimide, as well as combinations thereof.

Crosslinking

In some embodiments, crosslinking is present within an ion conducting polymer layer and/or between ion conducting polymer layers. Crosslinking within a material can be promoted by use of crosslinking reagents. For instance, the composition can include polymeric units, and a crosslinking reagent can be used to provide crosslinking between polymeric units. For instance, if the polymeric units (P1 and P2) include a leaving group, then a diamine crosslinking reagent (e.g., $H_2N-Ak-NH_2$) can be used to react with the polymeric units by displacing the leaving group and forming an amino-containing crosslinker within the composition (e.g., thereby forming P1-NH-Ak-NH-P2). Crosslinkers can be introduced by forming a polymer composition and then exposing the composition to a crosslinking reagent to form crosslinker.

Depending on the functional group present in the material, the crosslinking reagent can include a nucleophilic group (e.g., an amine or a hydroxyl) or an electrophilic group (e.g., a carbonyl). Thus, non-limiting crosslinking reagents can include amine-containing reagents, hydroxyl-containing reagents, carboxylic acid-containing reagents, acyl halide-containing reagents, or others. Further crosslinking reagents can include:

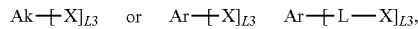

in which Ak is an optionally substituted aliphatic or alkylene; Ar is an optionally substituted aromatic or arylene; L is a linking moiety (e.g., any herein, such as a covalent bond, optionally substituted alkylene, aliphatic, etc.); L3 is an integer that is 2 or more (e.g., 2, 3, 4, 5, 6, or more); and X is halo, hydroxyl, optionally substituted amino (e.g., $NR^{N1}R^{N2}$, in which each of $R^{N1}$ and $R^{N2}$ is, independently, H or optionally substituted alkyl), hydroxyl, carboxyl, acyl halide (e.g., —C(O)—R, in which R is halo), carboxyaldehyde (e.g., —C(O)H), or optionally substituted alkyl. Non-limiting crosslinking reagents can include terephthalaldehyde, glutaraldehyde, ortho-xylene, para-xylene, meta-xylene, or a multivalent amine, such as diamine, triamine, tetraamine, pentaamine, etc., including 1,6-diaminohexane (hexanediamine), 1,4-diaminobutane, 1,8-diaminooctane, propane-1,2,3-triamine, [1,1':3',1''-terphenyl]-4,4'',5'-triamine, and others.

After reacting the crosslinking reagent, the composition can include one or more crosslinkers within the composition. If the crosslinking reagent is bivalent, then a crosslinker can be present between two of any combination of polymeric structures, polymeric units, and ionizable/ionic moieties (e.g., between two polymeric units, between two ionizable/ionic moieties, etc.). If the crosslinking reagent is trivalent or of higher n valency, then the crosslinker can be present between any n number of polymeric units, linking moieties, ionizable moieties, and/or ionic moieties. Non-limiting crosslinkers present in the composition include those formed after reacting a crosslinking reagent. Thus, examples of crosslinkers can include:

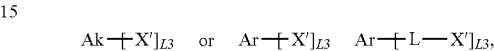

in which Ak is an optionally substituted aliphatic or an optionally substituted alkylene, Ar is an optionally substituted aromatic or an optionally substituted arylene, L is a linking moiety (e.g., any herein, such as a covalent bond, optionally substituted alkylene, optionally substituted aliphatic, etc.), L3 is an integer that is 2 or more (e.g., 2, 3, 4, 5, 6, or more), and X' is a reacted form of X. In some embodiments, X' is absent, —O—, —$NR^{N1}$—, —C(O)—, or -Ak-, in which $R^{N1}$ is H or optionally substituted alkyl, and Ak is optionally substituted alkylene, optionally substituted heteroalkylene, optionally substituted aliphatic, or optionally substituted heteroaliphatic.

Ionizable and Ionic Moieties

The polymers described herein include one or more ionizable or ionic moieties. Such moieties can include an anionic or cationic charge, such as in an ionic moiety. Alternatively, an ionizable moiety includes a functional group that can be readily converted into an ionic moiety, such as an ionizable moiety of a carboxy group (—$CO_2H$) that can be readily deprotonated to form a carboxylate anion (—$CO_2^-$). As used herein, the terms "ionizable" and "ionic" are used interchangeably.

Moieties can be characterized as an acidic moiety (e.g., a moiety can be deprotonated or can carry a negative charge) or a basic moiety (e.g., a moiety that can be protonated or carry a positive charge). In particular embodiments, the moiety can be a multi-ionic moiety, which can include a plurality of acidic moieties, a plurality of basic moieties, or a combination thereof (e.g., such as in a zwitterionic moiety). Further moieties can include a zwitterionic moiety, such as those including an anionic moiety (e.g., hydroxyl or a deprotonated hydroxyl) and a cationic moiety (e.g., ammonium).

The ionic moieties herein can be connected to the parent structure by way of one or more linking moieties. Furthermore, a single ionic moiety can be extended from a single linking moiety, or a plurality of ionic moieties can have one or more linking moieties therebetween. For instance, the ionic moiety can have any of the following structures: $-L^A-X^A$ or $-L^A-(L^{A'}-X^A)_{L2}$ or $-L^A-(X^A-L^{A'}-X^{A'})_{L2}$ or $-L^A-X^A-L^{A'}-X^{A'}-L^{A''}-X^{A''}$ in which each $L^A$, $L^{A'}$, and $L^{A''}$ is a linking moiety (e.g., any described herein); each $X^A$, $X^{A'}$, and $X^{A''}$ includes, independently, an acidic moiety, a basic moiety, a multi-ionic moiety, a cationic moiety, or an anionic moiety; and L2 is an integer of 1, 2, 3, or more (e.g., from 1 to 20). Non-limiting $L^A$ and $L^{A1'}$ can be —$(CH_2)_{L1}$—, —O$(CH_2)_{L1}$—, —$(CF_2)_{L1}$—, —O$(CF_2)_{L1}$—, or —S$(CF_2)_{L1}$—, in which L1 is an integer from 1 to 3; and $X^A$ is any ionizable or ionic moiety described herein.

Non-limiting ionizable or ionic moieties include carboxy ($-CO_2H$), carboxylate anion ($-CO_2^-$), guanidinium cation, sulfo ($-SO_2OH$), sulfonate anion ($-SO_2O^-$), sulfonium cation, sulfate, sulfate anion, phosphono (e.g., $-P(=O)(OH)_2$), phosphonate anion, phosphate, phosphate anion, phosphonium cation, phosphazenium cation, amino (e.g., $-NR^{N1}R^{N2}$), ammonium cation (e.g., aliphatic or aromatic ammonium), heterocyclic cation (e.g., including piperidinium, pyrrolidinium, pyridinium, pyrazolium, imidazolium, quinolinium, isoquinolinium, acridinium, quinolinium, isoquinolinium, acridinium, pyridazinium, pyrimidinium, pyrazinium, phenazinium, 1,4-diazabicyclo[2.2.2]octane (DABCO) cation, 4-methyl-1,4-diazoniabicyclo[2.2.2]octan-1-yl (MAABCO) cation), and 1-benzyl-1,4-diazoniabicyclo[2.2.2]octane (BABCO) cation), or a salt form thereof. Such moieties can be associated with one or more counterions. For instance, a cationic moiety can be associated with one or more anionic counterions, and an anionic moiety can be associated with one or more cationic counterions.

Arylene Groups

Particular moieties herein (e.g., polymeric units, linking moieties, and others) can include an optionally substituted arylene. Such arylene groups include any multivalent (e.g., bivalent, trivalent, tetravalent, etc.) groups having one or more aromatic groups, which can include heteroaromatic groups. Non-limiting aromatic groups (e.g., for Ar) can include any of the following:

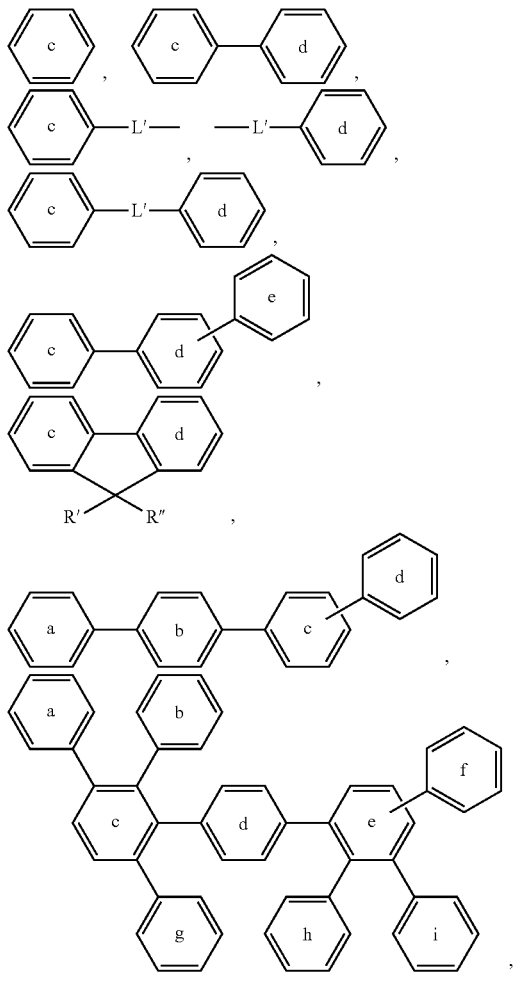

in which each of rings a-i can be optionally substituted (e.g., with any optional substituents described herein for alkyl or aryl; or with any ionic moiety described herein); L' is a linking moiety (e.g., any described herein); and each of R' and R" is, independently, H, optionally substituted alkyl, optionally substituted aryl, or an ionic moiety, as described herein. Non-limiting substituents for rings a-i include one or more described herein for aryl, such as alkyl, alkoxy, alkoxyalkyl, amino, aminoalkyl, aryl, arylalkylene, aryloyl, aryloxy, arylalkoxy, cyano, hydroxy, hydroxyalkyl, nitro, halo, and haloalkyl. In some embodiments, L' is a covalent bond, $-O-$, $-NR^{N1}-$, $-C(O)-$, optionally substituted alkylene, heteroalkylene, or arylene.

Yet other non-limiting arylene can include phenylene (e.g., 1,4-phenylene, 1,3-phenylene, etc.), biphenylene (e.g., 4,4'-biphenylene, 3,3'-biphenylene, 3,4'-biphenylene, etc.), terphenylene (e.g., 4,4'-terphenylene), diphenyl ether, anthracene (e.g., 9,10-anthracene), naphthalene (e.g., 1,5-naphthalene, 1,4-naphthalene, 2,6-naphthalene, 2,7-naphthalene, etc.), tetrafluorophenylene (e.g., 1,4-tetrafluorophenylene, 1,3-tetrafluorophenylene), and the like.

Non-limiting examples of linking moieties for arylene include any herein. In some embodiments, L' is substituted one or more ionizable or ionic moieties described herein. In particular embodiments, L' is optionally substituted alkylene. Non-limiting substitutions for L' can include -$L^A$-$X^A$, in which $L^A$ is a linking moiety (e.g., any described herein, such as, -Ak-, $-O-Ak-$, -Ak-O$-$, $-Ar-$, $-O-Ar-$, or $-Ar-O-$, in which Ak is optionally substituted alkylene and Ar is optionally substituted arylene), and $X^A$ is an acidic moiety, a basic moiety, or a multi-ionic moiety.

Linking Moieties

Particular chemical functionalities herein can include a linking moiety, either between the parent structure and another moiety (e.g., an ionic moiety) or between two (or more) other moieties. Linking moieties (e.g., L, $L^1$, $L^2$, $L^3$, $L^4$, $L^A$, $L^{A'}$, $L^{A''}$, $L^{B'}$, $L^{B''}$, $L^{8A}$, and others) can be any useful multivalent group, such as multivalent forms of optionally substituted aliphatic, heteroaliphatic, aromatic, or heteroaromatic.

In any embodiment herein, the linking moiety (e.g., L, $L^1$, $L^2$, $L^3$, or $L^4$) includes a covalent bond, spirocyclic bond, $-O-$, $-NR^{N1}-$, $-C(O)-$, $-C(O)O-$, $-OC(O)-$, $-SO_2-$, optionally substituted aliphatic, alkylene (e.g., $-CH_2-$, $-C(CH_3)_2-$, or $-CR_2-$, in which R is H, alkyl, or haloalkyl), alkyleneoxy, haloalkylene (e.g., $-CF_2-$ or $-C(CF_3)_2-$), hydroxyalkylene, heteroaliphatic, heteroalkylene, aromatic, arylene, aryleneoxy, heterocycle, heterocyclyldiyl, $-SO_2-NR^{N1}$-Ak-, $-(O$-Ak$)_{L1}$-$SO_2$-$NR^{N1}$-Ak-, -Ak-, -Ak-(O-Ak)$_{L1}$-, $-(O$-Ak$)_{L1}$-, -(Ak-O)$_{L1}$-, $-C(O)O$-Ak-, $-Ar-$, or $-Ar-O-$, as well as combinations thereof. In particular embodiments, Ak is optionally substituted aliphatic, alkylene, or haloalkylene; $R^{N1}$ is H, optionally substituted alkyl, or aryl; Ar is an optionally substituted aromatic or arylene; and L1 is an integer from 1 to 3.

In other embodiments, L is an optionally substituted $C_{1-6}$ aliphatic, $C_{1-6}$ alkylene, or $C_{1-6}$ heteroalkylene. The use of short linkers could provide more extensive polymeric networks, as shorter linkers could minimize self-cyclization reactions.

In some embodiments, the linking moiety is $-(CH_2)_{L1}-$, $-O(CH_2)_{L1}-$, $-(CF_2)_{L1}-$, $-O(CF_2)_{L1}-$, or $-S(CF_2)_{L1}-$ in which L1 is an integer from 1 to 3. In other embodiments, the linking moiety is -Ak-O$-$Ar-Ak-O-Ak- or -Ak-O$-$Ar$-$, in which Ak is optionally substituted alkylene or haloalkylene, and Ar is an optionally substituted arylene. Non-limiting substituted for Ar includes —SO$_2$-Ph, in which Ph can be unsubstituted or substituted with one or more halo.

The polymers described above in the with reference to the Table and formulas (I)-(V) and (X)-(XXXIV), including homopolymers and copolymers thereof and which may be optionally crosslinked and may include any of the linking moieties, arylene groups, and ionic moieties as described above may be used as appropriate in one or more layers of the MEA including a cathode catalyst layer, an anode catalyst layer, a polymer electrolyte membrane (PEM) layer, a cathode buffer layer, and/or an anode buffer layer.

Bipolar MEA for CO$_x$ Reduction

In certain embodiments, the MEA includes a bipolar interface with an anion-conducting polymer on the cathode side of the MEA and an interfacing cation-conducting polymer on the anode side of the MEA. In some implementations, the cathode contains a first catalyst and an anion-conducting polymer. In certain embodiments, the anode contains a second catalyst and a cation-conducting polymer. In some implementations, a cathode buffer layer, located between the cathode and PEM, contains an anion-conducting polymer. In some embodiments, an anode buffer layer, located between the anode and PEM, contains a cation-conducting polymer.

During operation, an MEA with a bipolar interface moves ions through a polymer-electrolyte, moves electrons through metal and/or carbon in the cathode and anode layers, and moves liquids and gas through pores in the layers.

In embodiments employing an anion-conducting polymer in the cathode and/or in a cathode buffer layer, the MEA can decrease or block unwanted reactions that produce undesired products and decrease the overall efficiency of the cell. In embodiments employing a cation-conducting polymer in the anode and/or in an anode buffer layer can decrease or block unwanted reactions that reduce desired product production and reduce the overall efficiency of the cell.

For example, at levels of electrical potential used for cathodic reduction of CO$_2$, hydrogen ions may be reduced to hydrogen gas. This is a parasitic reaction; current that could be used to reduce CO$_2$ is used instead to reduce hydrogen ions. Hydrogen ions may be produced by various oxidation reactions performed at the anode in a CO$_2$ reduction reactor and may move across the MEA and reach the cathode where they can be reduced to produce hydrogen gas. The extent to which this parasitic reaction can proceed is a function of the concentration of hydrogen ions present at the cathode. Therefore, an MEA may employ an anion-conducting material in the cathode layer and/or in a cathode buffer layer. The anion-conducting material at least partially blocks hydrogen ions from reaching catalytic sites on the cathode. As a result, parasitic production of hydrogen gas generation is decreased and the rate of CO or other product production and the overall efficiency of the process are increased.

Another process that may be avoided is transport of carbonate or bicarbonate ions to the anode, effectively removing CO$_2$ from the cathode. Aqueous carbonate or bicarbonate ions may be produced from CO$_2$ at the cathode. If such ions reach the anode, they may decompose and release gaseous CO$_2$. The result is net movement of CO$_2$ from the cathode to the anode, where it does not get reduced and is lost with oxidation products. To prevent the carbonate and bicarbonate ion produced at the cathode from reaching the anode, the polymer-electrolyte membrane and/or an anode buffer layer may include a cation-conducting polymer, which at least partially blocks the transport of negative ions such as bicarbonate or carbonate ions to the anode.

Thus, in some designs, a bipolar membrane structure raises the pH at the cathode to facilitate CO$_2$ reduction while a cation-conducting polymer such as a proton-exchange layer prevents the passage of significant amounts of CO$_2$, negative ions (e.g. bicarbonate, carbonate), hydrogen, and CO$_2$ reduction products (e.g., CO, methane, ethylene, alcohols) to the anode side of the cell.

Figure 2:
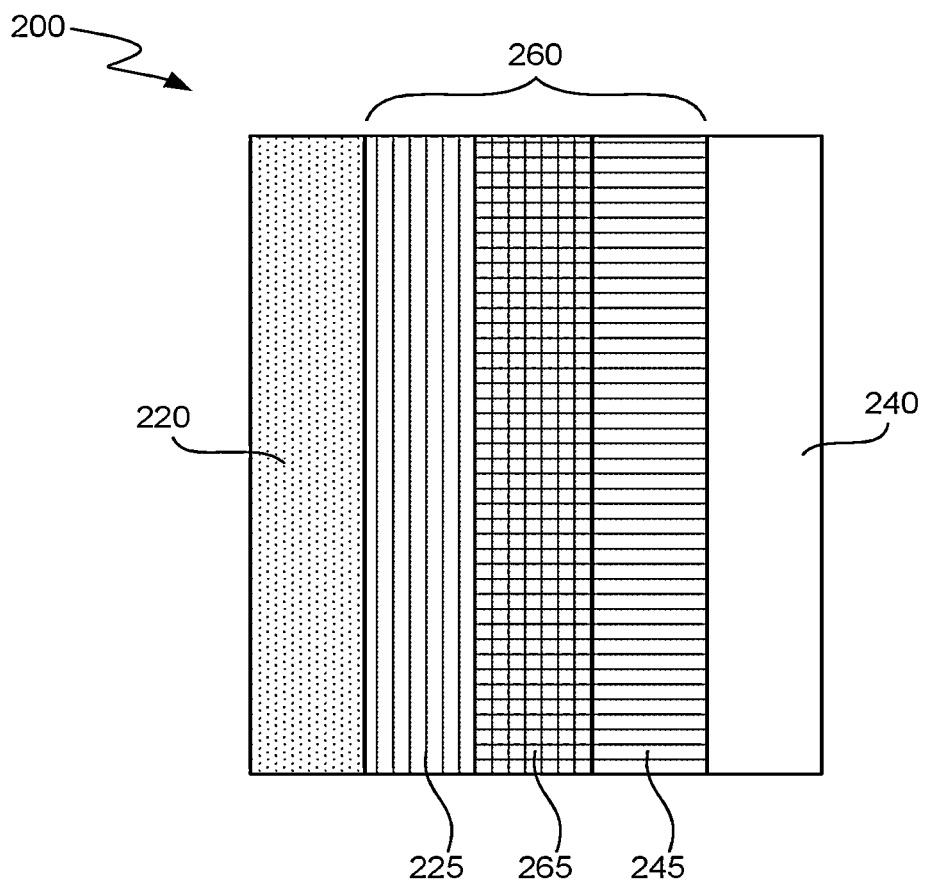
FIG. 2 is a schematic illustration of a membrane electrode assembly (MEA) for use in a $CO_x$ reduction reactor (CRR) according to various embodiments.

An example MEA 200 for use in CO$_x$ reduction is shown in FIG. 2. The MEA 200 has a cathode layer 220 and an anode layer 240 separated by an ion-conducting polymer layer 260 that provides a path for ions to travel between the cathode layer 220 and the anode layer 240. In certain embodiments, the cathode layer 220 includes an anion-conducting polymer and/or the anode layer 240 includes a cation-conducting polymer. In certain embodiments, the cathode layer and/or the anode layer of the MEA are porous. The pores may facilitate gas and/or fluid transport and may increase the amount of catalyst surface area that is available for reaction.

The ion-conducting layer 260 may include two or three sublayers: a polymer electrolyte membrane (PEM) 265, an optional cathode buffer layer 225, and/or an optional anode buffer layer 245. One or more layers in the ion-conducting layer may be porous. In certain embodiments, at least one layer is nonporous so that reactants and products of the cathode cannot pass via gas and/or liquid transport to the anode and vice versa. In certain embodiments, the PEM layer 265 is nonporous. Example characteristics of anode buffer layers and cathode buffer layers are provided elsewhere herein.

Figure 3:
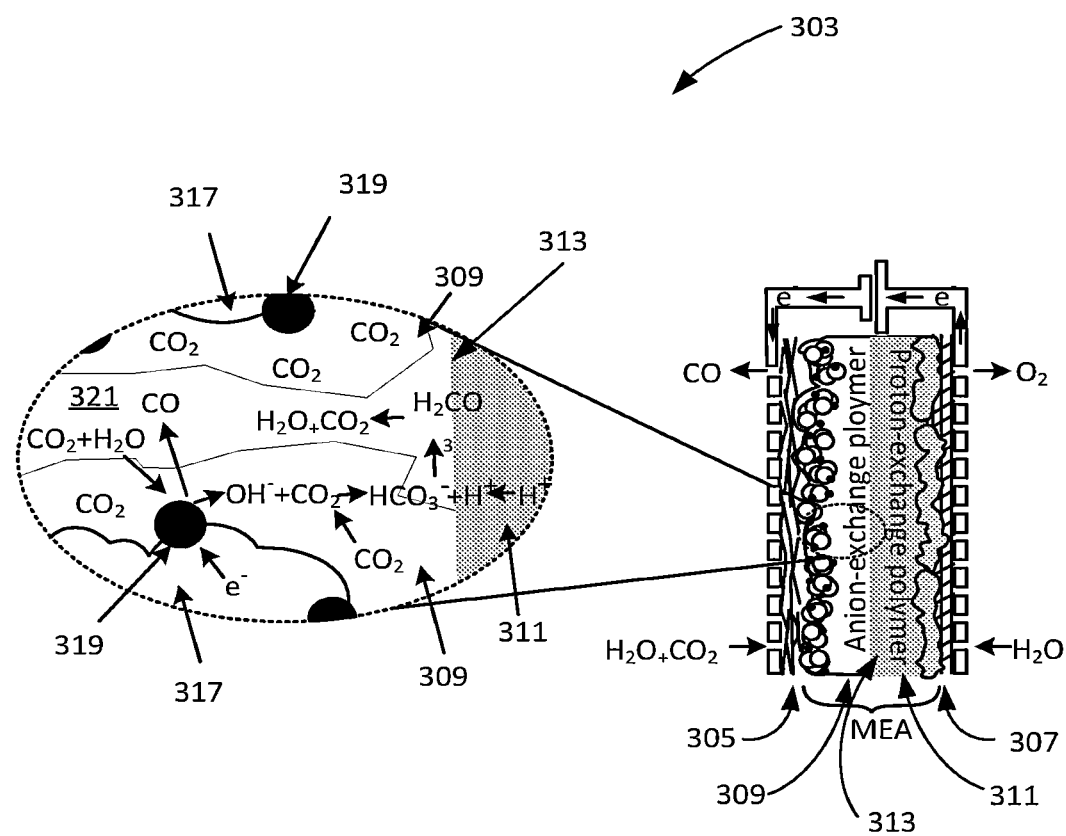
FIG. 3 is a schematic illustration of a carbon dioxide ($CO_2$) electrolyzer configured to receive water and $CO_2$ (e.g., humidified or dry gaseous $CO_2$) as a reactant at a cathode and expel carbon monoxide (CO) as a product.

FIG. 3 shows CO$_2$ electrolyzer 303 configured to receive water and CO$_2$ (e.g., humidified or dry gaseous CO$_2$) as a reactant at a cathode 305 and expel CO as a product. Electrolyzer 303 is also configured to receive water as a reactant at an anode 307 and expel gaseous oxygen. Electrolyzer 303 includes bipolar layers having an anion-conducting polymer 309 adjacent to cathode 305 and a cation-conducting polymer 311 (illustrated as a proton-exchange membrane) adjacent to anode 307.

As illustrated in the magnification inset of a bipolar interface 313 in electrolyzer 303, the cathode 305 includes an anion exchange polymer (which in this example is the same anion-conducting polymer 309 that is in the bipolar layers) electronically conducting carbon support particles 317, and metal nanoparticles 319 supported on the support particles. CO$_2$ and water are transported via pores such as pore 321 and reach metal nanoparticles 319 where they react, in this case with hydroxide ions, to produce bicarbonate ions and reduction reaction products (not shown). CO$_2$ may also reach metal nanoparticles 319 by transport within anion exchange polymer 315.

Hydrogen ions are transported from anode 307, and through the cation-conducting polymer 311, until they reach bipolar interface 313, where they are hindered from further transport toward the cathode by anion exchange polymer 309. At interface 313, the hydrogen ions may react with bicarbonate or carbonate ions to produce carbonic acid (H$_2$CO$_3$), which may decompose to produce CO$_2$ and water. As explained herein, the resulting CO$_2$ may be provided in gas phase and should be provided with a route in the MEA back to the cathode 305 where it can be reduced. The cation-conducting polymer 311 hinders transport of anions such as bicarbonate ions to the anode where they could react with protons and release CO$_2$, which would be unavailable to participate in a reduction reaction at the cathode.

As illustrated, a cathode buffer layer having an anion-conducting polymer may work in concert with the cathode and its anion-conductive polymer to block transport of protons to the cathode. While MEAs employing ion conducting polymers of appropriate conductivity types in the cathode, the anode, cathode buffer layer, and if present, an anode buffer layer may hinder transport of cations to the cathode and anions to the anode, cations and anions may still come in contact in the MEA's interior regions, such as in the membrane layer.

As illustrated in FIG. 3, bicarbonate and/or carbonate ions combine with hydrogen ions between the cathode layer and the anode layer to form carbonic acid, which may decompose to form gaseous $CO_2$. It has been observed that MEAs sometime delaminate, possibly due to this production of gaseous $CO_2$, which does not have an easy egress path.

The delamination problem can be addressed by employing a cathode buffer layer having pores. One possible explanation of its effectiveness is that the pores create paths for the gaseous carbon dioxide to escape back to the cathode where it can be reduced. In some embodiments, the cathode buffer layer is porous but at least one layer between the cathode layer and the anode layer is nonporous. This can prevent the passage of gases and/or bulk liquid between the cathode and anode layers while still preventing delamination. For example, the nonporous layer can prevent the direct passage of water from the anode to the cathode. The porosity of various layers in an MEA is described further at other locations herein.

Examples of Bipolar MEAs

As an example, an MEA includes a cathode layer including a reduction catalyst and a first anion-conducting polymer (e.g., Sustainion, FumaSep FAA-3, Tokuyama anion exchange polymer), an anode layer including an oxidation catalyst and a first cation-conducting polymer (e.g., PFSA polymer), a membrane layer including a second cation-conducting polymer and arranged between the cathode layer and the anode layer to conductively connect the cathode layer and the anode layer, and a cathode buffer layer including a second anion-conducting polymer (e.g., Sustainion, FumaSep FAA-3, Tokuyama anion exchange polymer) and arranged between the cathode layer and the membrane layer to conductively connect the cathode layer and the membrane layer. In this example, the cathode buffer layer can have a porosity between about 1 and 90 percent by volume, but can additionally or alternatively have any suitable porosity (including, e.g., no porosity). In other examples the cathode buffer layer can have any suitable porosity (e.g., between 0.01-95%, 0.1-95%, 0.01-75%, 1-95%, 1-90%, etc.).

Too much porosity can lower the ionic conductivity of the buffer layer. In some embodiments, the porosity is 20% or below, and in particular embodiments, between 0.1-20%, 1-10%, or 5-10%. Porosity in these ranges can be sufficient to allow movement of water and/or $CO_2$ without losing ionic conductivity. Porosity may be measured as described further below.

In a related example, the membrane electrode assembly can include an anode buffer layer that includes a third cation-conducting polymer, and is arranged between the membrane layer and the anode layer to conductively connect the membrane layer and the anode layer. The anode buffer layer preferably has a porosity between about 1 and 90 percent by volume, but can additionally or alternatively have any suitable porosity (including, e.g., no porosity). However, in other arrangements and examples, the anode buffer layer can have any suitable porosity (e.g., between 0.01-95%, 0.1-95%, 0.01-75%, 1-95%, 1-90%). As with the cathode buffer layer, in some embodiments, the porosity is 20% or below, e.g. 0.1-20%, 1-10%, or 5-10%

In an example, an anode buffer layer may be used in a MEA having a cathode catalyst layer with anion exchange polymer, a cathode buffer layer with anion-exchange polymer, a membrane with cation-exchange polymer, and an anode buffer layer with anion-exchange polymer. In such a structure, the anode buffer layer may be porous to facilitate water transport to the membrane/anode buffer layer interface. Water will be split at this interface to make protons that travel through the membrane and hydroxide that travels to the anode catalyst layer. One advantage of this structure is the potential use of low-cost water oxidation catalysts (e.g., $NiFeO_x$) that are only stable in basic conditions.

In another specific example, the membrane electrode assembly includes a cathode layer including a reduction catalyst and a first anion-conducting polymer (e.g., Sustainion, FumaSep FAA-3, Tokuyama anion exchange polymer), an anode layer including an oxidation catalyst and a first cation-conducting polymer, a membrane layer including a second anion-conducting polymer (e.g., Sustainion, FumaSep FAA-3, Tokuyama anion exchange polymer) and arranged between the cathode layer and the anode layer to conductively connect the cathode layer and the anode layer, and an anode buffer layer including a second cation-conducting polymer and arranged between the anode layer and the membrane layer to conductively connect the anode layer and the membrane layer.

An MEA containing an anion-exchange polymer membrane and an anode buffer layer containing cation-exchange polymer may be used for CO reduction. In this case, water would form at the membrane/anode buffer layer interface. Pores in the anode buffer layer could facilitate water removal. One advantage of this structure would be the use of an acid stable (e.g., $IrO_x$) water oxidation catalyst.

In a related example, the membrane electrode assembly can include a cathode buffer layer that includes a third anion-conducting polymer and is arranged between the cathode layer and the membrane layer to conductively connect the cathode layer and the membrane layer. The third anion-conducting polymer can be the same or different from the first and/or second anion-conducting polymer. The cathode buffer layer preferably has a porosity between about 1 and 90 percent by volume but can additionally or alternatively have any suitable porosity (including, e.g., no porosity). However, in other arrangements and examples, the cathode buffer layer can have any suitable porosity (e.g., between 0.01-95%, 0.1-95%, 0.01-75%, 1-95%, 1-90%). In some embodiments, the porosity is 20% or below, and in particular embodiments, between 0.1-20%, 1-10%, or 5-10%.

In an example, a cathode catalyst layer composed of Au nanoparticles 4 nm in diameter supported on Vulcan XC72R carbon and mixed with TM1 (mTPN-1) anion exchange polymer electrolyte (from Orion). Layer is ~15 μm thick, Au/(Au+C)=20 wt %, TM1 to catalyst mass ratio of 0.32, mass loading of 1.4-1.6 mg/cm2 (total Au+C), estimated porosity of 0.56. Anion-exchange polymer layer composed of TM1 and PTFE particles. PTFE is approximately 200 nm in diameter. TM1 molecular weight is 30 k-45 k. Thickness of the layer is ~15 um. PTFE may introduce porosity of about 8%. Proton-exchange membrane layer composed of perfluorosulfonic acid polymer (e.g., Nafion 117). Thickness is approximately 183 um. Membrane forms a continuous layer that prevents significant movement of gas ($CO_2$, CO, H$_2$) through the layer. Anode catalyst layer composed of Ir or IrOx nanoparticles (100-200 nm aggregates) that is 10 um thick.

Anion Exchange Membrane-Only MEA for CO$_x$ Reduction

In some embodiments, an MEA does not contain a cation-conducting polymer layer. In such embodiments, the electrolyte is not a cation-conducting polymer and the anode, if it includes an ion-conducting polymer, does not contain a cation-conducting polymer. Examples are provided herein.

An anion-exchange membrane (AEM)-only (AEM-only) MEA allows conduction of anions across the MEA. In embodiments in which none of the MEA layers has significant conductivity for cations, hydrogen ions have limited mobility in the MEA. In some implementations, an AEM-only membrane provides a high pH environment (e.g., at least about pH 7) and may facilitate CO$_2$ and/or CO reduction by suppressing the hydrogen evolution parasitic reaction at the cathode. As with other MEA designs, the AEM-only MEA allows ions, notably anions such as hydroxide ions, to move through polymer-electrolyte. The pH may be lower in some embodiments; a pH of 4 or greater may be high enough to suppress hydrogen evolution. The AEM-only MEA also permits electrons to move to and through metal and carbon in catalyst layers. In embodiments, having pores in the anode layer and/or the cathode layer, the AEM-only MEA permits liquids and gas to move through pores.

In certain embodiments, the AEM-only MEA comprises an anion-exchange polymer electrolyte membrane with an electrocatalyst layer on either side: a cathode and an anode. In some embodiments, one or both electrocatalyst layers also contain anion-exchange polymer-electrolyte.

In certain embodiments, an AEM-only MEA is formed by depositing cathode and anode electrocatalyst layers onto porous conductive supports such as gas diffusion layers to form gas diffusion electrodes (GDEs) and sandwiching an anion-exchange membrane between the gas diffusion electrodes.

In certain embodiments, an AEM-only MEA is used for CO$_2$ reduction. The use of an anion-exchange polymer electrolyte avoids low pH environment that disfavors CO$_2$ reduction. Further, water is transported away from the cathode catalyst layer when an AEM is used, thereby preventing water build up (flooding) which can block reactant gas transport in the cathode of the cell.

Water transport in the MEA occurs through a variety of mechanisms, including diffusion and electro-osmotic drag. In some embodiments, at current densities of the CO$_2$ electrolyzers described herein, electro-osmotic drag is the dominant mechanism. Water is dragged along with ions as they move through the polymer electrolyte. For a cation-exchange membrane such as Nafion membrane, the amount of water transport is well characterized and understood to rely on the pre-treatment/hydration of the membrane. Protons move from positive to negative potential (anode to cathode) with. each carrying 2-4 water molecules with it, depending on pretreatment. In anion-exchange polymers, the same type of effect occurs. Hydroxide, bicarbonate, or carbonate ions moving through the polymer electrolyte will 'drag' water molecules with them. In the anion-exchange MEAs, the ions travel from negative to positive voltage, so from cathode to anode, and they carry water molecules with them, moving water from the cathode to the anode in the process.

In certain embodiments, an AEM-only MEA is employed in CO reduction reactions. Unlike the CO$_2$ reduction reaction, CO reduction does not produce carbonate or bicarbonate anions that could transport to the anode and release valuable reactant.

Figure 4:
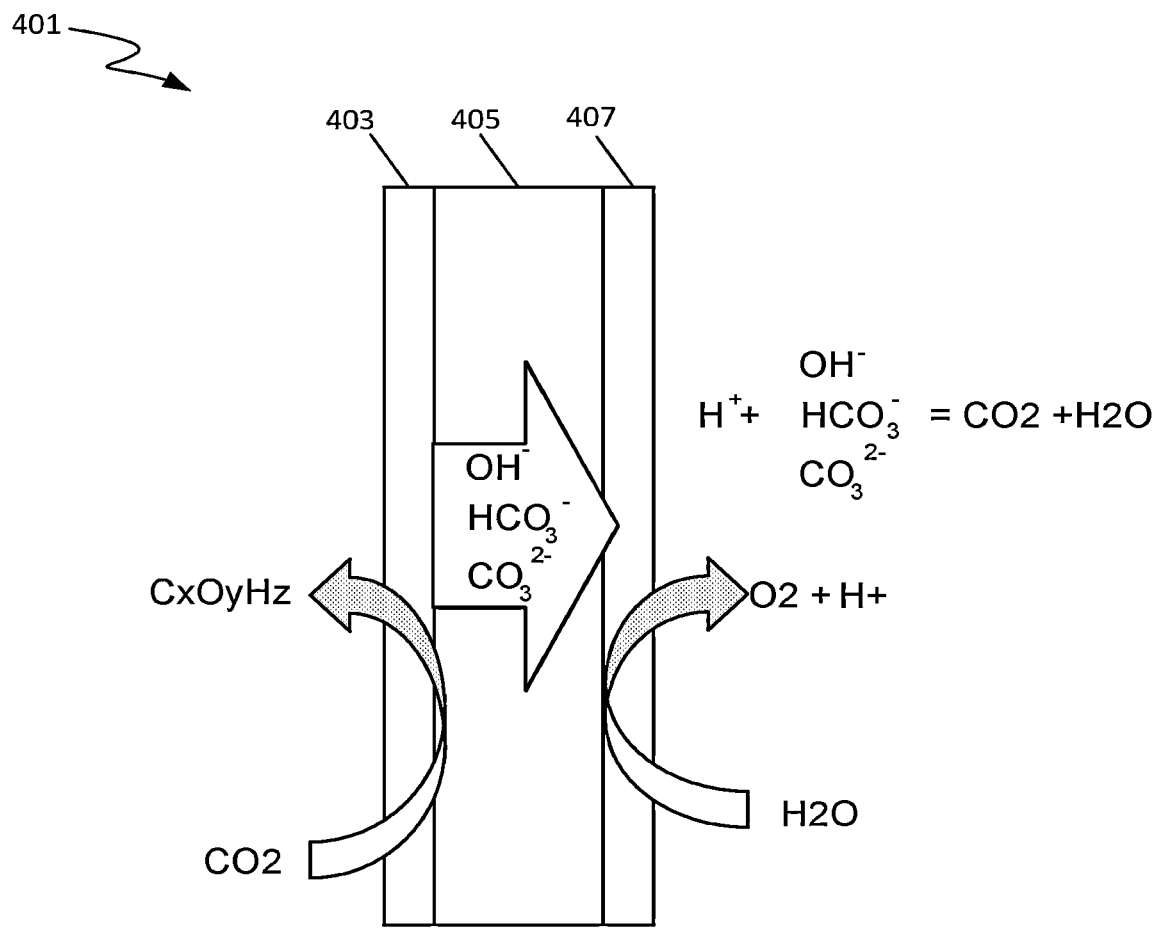
FIG. 4 illustrates an example construction of a $CO_x$ reduction MEA having a cathode catalyst layer, an anode catalyst layer, and an anion-conducting polymer electrolyte membrane (PEM).

FIG. 4 illustrates an example construction of a CO$_x$ reduction MEA 401 having a cathode catalyst layer 403, an anode catalyst layer 405, and an anion-conducting PEM 407. In certain embodiments, cathode catalyst layer 403 includes metal catalyst particles (e.g., nanoparticles) that are unsupported or supported on a conductive substrate such as carbon particles. In some implementations, cathode catalyst layer 403 additionally includes an anion-conducting polymer. The metal catalyst particles may catalyze CO$_x$ reduction, particularly at pH greater than a threshold pH, which may be pH 4-7, for example, depending on the catalyst. In certain embodiments, anode catalyst layer 405 includes metal oxide catalyst particles (e.g., nanoparticles) that are unsupported or supported on a conductive substrate such as carbon particles. In some implementations, anode catalyst layer 403 additionally includes an anion-conducting polymer. Examples of metal oxide catalyst particles for anode catalyst layer 405 include iridium oxide, nickel oxide, nickel iron oxide, iridium ruthenium oxide, platinum oxide, and the like. Anion-conducting PEM 407 may comprise any of various anion-conducting polymers such as, for example, HNN5/HNN8 by Ionomr, FumaSep by Fumatech, TM1 by Orion, PAP-TP by W7energy, Sustainion by Dioxide Materials, and the like. These and other anion-conducting polymer that have an ion exchange capacity (IEC) ranging from 1.1 to 2.6 mmol/g, working pH ranges from 0-14, bearable solubility in some organic solvents, reasonable thermal stability and mechanical stability, good ionic conductivity/ASR and acceptable water uptake/swelling ratio may be used. The polymers may be chemically exchanged to certain anions instead of halogen anions prior to use. In some embodiments, the anion-conducting polymer may have an IEC of 1 to 3.5 mmol/g.

As illustrated in FIG. 4, CO$_x$ such as CO$_2$ gas may be provided to cathode catalyst layer 403. In certain embodiments, the CO$_2$ may be provided via a gas diffusion electrode. At the cathode catalyst layer 403, the CO$_2$ reacts to produce reduction product indicated generically as C$_x$O$_y$H$_z$. Anions produced at the cathode catalyst layer 403 may include hydroxide, carbonate, and/or bicarbonate. These may diffuse, migrate, or otherwise move to the anode catalyst layer 405. At the anode catalyst layer 405, an oxidation reaction may occur such as oxidation of water to produce diatomic oxygen and hydrogen ions. In some applications, the hydrogen ions may react with hydroxide, carbonate, and/or bicarbonate to produce water, carbonic acid, and/or CO$_2$. Fewer interfaces give lower resistance. In some embodiments, a highly basic environment is maintained for C2 and C3 hydrocarbon synthesis.

Figure 5:
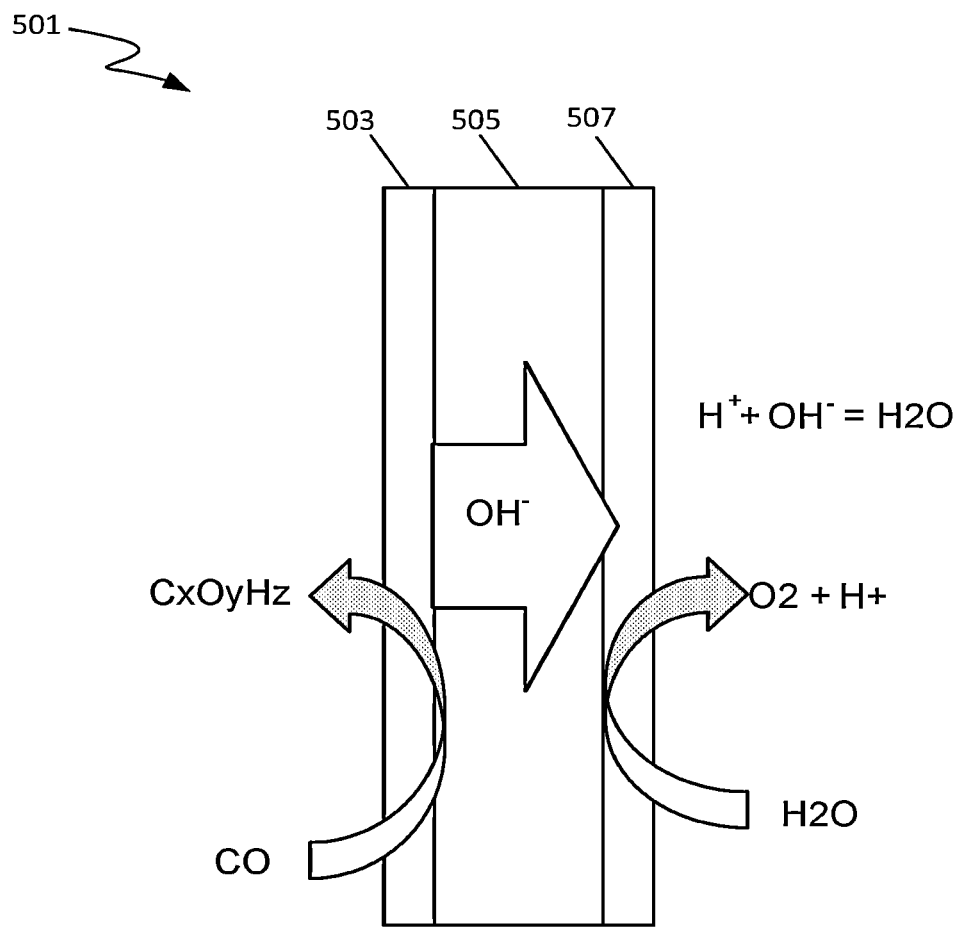
FIG. 5 illustrates an example construction of a CO reduction MEA 5 having a cathode catalyst layer, an anode catalyst layer, and an anion-conducting PEM.

FIG. 5 illustrates an example construction of a CO reduction MEA 501 having a cathode catalyst layer 503, an anode catalyst layer 505, and an anion-conducting PEM 507. Overall, the constructions of MEA 501 may be similar to that of MEA 401 in FIG. 4. However, the cathode catalyst may be chosen to promote a CO reduction reaction, which means that different reduction catalysts would be used in CO and CO$_2$ reduction embodiments.

In some embodiments, an AEM-only MEA may be advantageous for CO reduction. The water uptake number of the AEM material can be selected to help regulate moisture at the catalyst interface, thereby improving CO availability to the catalyst. AEM-only membranes can be favorable for CO reduction due to this reason. Bipolar membranes can be more favorable for $CO_2$ reduction due to better resistance to $CO_2$ dissolving and crossover in basic anolyte media.

In various embodiments, cathode catalyst layer 503 includes metal catalyst particles (e.g., nanoparticles) that are unsupported or supported on a conductive substrate such as carbon particles. In some implementations, cathode catalyst layer 503 additionally includes an anion-conducting polymer. In certain embodiments, anode catalyst layer 505 includes metal oxide catalyst particles (e.g., nanoparticles) that are unsupported or supported on a conductive substrate such as carbon particles. In some implementations, anode catalyst layer 503 additionally includes an anion-conducting polymer. Examples of metal oxide catalyst particles for anode catalyst layer 505 may include those identified for the anode catalyst layer 405 of FIG. 4. Anion-conducting PEM 507 may comprise any of various anion-conducting polymer such as, for example, those identified for the PEM 407 of FIG. 4.

As illustrated in FIG. 5, CO gas may be provided to cathode catalyst layer 503. In certain embodiments, the CO may be provided via a gas diffusion electrode. At the cathode catalyst layer 503, the CO reacts to produce reduction product indicated generically as $C_xO_yH_z$.

Anions produced at the cathode catalyst layer 503 may include hydroxide ions. These may diffuse, migrate, or otherwise move to the anode catalyst layer 505. At the anode catalyst layer 505, an oxidation reaction may occur such as oxidation of water to produce diatomic oxygen and hydrogen ions. In some applications, the hydrogen ions may react with hydroxide ions to produce water.

While the general configuration of the MEA 501 is similar to that of MEA 401, there are certain differences in the MEAs. First, MEAs may be wetter for CO reduction, helping keep the polymer electrolyte hydrated. Also, for $CO_2$ reduction, a significant amount of $CO_2$ may be transferred to the anode for an AEM-only MEA such as shown in FIG. 4. For CO reduction, there is less likely to be significant CO gas crossover. In this case, the reaction environment could be very basic. MEA materials, including the catalyst, may be selected to have good stability in high pH environment. In some embodiments, a thinner membrane may be used for CO reduction than for $CO_2$ reduction.

The MEAs disclosed herein may also be used for converting aqueous $HCO_3^-$ solutions to CO gas.

Examples of AEM-Only MEA

1. Copper metal (USRN 40 nm thick Cu, ~0.05 mg/cm$^2$) was deposited onto a porous carbon sheet (Sigracet 39BC gas diffusion layer) via electron beam deposition. Ir metal nanoparticles were deposited onto a porous titanium sheet at a loading of 3 mg/cm$^2$ via drop casting. An anion-exchange membrane from Ionomr (25-50 μm, 80 mS/cm$^2$ OH— conductivity, 2-3 mS/cm$^2$ $HCO_3^-$ conductivity, 33-37% water uptake) was sandwiched between the porous carbon and titanium sheets with the electrocatalyst layers facing the membrane.

2. Sigma Aldrich 80 nm spherical Cu nanoparticles, mixed with FumaSep FAA-3 anion exchange solid polymer electrolyte from Fumatech, FumaSep FAA-3 to catalyst mass ratio of 0.10, setup as described above.

3. The catalyst ink is made up of pure 80 nm Cu nanoparticles (Sigma Aldrich) mixed with FumaSep FAA-3 anion exchange solid polymer electrolyte (Fumatech), FumaSep FAA-3 to catalyst mass ratio of 0.09. The cathode is formed by the ultrasonic spray deposition of the catalyst ink onto a porous carbon gas diffusion layer (Sigracet 39BB). The anode is composed of IrOx metal nanoparticles spray-coated onto a porous titanium sheet. An anion exchange membrane (Ionomr Innovations, Aemion 25-50 μm thickness, 80 mS/cm$^2$ OH— conductivity, 2-3 mS/cm$^2$ $HCO_3^-$ conductivity, 33-37% water uptake) is sandwiched between the Cu catalyst-coated carbon gas diffusion layer cathode and $IrO_x$-coated porous titanium anode, with the Cu catalyst-coated side facing the membrane to compose the MEA.

U.S. Patent Application Publication No. 2017/0321334, published Nov. 9, 2017 [OPUSP001B] and US Patent Application Publication No. 20190226103, published Jul. 25, 2019 [OPUSP005], which describe various features and examples of MEAs, are incorporated herein by reference in their entireties. All publications referred to herein are incorporated by reference in their entireties as if fully set forth herein.

Individual Layers of MEA

Cathode Catalyst Layer—General Structure

As indicated above, the cathode of the MEA, which is also referred to as the cathode layer or cathode catalyst layer, facilitates COx conversion. It is a porous layer containing catalysts for $CO_x$ reduction reactions.

In some embodiments, the cathode catalyst layer contains a blend of reduction catalyst particles, electronically-conductive support particles that provide support for the reduction catalyst particles, and a cathode ion-conducting polymer. In some embodiments, the reduction catalyst particles are blended with the cathode ion-conducting polymer without a support.

Examples of materials that can be used for the reduction catalyst particles include, but are not limited, to transition metals such as V, Cr, Mn, Fe, Co, Ni, Cu, Zr, Nb, Mo, Au, Ru, Rh, Pd, Ag, Cd, Hf, Ta, W, Re, Ir, Pt, and Hg, and combinations thereof, and/or any other suitable materials. Other catalyst materials can include alkali metals, alkaline earth metals, lanthanides, actinides, and post transition metals, such as Sn, Si, Ga, Pb, Al, Tl, Sb, Te, Bi, Sm, Tb, Ce, Nd and In or combinations thereof, and/or any other suitable catalyst materials. The choice of catalyst depends on the particular reaction performed at the cathode of the CRR.

Catalysts can be in the form of nanoparticles that range in size from approximately 1 to 100 nm or particles that range in size from approximately 0.2 to 10 nm or particles in the size range of approximately 1-1000 nm or any other suitable range. In addition to nanoparticles and larger particles, films and nanostructured surfaces may be used.

If used, the electronically-conductive support particles in the cathode can be carbon particles in various forms. Other possible conductive support particles include boron-doped diamond or fluorine-doped tin oxide. In one arrangement, the conductive support particles are Vulcan carbon. The conductive support particles can be nanoparticles. The size range of the conductive support particles is between approximately 20 nm and 1000 nm or any other suitable range. It is especially useful if the conductive support particles are compatible with the chemicals that are present in the cathode when the CRR is operating, are reductively stable, and have a high hydrogen production overpotential so that they do not participate in any electrochemical reactions.

For composite catalysts such as Au/C, example metal nanoparticle sizes may range from about 1-100 nm, e.g., 2 nm-20 nm and the carbon size may be from about 20-200 nm as supporting materials. For pure metal catalyst such as Ag or Cu, the particles have a broad range from 2 nm to 500 nm in term of crystal grain size. The agglomeration could be even larger to micrometer range.

Figure 6:
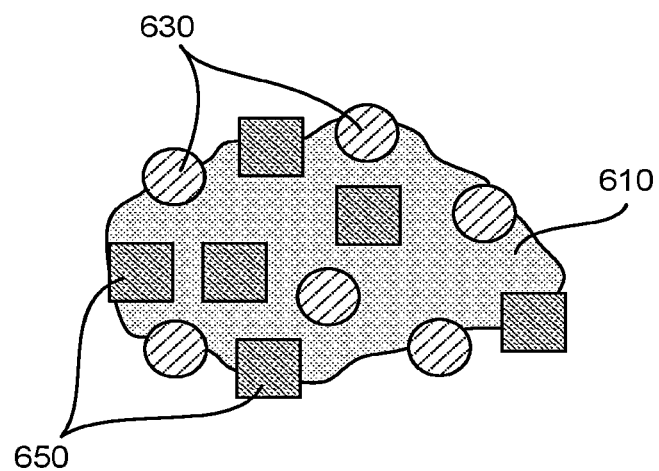
FIG. 6 is a schematic drawing that shows a possible morphology for two different kinds of catalysts supported on a catalyst support particle.
Figure 7:
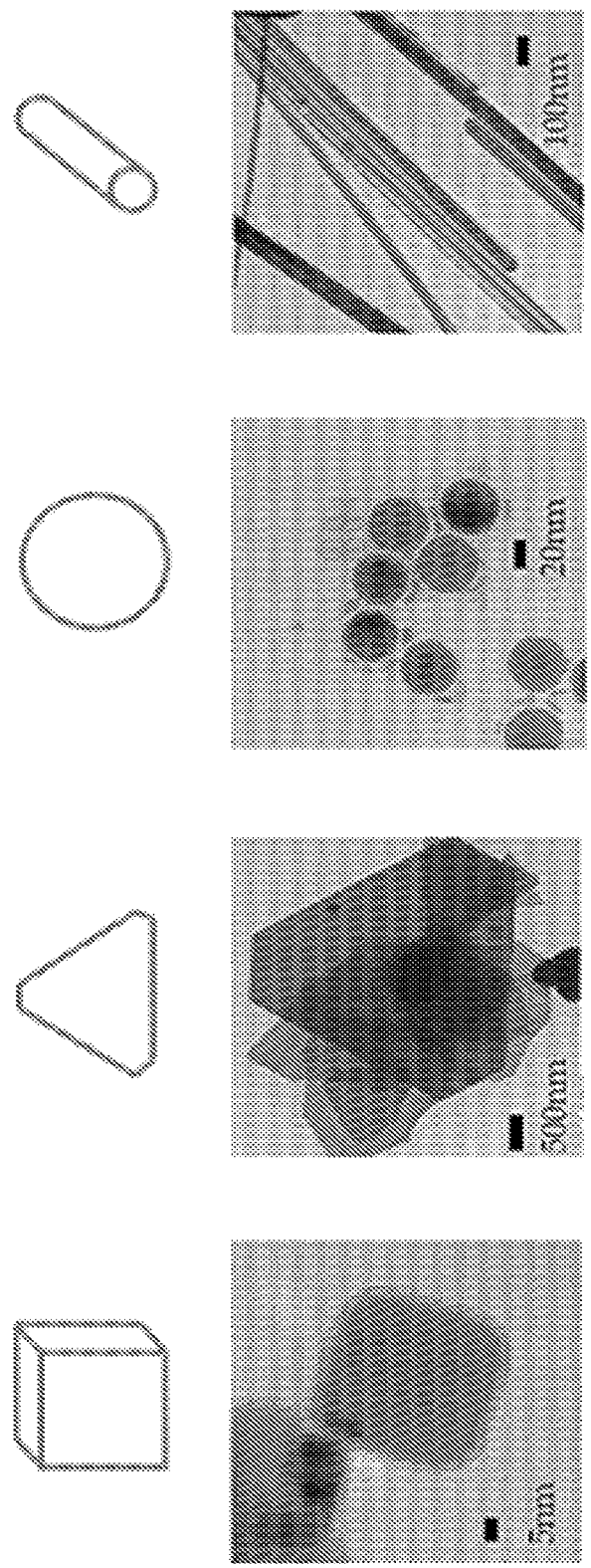
FIG. 7 shows examples of shapes and sizes of metal catalyst particles.

In general, such conductive support particles are larger than the reduction catalyst particles, and each conductive support particle can support many reduction catalyst particles. FIG. 6 is a schematic drawing that shows a possible morphology for two different kinds of catalysts supported on a catalyst support particle 610, such as a carbon particle. Catalyst particles 630 of a first type and second catalyst particles 650 of a second type are attached to the catalyst support particle 610. In various arrangements, there is only one type of catalyst particle or there are more than two types of catalyst particles attached to the catalyst support particle 610.

Using two types of catalysts may be useful in certain embodiments. For example, one catalyst may be good at one reaction (e.g., $CO_2 \rightarrow CO$) and the second good at another reaction (e.g., $CO \rightarrow CH_4$). Overall, the catalyst layer would perform the transformation of $CO_2$ to $CH_4$, but different steps in the reaction would take place on different catalysts.

The electronically-conductive support may also be in forms other than particles, including tubes (e.g., carbon nanotubes) and sheets (e.g., graphene). Structures having high surface area to volume are useful to provide sites for catalyst particles to attach.

In addition to reduction catalyst particles and electronically-conductive support particles, the cathode catalyst layer may include an ion conducting polymer. There are tradeoffs in choosing the amount of cathode ion-conducting polymer in the cathode. It can be important to include enough cathode ion-conducting polymer to provide sufficient ionic conductivity. But it is also important for the cathode to be porous so that reactants and products can move through it easily and to maximize the amount of catalyst surface area that is available for reaction. In various arrangements, the cathode ion-conducting polymer makes up somewhere in the range between 30 and 70 wt %, between 20 and 80 wt %, or between 10 and 90 wt %, of the material in the cathode layer, or any other suitable range. The wt % of ion-conducting polymer in the cathode is selected to result in the cathode layer porosity and ion-conductivity that gives the highest current density for $CO_x$ reduction. In some embodiments, it may be between 20 and 60 wt. % or between 20 and 50 wt. %. Example thicknesses of the cathode catalyst layer range from about 80 nm-300 μm.

In addition to the reduction catalyst particles, cathode ion conducting polymer, and if present, the electronically-conductive support, the cathode catalyst layer may include other additives such as PTFE.

In addition to polymer:catalyst mass ratios, the catalyst layer may be characterized by mass loading ($mg/cm^2$), and porosity. Porosity may be determined by a various manners. In one method, the loading of each component (e.g., catalyst, support, and polymer) is multiplied by its respective density. These are added together to determine the thickness the components take up in the material. This is then divided by the total known thickness to obtain the percentage of the layer that is filled in by the material. The resulting percentage is then subtracted from 1 to obtain the percentage of the layer assumed to be void space (e.g., filled with air or other gas or a vacuum), which is the porosity. Methods such as mercury porosimetry or image processing on TEM images may be used as well.

The catalyst layer may also be characterized by its roughness. The surface characteristics of the catalyst layer can impact the resistances across the membrane electrode assembly. Excessively rough catalyst layers can potentially lead to interfacial gaps between the catalyst and the microporous layer. These gaps hinder the continuous pathway for electron transfer from the current collector to the catalytic area, thus, increasing contact resistances. Interfacial gaps may also serve as locations for water accumulation that is detrimental to mass transport of reactants and products. On the other hand, extremely smooth surfaces may suffer from poor adhesion between layers. Catalyst layer roughness may influence electrical contact resistances and concentration polarization losses. Surface roughness can be measured using different techniques (e.g. mechanical stylus method, optical profilometry, or atomic force microscopy) and is defined as the high-frequency, short wavelength component of a real surface. Arithmetic mean height, Sa, is a parameter that is commonly used to evaluate the surface roughness. Numerically, it is calculated by integrating the absolute height of valleys and peaks on the surface relative to the mean plane over the entire geometric area of the sample. Catalyst layer Sa values between 0.50-1.10 μm or 0.70-0.90 μm may be used in some embodiments.

Examples of cathode catalyst layers for CO, methane, and ethylene/ethanol productions are given below.

CO production: Au nanoparticles 4 nm in diameter supported on Vulcan XC72R carbon and mixed with TM1 anion exchange polymer electrolyte from Orion. Layer is about 15 μm thick, Au/(Au+C)=30%, TM1 to catalyst mass ratio of 0.32, mass loading of 1.4-1.6 $mg/cm^2$, estimated porosity of 0.47

Methane production: Cu nanoparticles of 20-30 nm size supported on Vulcan XC72R carbon, mixed with FAA-3 anion exchange solid polymer electrolyte from Fumatech. FAA-3 to catalyst mass ratio of 0.18. Estimated Cu nanoparticle loading of ~7.1 $μg/cm^2$, within a wider range of 1-100 $μg/cm^2$ Ethylene/ethanol production: Cu nanoparticles of 25-80 nm size, mixed with FAA-3 anion exchange solid polymer electrolyte from Fumatech. FAA-3 to catalyst mass ratio of 0.10. Deposited either on Sigracet 39BC GDE for pure AEM or onto the polymer-electrolyte membrane. Estimated Cu nanoparticle loading of 270 $μg/cm^2$.

Bipolar MEA for methane production: The catalyst ink is made up of 20 nm Cu nanoparticles supported by Vulcan carbon (Premetek 40% Cu/Vulcan XC-72) mixed with FAA-3 anion exchange solid polymer electrolyte (Fumatech), FAA-3 to catalyst mass ratio of 0.18. The cathode is formed by the ultrasonic spray deposition of the catalyst ink onto a bipolar membrane including FAA-3 anion exchange solid polymer electrolyte spray-coated on Nafion (PFSA) 212 (Fuel Cell Etc) membrane. The anode is composed of IrRuOx which is spray-coated onto the opposite side of the bipolar membrane, at a loading of 3 $mg/cm^2$. A porous carbon gas diffusion layer (Sigracet 39BB) is sandwiched to the Cu catalyst-coated bipolar membrane to compose the MEA.

Bipolar MEA for ethylene production: The catalyst ink is made up of pure 80 nm Cu nanoparticles (Sigma Aldrich) mixed with FAA-3 anion exchange solid polymer electrolyte (Fumatech), FAA-3 to catalyst mass ratio of 0.09. The cathode is formed by the ultrasonic spray deposition of the catalyst ink onto a bipolar membrane including FAA-3 anion exchange solid polymer electrolyte spray-coated on Nafion (PFSA) 115 (Fuel Cell Etc) membrane. The anode is composed of IrRuOx which is spray-coated onto the opposite side of the bipolar membrane, at a loading of 3 $mg/cm^2$. A porous carbon gas diffusion layer (Sigracet 39BB) is sandwiched to the Cu catalyst-coated bipolar membrane to compose the MEA.

CO production: Au nanoparticles 4 nm in diameter supported on Vulcan XC72R carbon and mixed with TM1 anion exchange polymer electrolyte from Orion. Layer is about 14 micron thick, Au/(Au+C)=20%. TM1 to catalyst mass ratio of 0.32, mass loading of 1.4-1.6 mg/cm$^2$, estimated porosity of 0.54 in the catalyst layer.

CO production: Au nanoparticles 45 nm in diameter supported on Vulcan XC72R carbon and mixed with TM1 anion exchange polymer electrolyte from Orion. Layer is about 11 micron thick, Au/(Au+C)=60%. TM1 to catalyst mass ratio of 0.16, mass loading of 1.1-1.5 mg/cm$^2$, estimated porosity of 0.41 in the catalyst layer.

CO production: Au nanoparticles 4 nm in diameter supported on Vulcan XC72R carbon and mixed with TM1 anion exchange polymer electrolyte from Orion. Layer is about 25 micron thick, Au/(Au+C)=20%. TM1 to catalyst mass ratio of 0.32, mass loading of 1.4-1.6 mg/cm$^2$, estimated porosity of 0.54 in the catalyst layer.

The functions, materials, and structures of the components of the cathode catalyst layer are described further below.

Cathode Catalyst Layer—Functions

A primary function of the cathode catalyst layer is to provide a catalyst for $CO_x$ reduction. An example reaction is:

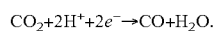

$$CO_2 + 2H^+ + 2e^- \rightarrow CO + H_2O.$$

The cathode catalyst layer also has a number of other functions that facilitate $CO_x$ conversion. These include water management, gas transport, reactant delivery to the metal catalyst, product removal, stabilizing the particulate structure of the metal catalyst, electronic and ionic conduction to the metal catalyst, and mechanical stability within the MEA.

Certain functions and challenges are particular to CRRs and are not found in MEA assemblies for other applications such as fuel cells or water electrolyzers. These challenges include that the cathode catalyst layer of the MEA transports gas (e.g., $CO_2$ or CO) in and gas (e.g., ethylene, methane, CO) or liquid (e.g., ethanol) out. The cathode catalyst layer also prevents accumulation of water that can block gas transport. Further, catalysts for $CO_x$ reduction are not as developed as catalysts like platinum that can be used in hydrogen fuel cells. As a result, the $CO_x$ reduction catalysts are generally less stable. These functions, their particular challenges, and how they can be addressed are described below.

Water Management (Cathode Catalyst Layer)

The cathode catalyst layer facilitates movement of water to prevent it from being trapped in the cathode catalyst layer. Trapped water can hinder access of $CO_x$ to the catalyst and/or hinder movement of reaction product out of the cathode catalyst layer.

Water management challenges are in many respects unique to CRRs. For example, compared to a PEM fuel cell's oxygen electrode, a CRR uses a much lower gas flow rate. A CRR also may use a lower flow rate to achieve a high utilization of the input $CO_x$. Vapor phase water removal is determined by the volumetric gas flow, thus much less vapor phase water removal is carried out in a CRR. A CRR may also operate at higher pressure (e.g., 100 psi-450 psi) than a fuel cell; at higher pressure the same molar flow results in lower volumetric flow and lower vapor phase water removal. As a result, liquid water in MEA of a CRR is present to be removed. For some MEAs, the ability to remove vapor phase water is further limited by temperature limits not present in fuel cells. For example, $CO_2$ to CO reduction may be performed at about 50° C. and ethylene and methane production may be performed at 20° C.-25° C. This is compared to typical operating temperatures of 80° C. to 120° C. for fuel cells. As a result, there is more liquid phase water to remove.

Properties that affect ability of the cathode catalyst layer to remove water include porosity; pore size; distribution of pore sizes; hydrophobicity; the relative amounts of ion conducting polymer, metal catalyst particles, and electronically-conductive support; the thickness of the layer; the distribution of the catalyst throughout the layer; and the distribution of the ion conducting polymer through the layer and around the catalyst.

A porous layer allows an egress path for water. In some embodiments, the cathode catalyst layer has a pore size distribution that includes pores having sizes of 1 nm-100 nm and pores having sizes of at least 1 micron. This size distribution can aid in water removal. The porous structures could be formed by one or more of: pores within the carbon supporting materials; stacking pores between stacked spherical carbon nanoparticles; secondary stacking pores between agglomerated carbon spheres (micrometer scale); or inert filler (e.g., PTFE) introduced porous with the interface between the PTFE and carbon also creating irregular pores ranging from hundreds of nm to micrometers.

The cathode catalyst layer may have a thickness that contributes to water management. Using a thicker layer allows the catalyst and thus the reaction to be distributed in a larger volume. This spreads out the water distribution and makes it easier to manage.

Ion-conducting polymers having non-polar, hydrophobic backbones may be used in the cathode catalyst layer. In some embodiments, the cathode catalyst layer may include a hydrophobic polymer such as PTFE in addition to the ion-conducting polymer. In some embodiments, the ion-conducting polymer may be a component of a co-polymer that also includes a hydrophobic polymer. In some embodiments, the ion-conducting polymer has hydrophobic and hydrophilic regions. The hydrophilic regions can support water movement and the hydrophobic regions can support gas movement.

Gas Transport (Cathode Catalyst Layer)

The cathode catalyst layer is structured for gas transport. Specifically, $CO_x$ is transported to the catalyst and gas phase reaction products (e.g., CO, ethylene, methane, etc.) is transported out of the catalyst layer.

Certain challenges associated with gas transport are unique to CRRs. Gas is transported both in and out of the cathode catalyst layer—$CO_x$ in and products such as CO, ethylene, and methane out. In a PEM fuel cell, gas ($O_2$ or $H_2$) is transported in but nothing or product water comes out. And in a PEM water electrolyzer, water is the reactant with $O_2$ and $H_2$ gas products.

Operating conditions including pressures, temperature, and flow rate through the reactor affect the gas transport. Properties of the cathode catalyst layer that affect gas transport include porosity; pore size and distribution; layer thickness; and ionomer distribution.

In some embodiments, the ionomer-catalyst contact is minimized. For example, in embodiments that use a carbon support, the ionomer may form a continuous network along the surface of the carbon with minimal contact with the catalyst. The ionomer, support, and catalyst may be designed such that the ionomer has a higher affinity for the support surface than the catalyst surface. This can facilitate gas transport to and from the catalyst without being blocked by the ionomer, while allowing the ionomer to conduct ions to and from the catalyst.

Ionomer (Cathode Catalyst Layer)

The ionomer may have several functions including holding particles of the catalyst layer together and allowing movement of ions through the cathode catalyst layer. In some cases, the interaction of the ionomer and the catalyst surface may create an environment favorable for $CO_x$ reduction, increasing selectivity to a desired product and/or decreasing the voltage required for the reaction. Importantly, the ionomer is an ion-conducting polymer to allow for the movement of ions through the cathode catalyst layer. Hydroxide, bicarbonate, and carbonate ions, for example, are moved away from the catalyst surface where the $CO_x$ reduction occurs. In the description below, the ionomer in the cathode catalyst layer can be referred to as a first ion-conducting polymer.

The first ion-conducting polymer can comprise at least one ion-conducting polymer that is an anion-conductor. This can be advantageous because it raises the pH compared to a proton conductor.

In some embodiments, the first ion-conducting polymer can comprise one or more covalently-bound, positively-charged functional groups configured to transport mobile negatively-charged ions. The first ion-conducting polymer can be selected from the group consisting of aminated tetramethyl polyphenylene; poly(ethylene-co-tetrafluoroethylene)-based quaternary ammonium polymer; quaternized polysulfone), blends thereof, and/or any other suitable ion-conducting polymers. The first ion-conducting polymer can be configured to solubilize salts of bicarbonate or hydroxide.

In some embodiments, the first ion-conducting polymer can comprise at least one ion-conducting polymer that is a cation-and-anion-conductor. The first ion-conducting polymer can be selected from the group consisting of polyethers that can transport cations and anions and polyesters that can transport cations and anions. The first ion-conducting polymer can be selected from the group consisting of polyethylene oxide, polyethylene glycol, polyvinylidene fluoride, and polyurethane.

A cation-and-anion conductor will raise pH (compared to a pure cation conductor.) Further, in some embodiments, it may be advantageous to use a cation-and-anion conductor to promote acid base recombination in a larger volume instead of at a 2D interface of anion-conducting polymer and cation conducting polymer. This can spread out water and $CO_2$ formation, heat generation, and potentially lower the resistance of the membrane by decreasing the barrier to the acid-base reaction. All of these may be advantageous in helping avoid the buildup of products, heat, and lowering resistive losses in the MEA leading to a lower cell voltage.

A typical anion-conducting polymer has a polymer backbone with covalently bound positively charged functional groups appended. These may include positively charged nitrogen groups in some embodiments. In some embodiments, the polymer backbone is non-polar, as described above. The polymer may be any appropriate molecular weight, e.g., 25,000 g/mol-150,000 g/mol, though it will be understood that polymers outside this range may be used.

Particular challenges for ion-conducting polymers in CRR's include that $CO_2$ can dissolve or solubilize polymer electrolytes, making them less mechanically stable, prone to swelling, and allowing the polymer to move more freely. This makes the entire catalyst layer and polymer-electrolyte membrane less mechanically stable. In some embodiments, polymers that are not as susceptible to $CO_2$ plasticization are used. Also, unlike for water electrolyzers and fuel cells, conducting carbonate and bicarbonate ions is a key parameter for $CO_2$ reduction.

The introduction of polar functional groups, such as hydroxyl and carboxyl groups which can form hydrogen bonds, leads to pseudo-crosslinked network formation. Cross-linkers like ethylene glycol and aluminum acetylacetonate can be added to reinforce the anion exchange polymer layer and suppress polymer $CO_2$ plasticization. Additives like polydimethylsiloxane copolymer can also help mitigate $CO_2$ plasticization.

According to various embodiments, the ion-conducting polymer may have a bicarbonate ionic conductivity of at least 6 mS/cm, or in some embodiments at least 12 mS/cm, is chemically and mechanically stable at temperatures 80° C. and lower, and soluble in organic solvents used during fabrication such as methanol, ethanol, and isoproponal. The ion-conducting polymer is stable (chemically and has stable solubility) in the presence of the $CO_x$ reduction products. The ion-conducting polymer may also be characterized by its ion exchange capacity, the total of active sites or functional groups responsible for ion exchange, which may range from 2.1 mmol/g-2.6 mmol/g in some embodiments. In some embodiments, ion-conducting polymers having lower IECs such as greater than 1 or 1.5 mmol/g may be used.

Examples of anion-conducting polymers are given above in above table as Class A ion-conducting polymers. A particular example of an anion-conducting polymer is Orion mTPN1 (also referred to herein as Orion TM1), which has m-triphenyl fluori-alkylene as backbone and trimethylamonium (TMA+) as cation group. The chemical structure is shown below.

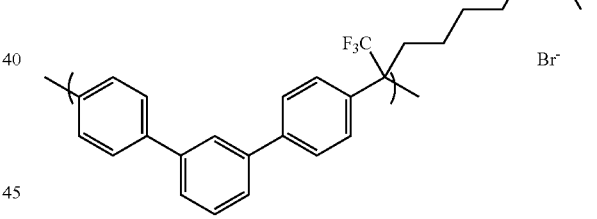

Additional examples include anion exchange membranes produced by Fumatech and Ionomr. Fumatech FumaSep FAA-3 ionomers come in Br— form. Anion exchange polymer/membrane based on polybenzimidazole produced by Ionomr comes in I— form as AF-1-HNN8-50-X.

The as-received polymer may be prepared by exchanging the anion (e.g., I−, Br−, etc.) with bicarbonate.

Also, as indicated above, in certain embodiments the ionomer may be a cation-and-anion-conducting polymer. Examples are given in the above table as Class B ion-conducting polymers.

Metal Catalyst (Cathode Catalyst Layer)

The metal catalyst catalyzes the COx reduction reaction(s). The metal catalyst is typically nanoparticles, but larger particles, films, and nanostructured surfaces may be used in some embodiments. The specific morphology of the nanoparticles may expose and stabilize active sites that have greater activity.

The metal catalyst is often composed of pure metals (e.g., Cu, Au, Ag), but specific alloys or other bimetallic systems may have high activity and be used for certain reactions. The choice of catalyst may be guided by the desired reaction. For example, for CO production, Au may be used; for methane and ethylene production, Cu may be used. Other metals including Ag, alloys, and bimetallic systems may be used. $CO_2$ reduction has a high overpotential compared to other well-known electrochemical reactions such as hydrogen evolution and oxygen evolution on known catalysts. Small amounts of contaminants can poison catalysts for $CO_2$ conversion. And as indicated above, metal catalysts such as Cu, Au, and Ag are less developed than catalysts such as platinum used in hydrogen fuel cells.

Different metal catalyst materials may be chosen at least in part based on the desired product and MEA operation. For example, the 1D nanowire (rightmost image) has a higher selectivity for ethylene production while triangular Cu nanoplates (second from left) show higher selectivity for methane. The nanocubes (far left) show good selectivity for ethylene in an AEM MEA. Gold nanoparticles with a narrow size distribution (e.g., 2-6 nm) and uniform distribution on carbon surface resulted in higher current efficiency and durability.

Metal catalyst properties that affect the cathode catalyst layer performance include size, size distribution, uniformity of coverage on the support particles, shape, loading (characterized as weight of metal/weight of metal+weight of carbon or as mass of particles per geometric area of catalyst layer), surface area (actual metal catalyst surface area per volume of catalyst layer), purity, and the presence of poisoning surface ligands from synthesis.

Nanoparticles may be synthesized by any appropriate method, such as for example, described in Phan et al., "Role of Capping Agent in Wet Synthesis of Nanoparticles," J. Phys. Chem. A 2018, 121, 17, 3213-3219; Bakshi "How Surfactants Control Crystal Growth of Nanomaterials," Cryst. Growth Des. 2016, 16, 2, 1104-1133; and Morsy "Role of Surfactants in Nanotechnology and Their Applications," Int. J. Curr. Microbiol. App. Sci. 2014, 3, 5, 237-260, which are incorporated by reference herein.

Figure 8:
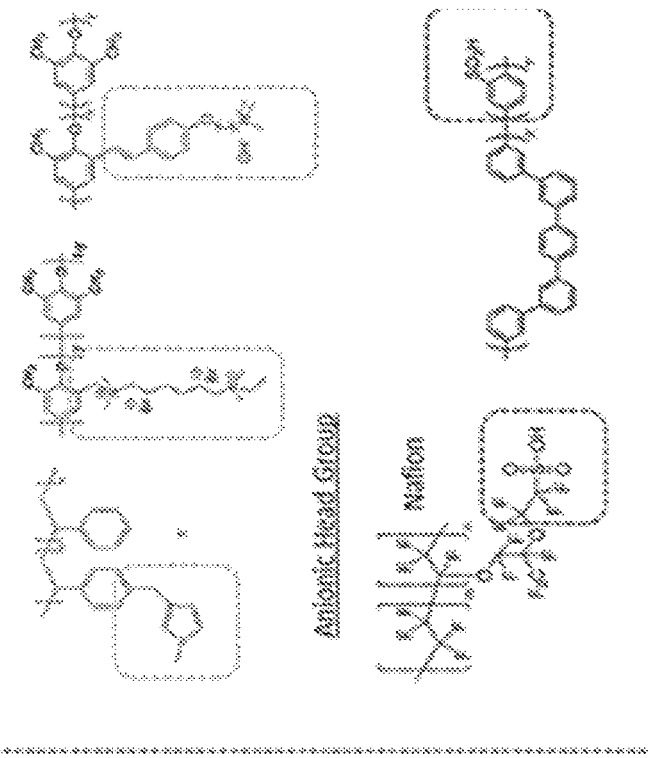
FIG. 8 shows an example of a method according to certain embodiments in which an ionomer is used as a ligand to direct the synthesis of a nanocrystal catalyst.
Figure 8:
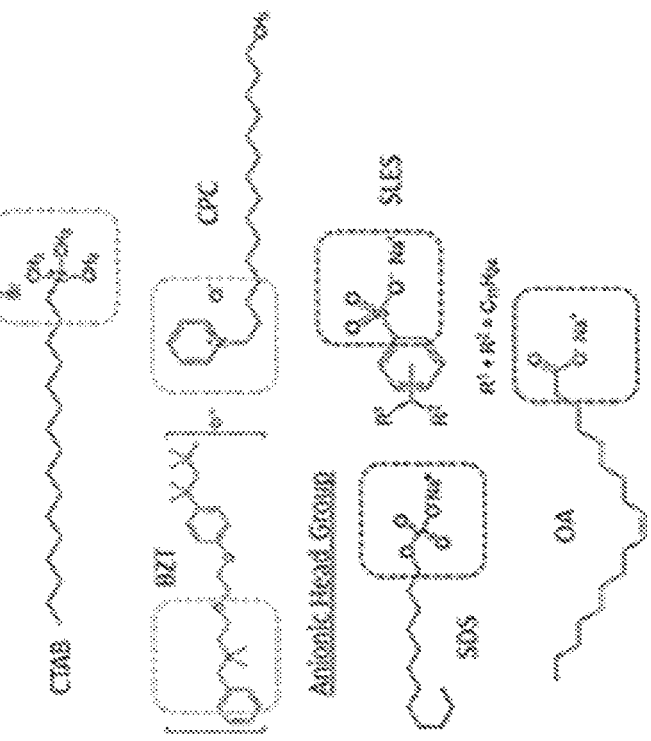

In some embodiments, metal nanoparticles are provided without the presence of poisoning surface ligands. This may be achieved by using the ionomer as a ligand to direct the synthesis of nanocrystal catalysts as illustrated in FIG. 8. The surface of the metal nanocatalysts are directly connected with ionically conductive ionomer. This avoids having to treat the catalyst surface to allow ionomer contact with the metal and improves the contact.

The metal catalyst may be disposed on a carbon support in some embodiments. For CO production, examples include Premetek 20 wt % Au supported on Vulcan XC-72R carbon with 4-6 nm Au particle size and 30% Au/C supported on Vulcan XC-72R with 5-7 nm Au particle size. For methane, examples include Premetek 20 wt % Cu supported on Vulcan XC-72R carbon with 20-30 nm Cu particle size. In some embodiments, the metal catalyst may be unsupported. For ethylene production, examples of unsupported metal catalysts include SigmaAldrich unsupported Cu 80 nm particle size and ebeam or sputter deposited thin Cu layer of 10 nm to 100 nm.

Support (Cathode Catalyst Layer)

The support of the cathode catalyst layer has several functions. It stabilizes metal nanoparticles to prevent them from agglomerating and distributes the catalytic sites throughout the catalyst layer volume to spread out loss of reactants and formation of products. It also forms an electrically conductive pathway to metal nanoparticles. Carbon particles, for example, pack together such that contacting carbon particles provide the electrically conductive pathway. Void space between the particles forms a porous network that gas and liquids can travel through.

In some embodiments, carbon supports developed for fuel cells can be used. Many different types have been developed; these are typically 50 nm-500 nm in size, and can be obtained in different shapes (spheres, nanotubes, sheets (e.g., graphene)), porosities, surface area per volume, electrical conductivity, functional groups (N-doped, O-doped, etc).

The support may be hydrophobic and have affinity to the metal nanoparticle.

Examples of carbon blacks that can be used include:
Vulcan XC-72R—Density of 256 mg/cm2, 30-50 nm
Ketjen Black-Hollow structure, Density of 100-120 mg/cm2, 30-50 nm
Printex Carbon, 20-30 nm Anode Catalyst Layer The anode of the MEA, which is also referred to as the anode layer or anode catalyst layer, facilitates oxidation reactions. It is a porous layer containing catalysts for oxidation reactions. Examples of reactions are:

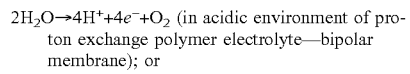
$2H_2O \rightarrow 4H^+ + 4e^- + O_2$ (in acidic environment of proton exchange polymer electrolyte—bipolar membrane); or

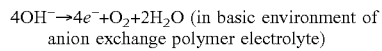
$4OH^- \rightarrow 4e^- + O_2 + 2H_2O$ (in basic environment of anion exchange polymer electrolyte)

The oxidation of other materials, such as hydrocarbons to make $CO_2$ or chloride ions to make chlorine gas, or hydrogen gas to make hydrogen ions, may also be performed.

In some embodiments, with reference to FIG. 2, the anode 240 contains a blend of oxidation catalyst and an anode ion-conducting polymer. There are a variety of oxidation reactions that can occur at the anode depending on the reactant that is fed to the anode and the anode catalyst(s). In one arrangement, the oxidation catalyst is selected from the group consisting of metals and oxides of Ir, Pt, Ni, Ru, Pd, Au, and alloys thereof, IrRu, PtIr, Ni, NiFe, stainless steel, and combinations thereof. The oxidation catalyst can further contain conductive support particles selected from the group consisting of carbon, boron-doped diamond, and titanium.

The oxidation catalyst can be in the form of a structured mesh or can be in the form of particles. If the oxidation catalyst is in the form of particles, the particles can be supported by electronically-conductive support particles. The conductive support particles can be nanoparticles. It is especially useful if the conductive support particles are compatible with the chemicals that are present in the anode 240 when the CRR is operating and are oxidatively stable so that they do not participate in any electrochemical reactions. It is especially useful if the conductive support particles are chosen with the voltage and the reactants at the anode in mind. In some arrangements, the conductive support particles are titanium, which is well-suited for high voltages. In other arrangements, the conductive support particles are carbon, which can be most useful at low voltages. In general, such conductive support particles are larger than the oxidation catalyst particles, and each conductive support particle can support many oxidation catalyst particles. An example of such an arrangement is shown in FIG. 3 and is discussed above with respect to the cathode catalyst layer. In one arrangement, the oxidation catalyst is iridium ruthenium oxide. Examples of other materials that can be used for the oxidation catalyst include, but are not limited to, those listed above. It should be understood that many of these metal catalysts can be in the form of oxides, especially under reaction conditions.

In some embodiments, the MEA has an anode layer comprising oxidation catalyst and a second ion-conducting polymer. The second ion-conducting polymer can comprise one or more polymers that contain covalently-bound, negatively-charged functional groups configured to transport mobile positively-charged ions. The second ion-conducting polymer can be selected from the group consisting of ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof. Examples of cation-conducting polymers include e.g., Nafion 115, Nafion 117, and/or Nafion 211.

There are tradeoffs in choosing the amount of ion-conducting polymer in the anode. It is important to include enough anode ion-conducting polymer to provide sufficient ionic conductivity. But it is also important for the anode to be porous so that reactants and products can move through it easily, and to maximize the amount of catalyst surface area that is available for reaction. In various arrangements, the ion-conducting polymer in the anode makes up approximately 50 wt % of the layer or between approximately 5 and 20 wt %, 10 and 90 wt %, between 20 and 80 wt %, between 25 and 70 wt %, or any suitable range. It is especially useful if the anode 240 can tolerate high voltages, such as voltages above about 1.2 V vs. a reversible hydrogen electrode. It is especially useful if the anode 240 is porous in order to maximize the amount of catalyst surface area available for reaction and to facilitate gas and liquid transport.

In one example of a metal catalyst, Ir or $IrO_x$ particles (100-200 nm) and Nafion ionomer form a porous layer approximately 10 μm thick. Metal catalyst loading is approximately 0.5-3 g/cm².

In some embodiments, NiFeOx or $NiO_x$ is used for basic reactions.

PEM (MEA Layer Description)

The MEAs include a polymer electrolyte membrane (PEM) disposed between and conductively coupled to the anode catalyst layer and the cathode catalyst layer. Referring to FIG. 2, the polymer electrolyte membrane 265 has high ionic conductivity (greater than about 1 mS/cm), and is mechanically stable. Mechanical stability can be evidenced in a variety of ways such as through high tensile strength, modulus of elasticity, elongation to break, and tear resistance. Many commercially-available membranes can be used for the polymer electrolyte membrane 265. Examples include, but are not limited to, various Nafion® formulations, GORE-SELECT, FumaPEM® (PFSA) (FuMA-Tech GmbH), and Aquivion® (PFSA) (Solvay).

In one arrangement, the PEM comprises at least one ion-conducting polymer that is a cation-conductor. The third ion-conducting polymer can comprise one or more covalently-bound, negatively-charged functional groups configured to transport mobile positively-charged ions. The third ion-conducting polymer can be selected from the group consisting of ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof.

Cathode Buffer Layer (MEA Layer Description)

Referring to FIG. 2, it is important to note that when the polymer electrolyte membrane 265 is a cation conductor and is conducting protons, it contains a high concentration of protons during operation of the CRR, while the cathode 220 operates best when a low concentration of protons is present. It can be useful to include a cathode buffer layer 225 between the polymer electrolyte membrane 265 and the cathode 220 to provide a region of transition from a high concentration of protons to a low concentration of protons. In one arrangement, the cathode buffer layer 225 is an ion-conducting polymer with many of the same properties as the ion-conducting polymer in the cathode 220. The cathode buffer layer 225 provides a region for the proton concentration to transition from the polymer electrolyte membrane 265, which has a high concentration of protons to the cathode 220, which has a low proton concentration. Within the cathode buffer layer 225, protons from the polymer electrolyte membrane 265 encounter anions from the cathode 220, and they neutralize one another. The cathode buffer layer 225 helps ensure that a deleterious number of protons from the polymer electrolyte membrane 265 does not reach the cathode 220 and raise the proton concentration. If the proton concentration of the cathode 220 is too high, COx reduction does not occur. High proton concentration is considered to be in the range of approximately 10 to 0.1 molar and low concentration is considered to be less than approximately 0.01 molar.

The cathode buffer layer 225 can include a single polymer or multiple polymers. If the cathode buffer layer 225 includes multiple polymers, the multiple polymers can be mixed together or can be arranged in separate, adjacent layers. Examples of materials that can be used for the cathode buffer layer 225 include, but are not limited to, FumaSep FAA-3, Tokuyama anion exchange membrane material, and polyether-based polymers, such as polyethylene oxide (PEO), and blends thereof. Further examples are given above in the discussion of the cathode catalyst layer.

The thickness of the cathode buffer layer is chosen to be sufficient that COx reduction activity is high due to the proton concentration being low. This sufficiency can be different for different cathode buffer layer materials. In some embodiments, the thickness of the cathode buffer layer is between approximately 200 nm and 100 μm, between 300 nm and 75 μm, between 500 nm and 50 μm, or any suitable range.

In some embodiments, the cathode buffer layer is less than 50 μm, for example between 1-25 μm such between 1-5 μm, 5-15 μm, or 10-25 μm. By using a cathode buffer layer in this range of thicknesses, the proton concentration in the cathode can be reduced while maintaining the overall conductivity of the cell. In some embodiments, an ultra-thin layer (100 nm-1 μm and in some embodiments, sub-micron) may be used. And as discussed above, in some embodiments, the MEA does not have a cathode buffer layer. In some such embodiments, anion-conducting polymer in the cathode catalyst layer is sufficient. The thickness of the cathode buffer layer may be characterized relative to that of the PEM.

Water and $CO_2$ formed at the interface of a cathode buffer layer and a PEM can delaminate the MEA where the polymer layers connect. The delamination problem can be addressed by employing a cathode buffer layer having inert filler particles and associated pores. One possible explanation of its effectiveness is that the pores create paths for the gaseous carbon dioxide to escape back to the cathode where it can be reduced.

Materials that are suitable as inert filler particles include, but are not limited to, $TiO_2$, silica, PTFE, zirconia, and alumina. In various arrangements, the size of the inert filler particles is between 5 nm and 500 $CO_2$ m, between 10 nm and 100 $CO_2$ m, or any suitable size range. The particles may be generally spherical.

If PTFE (or other filler) volume is too high, it will dilute the polymer electrolyte to the point where ionic conductivity is low. Too much polymer electrolyte volume will dilute the PTFE to the point where it does not help with porosity. In many embodiments a mass ratio of polymer electrolyte/PTFE is 0.25 to 2, and more particularly, 0.5 to 1. A volume ratio polymer electrolyte/PTFE (or, more generally, polymer electrolyte/inert filler) may be 0.25 to 3, 0.5 to 2, 0.75 to 1.5, or 1.0 to 1.5.

In other arrangements, porosity is achieved by using particular processing methods when the layers are formed. One example of such a processing method is laser ablation, where nano to micro-sized channels are formed in the layers. Another example is mechanically puncturing a layer to form channels through it. Another example is appropriately tailoring conditions during ultrasonic spray deposition of a layer to make it porous.

In one arrangement, the cathode buffer layer has a porosity between 0.01% and 95% (e.g., approximately between, by weight, by volume, by mass, etc.). However, in other arrangements, the cathode buffer layer can have any suitable porosity (e.g., between 0.01-95%, 0.1-95%, 0.01-75%, 1-95%, 1-90%). In some embodiments, the porosity is 50% or less, e.g., 0.1-50%, 5-50%, 20-50%, 5-40%, 10-40%, 20-40%, or 25%-40%. In some embodiments, the porosity is 20% or below, e.g. 0.1-20%, 1-10%, or 5-10%.

Porosity of the cathode buffer layer or any layer in the MEA may be measured as described above with respect to the catalyst layer, including using mass loadings and thicknesses of the components, by methods such as mercury porosimetry, x-ray diffraction (SAXS or WAXS), and image processing on TEM images to calculate filled space vs. empty space. Porosity is measured when the MEA is completely dry as the materials swell to varying degrees when exposed to water during operation. As described further below, the porosity may be determined using measured loading and thickness of the layer and known density of the material or materials of the layer.

Porosity in layers of the MEA, including the cathode buffer layer, is described further below.

Anode Buffer Layer (MEA Layer Description)

In some CRR reactions, bicarbonate is produced at the cathode 220. It can be useful if there is a polymer that blocks bicarbonate transport somewhere between the cathode 220 and the anode 240, to prevent migration of bicarbonate away from the cathode. It can be that bicarbonate takes some $CO_2$ with it as it migrates, which decreases the amount of $CO_2$ available for reaction at the cathode. In one arrangement, the polymer electrolyte membrane 265 includes a polymer that blocks bicarbonate transport. Examples of such polymers include, but are not limited to, Nafion® formulations, GORE-SELECT, FumaPEM® (PFSA) (FuMA-Tech GmbH), and Aquivion® (PFSA) (Solvay). In another arrangement, there is an anode buffer layer 245 between the polymer electrolyte membrane 265 and the anode 240, which blocks transport of bicarbonate. If the polymer electrolyte membrane is an anion-conductor, or does not block bicarbonate transport, then an additional anode buffer layer to prevent bicarbonate transport can be useful. Materials that can be used to block bicarbonate transport include, but are not limited to Nafion® formulations, GORE-SELECT, FumaPEM® (PFSA) (FuMA-Tech GmbH), and Aquivion® (PFSA) (Solvay). Of course, including a bicarbonate blocking feature in the ion-exchange layer 260 is not particularly desirable if there is no bicarbonate in the CRR.

In another embodiment of the invention, the anode buffer layer 245 provides a region for proton concentration to transition between the polymer electrolyte membrane 265 to the anode 240. The concentration of protons in the polymer electrolyte membrane 265 depends both on its composition and the ion it is conducting. For example, a Nafion polymer electrolyte membrane 265 conducting protons has a high proton concentration. A FumaSep FAA-3 polymer electrolyte membrane 265 conducting hydroxide has a low proton concentration. For example, if the desired proton concentration at the anode 240 is more than 3 orders of magnitude different from the polymer electrolyte membrane 265, then an anode buffer layer 245 can be useful to effect the transition from the proton concentration of the polymer electrolyte membrane 265 to the desired proton concentration of the anode. The anode buffer layer 245 can include a single polymer or multiple polymers. If the anode buffer layer 245 includes multiple polymers, the multiple polymers can be mixed together or can be arranged in separate, adjacent layers. Materials that can be useful in providing a region for the pH transition include, but are not limited to, Nafion, FumaSep FAA-3, Sustainion®, Tokuyama anion exchange polymer, and polyether-based polymers, such as polyethylene oxide (PEO), blends thereof, and/or any other suitable materials. High proton concentration is considered to be in the range of approximately 10 to 0.1 molar and low concentration is considered to be less than approximately 0.01 molar. Ion-conducting polymers can be placed in different classes based on the type(s) of ions they conduct. This has been discussed in more detail above. There are three classes of ion-conducting polymers described in Table 4 above. In one embodiment of the invention, at least one of the ion-conducting polymers in the cathode 220, anode 240, polymer electrolyte membrane 265, cathode buffer layer 225, and anode buffer layer 245 is from a class that is different from at least one of the others.

Layer Porosity

In some embodiments, one or more of the layers of the MEA include pores that allow gas and liquid transport. These pores are distinct from ion-conduction channels that allow ion conduction. In many polymer electrolytes (e.g. PFSA), ion conduction occurs through pores lined with stationary charges. The mobile cations hop between the oppositely charged stationary groups that line the ion conduction channel. Such channels may have variable width; for PFSA materials, the ion conduction channel diameter ranges from narrow areas of approximately 10 Å diameter to wider areas of approximately 40 Å diameter. In anion conducting polymer materials, the channel diameters may be larger, up to about a minimum width of 60 Å in the narrow areas of the channel.

For efficient ion conduction, the polymer-electrolyte is hydrated, so the ion conduction channels also contain water. It is common for some water molecules to move along with the mobile ions in a process termed electro-osmotic drag; typically 1-5 water molecules per mobile ion are moved via electro-osmotic drag. The ion-conducting channel structure and degree of electro-osmotic drag can vary with different polymer-electrolytes or ion-conducting materials. While these ion conducting channels allow ions to move along with some water molecules, they do not allow uncharged molecules to move through them efficiently. Nor do they allow bulk water that is not associated with ions to move through them. A solid (i.e., non-porous) membrane of a polymer electrolyte blocks the bulk of $CO_2$ and products of $CO_2$ electrolysis from passing through it. The typical permeability of $CO_2$, water, and $H_2$ through a wet Nafion 117 PFSA membrane at 30° C. are approximately $8.70\times10^6$ mol cm cm-2 s-1·Pa-1, 4.2 (mol/cm-s-bar)$\times10^9$, and 3.6 (mol/cm-s-bar)$\times10^{11}$. Permeability depends on temperature, hydration, and nature of the polymer-electrolyte material. In ion conduction channels that have variable diameters, uncharged molecules and bulk movement of liquid/gas may be blocked at least at the narrow parts of the channel.

Pores of larger diameter that the ion conduction channels described above allow the passage of bulk liquid and gas, not just ions. The polymer electrolyte membrane layer of the MEA typically does not contain this type of pore because the membrane needs to separate reactants and products at the cathode from reactants and products at the anode. However, other layers of the MEA may have this type of pore, for example, the cathode catalyst layer may be porous to allow for reactant $CO_x$ to reach the catalyst and for products of $CO_x$ reduction to move out of the catalyst layer, through the gas distribution layer, and out the flow field of the electrolyzer. As used herein, the term pore refer to pores other than the ion conduction channels in an ionomer. In some embodiments, the pores of anion conducting polymer layer in an MEA have a minimum cross-sectional dimension of at least 60 Å. In some embodiments, the pores of cation conducting polymer layer in an MEA have a minimum cross-sectional dimension of at least 20 Å. This is to distinguish pores that allow gas/liquid transport from the ion conduction channels described above.

It can be useful if some or all of the following layers are porous: the cathode 220, the cathode buffer layer 225, the anode 240 and the anode buffer layer 245. In some arrangements, porosity is achieved by combining inert filler particles with the polymers in these layers. Materials that are suitable as inert filler particles include, but are not limited to, $TiO_2$, silica, PTFE, zirconia, and alumina. In various arrangements, the size of the inert filler particles is between 5 nm and 500.mu.m, between 10 nm and 100.mu.m, or any suitable size range. In other arrangements, porosity is achieved by using particular processing methods when the layers are formed. One example of such a processing method is laser ablation, where nano to micro-sized channels are formed in the layers. Laser ablation can additionally or alternatively achieve porosity in a layer by subsurface ablation. Subsurface ablation can form voids within a layer, upon focusing the beam at a point within the layer, and thereby vaporizing the layer material in the vicinity of the point. This process can be repeated to form voids throughout the layer, and thereby achieving porosity in the layer. Sublayer by sublayer methods of forming an MEA layer such as ultrasonic spray deposition may be used to form an MEA layer having a controlled porosity. A dry deposit can lead to faster drying of layers and a more porous final deposit. One or more of high substrate temperature, slow deposition rate, high elevation of nozzle from the substrate, and high volatility of deposition ink can be used to make the layer more porous. A wet deposit can lead to slower can lead to slower drying of layers, densification and compaction of several layers for the final deposit. One or more of low substrate temperature, fast deposition rate, low elevation of spray nozzle from the substrate, and low volatility of the deposition ink can be used to make the layer less porous. For example, a room temperature ultrasonic spray deposition may result in a relatively dense layer and a 50° C. ultrasonic spray deposition may result in a relatively porous layer.

In some embodiments, the following conditions may be used to form layers having porosities of at least 1%, e.g., 1-90%, 1-50%, or 1-30% porosity: substrate temperature of at least 40° C.; deposition rate of no more than 0.8 mL/min, e.g., 0.2-0.8 mL/min; elevation of nozzle of at least 50 mm, e.g., 50-75 mm; and solvent volatility of at least 90-100% (e.g., ethanol).

In some embodiments, the following conditions may be used to form layers having non-porous layers or layers having porosities of less than 1%: substrate temperature of less than 40° C.; deposition rate of more than 0.8 mL/min and up to 10 mL/min; elevation of nozzle of less than 50 mm; and lower solvent volatility of at least 90-100% (e.g., 50-90% volatile solvent content such as ethanol or 50-100% intermediate volatility of solvent such as glycol ethers).

The volume of a void may be determined by the laser power (e.g., higher laser power corresponds to a greater void volume) but can additionally or alternatively be determined by the focal size of the beam, or any other suitable laser parameter. Another example is mechanically puncturing a layer to form channels through the layer. The porosity can have any suitable distribution in the layer (e.g., uniform, an increasing porosity gradient through the layer, a random porosity gradient, a decreasing porosity gradient through the layer, a periodic porosity, etc.).

The porosities (e.g., of the cathode buffer layer, of the anode buffer layer, of the membrane layer, of the cathode layer, of the anode layer, of other suitable layers, etc.) of the examples described above and other examples and variations preferably have a uniform distribution, but can additionally or alternatively have any suitable distribution (e.g., a randomized distribution, an increasing gradient of pore size through or across the layer, a decreasing gradient of pore size through or across the layer, etc.). The porosity can be formed by any suitable mechanism, such as inert filler particles (e.g., diamond particles, boron-doped diamond particles, polyvinylidene difluoride/PVDF particles, polytetrafluoroethylene/PTFE particles, etc.) and any other suitable mechanism for forming substantially non-reactive regions within a polymer layer. The inert filler particles can have any suitable size, such as a minimum of about 10 nanometers and a maximum of about 200 nanometers, and/or any other suitable dimension or distribution of dimensions.

As discussed above, the cathode buffer layer preferably has a porosity between about 1 and 90 percent by volume but can additionally or alternatively have any suitable porosity (including, e.g., no porosity). However, in other arrangements and examples, the cathode buffer layer can have any suitable porosity (e.g., between 0.01-95%, 0.1-95%, 0.01-75%, 1-95%, 1-90%, etc.). in some embodiments, the porosity is 20% or below, e.g. 0.1-20%, 1-10%, or 5-10%.

In some embodiments, the cathode buffer layer is porous but at least one layer between the cathode layer and the anode layer is nonporous. This can prevent the passage of gases and/or bulk liquid between the cathode and anode layers while still preventing delamination. For example, the nonporous layer can prevent the direct passage of water from the anode to the cathode.

Porosity of the cathode buffer layer or any layer in the MEA may be measured as described above with respect to the catalyst layer, including using mass loadings and thicknesses of the components, by methods such as mercury porosimetry, x-ray diffraction (SAXS or WAXS), and image processing on TEM images to calculate filled space vs. empty space. Porosity is measured when the MEA is completely dry as the materials swell to varying degrees when exposed to water during operation. Porosity can be determined using the known density of the material, the actual weight of the layer per given area, and the estimated volume of the layer based on the area and thickness. The equation is as follows:

$$\text{Porosity} = 100\% - \frac{\frac{\text{layer loading}\left(\frac{\text{mg}}{\text{cm}^2}\right)}{\text{density of material}\left(\frac{\text{mg}}{\text{cm}^3}\right)}}{\text{layer thickness (cm)}} \times 100\%$$

As indicated above, the density of the material is known, and the layer loading and thickness are measured. For example, in a polymer electrolyte layer with a measured loading of 1.69 mg/cm$^2$ made of 42 wt % anion-exchange polymer electrolyte with a density of 1196 mg/cm$^3$ and 58 wt % PTFE with a density of 2200 mg/cm$^3$ and a total layer thickness of 11.44 microns, the porosity is:

$$\text{Porosity} = 100\% - \frac{\frac{1.69\left(\frac{\text{mg}}{\text{cm}^2}\right) \times 0.42}{1196\left(\frac{\text{mg}}{\text{cm}^3}\right)} + \frac{1.69\left(\frac{\text{mg}}{\text{cm}^2}\right) \times 0.58}{220\left(\frac{\text{mg}}{\text{cm}^3}\right)}}{0.001144(\text{cm})} \times 100\% = 9.1\%$$

As indicated above, the polymer electrolyte layers may have ion conduction channels that do not easily permit the gas/liquid transport. In the calculation above, these ion conduction channels are considered non-porous; that is, the density of the non-porous material above (42 wt % anion-exchange polymer electrolyte) includes the ion conduction channels and is defined by the calculation to be non-porous.

In another example, an ion conductive layer without filler is porous. Porosity may be introduced by appropriate deposition conditions, for example. The measured loading of the porous polymer electrolyte layer is 2.1 g/cm$^2$ and the thickness is 19 micrometers. The known density of the polymer electrolyte with ion-conducting channels but without pores is 1196 g/cm$^3$. The porosity is then calculated as:

$$\text{Porosity} = 100\% - \frac{\frac{2.1\left(\frac{\text{mg}}{\text{cm}^2}\right)}{1196\left(\frac{\text{mg}}{\text{cm}^2}\right)}}{0.0019(\text{cm})} \times 100\% = 3.2\%$$

MEA Fabrication

MEAs for $CO_x$ reduction may be fabricated using a variety of techniques. In various embodiments, MEAs fabrication employs multiple steps. Small differences in the parameters of the fabrication process can make a large difference in performance.

In certain embodiments, MEA fabrication employs a polymer-electrolyte membrane (e.g., a Nafion PEM) layer and depositing or otherwise forming an anion-exchange polymer electrolyte layer and cathode catalyst layer on the cathode side of the membrane and depositing or otherwise forming an anode catalyst layer on the anode side of the membrane. An alternate route is to fabricate the catalyst layers on to porous gas diffusion layers (e.g., carbon for the cathode or titanium for the anode) and sandwich the membrane (which may include the anion-exchange layer) between catalyst containing porous layers. In certain embodiments, catalyst layers are fabricated by making an ink of the solid catalyst and support particles and polymer electrolyte dispersed in a solvent. The ink may be applied by a variety of methods to the polymer electrolyte membrane or GDL. The solvent subsequently evaporates leaving behind a porous solid catalyst layer.

Imaging methods may be used to characterize the thickness, uniformity, and surface roughness. The thickness should be consistent and controllable, and the uniformity smooth and as defect free as possible.

Various techniques may be employed to form the individual layers of the MEA. Generally, these techniques form the layer on a substrate such as a PEM layer or GDL as mentioned herein. Examples of such techniques include ultrasonic spray deposition, doctor blade application, gravure, screen printing, slot die coating, and decal transfer.

Catalyst inks using anion-exchange polymers are not well studied (particularly for certain polymers) and do not have the same solution structure as typical Nafion-based inks used in fuel cells and electrolyzers. The formulation and steps needed for form a well dispersed and stable catalyst ink were not known. It is believed that Nafion forms micell-like structures that allow relatively easy suspension in aqueous media. Other ion-conducting polymers and particularly some anion-conducting polymers do not form such structures and therefore are more difficult to provide in suspensions.

In certain embodiments, a catalyst layer ink is prepared by mixing metal or metal supported on carbon catalyst with ion-conducting polymer (e.g., an anion-conducting polymer) and dispersing in solvent (alcohol, etc.) by sonicating.

As indicated, certain fabrication techniques utilize doctor blade application, screen printing, decal transfer, electrospinning, etc. Roll-to-roll techniques such as gravure or microgravure or slot die coating may be used for high throughput processing.

In some embodiments, the cathode side of the MEAs is fabricated by first depositing a layer of anion-exchange polymer-electrolyte on top of a cation-exchange polymer electrolyte membrane. Then a second layer of cathode catalyst is applied on top of the anion-exchange layer. This process produces a catalyst coated membrane. Gas diffusion electrodes may be prepared by depositing the catalyst onto a gas diffusion layer. The anion exchange layer can be deposited onto the catalyst layer or the membrane. The layers can then be pressed together inside the electrolysis cell to make a functioning device. Many methods, including doctor blade, gravure or micro gravure, slot die, decal transfer, screen printing, ultrasonic spray deposition and others can be used to fabricate the anion-exchange polymer layer and the cathode catalyst layer. A more detailed description of MEA cathode fabrication using ultrasonic spray deposition follows:

The cathode side of the MEA is fabricated by first forming a solution of polymer-electrolyte (approximately 1-25 wt %) in a suitable solvent, such as ethanol, n-propanol, isopropanol, or other high vapor pressure and/or low boiling point solvent that will evaporate on a reasonable timescale during fabrication. Mixtures of solvents with one or more higher boiling point components can be used. The polymer electrolyte solution is pushed through an ultrasonic spray deposition nozzle at a desired flow rate. The ultrasonic spray deposition nozzle is held at the desired frequency to disperse the polymer-electrolyte solution into small droplets that are then pushed by an air stream onto a polymer-electrolyte membrane substrate. The polymer-electrolyte membrane may be treated with heat, solvent, or other means before deposition. The small droplets of polymer-electrolyte solution land on polymer-electrolyte membrane substrate where the solvent evaporates and leaves behind the entrained polymer-electrolyte. The ultrasonic spray deposition nozzle moves back and forth across the substrate multiple times with the desired pattern with the desired speed to build up a polymer-electrolyte layer on top of the membrane substrate until the desired thickness is reached. This process is then repeated using a solution of catalyst particles, anion-exchange polymer electrolyte and/or other additives, and a suitable solvent or mixture of solvents; this solution is termed the catalyst ink. The catalyst ink is deposited via ultrasonic spray deposition using the same or different fabrication parameters to form the cathode catalyst layer on top of the anion-exchange polymer layer on the cathode side of the MEA.

MEA Scale Up

As indicated, certain applications of MEAs for $CO_x$ reduction may require relatively large formats. For example, some MEAs have active surface areas (excluding pores) of at least about 500 $cm^2$. And in some other embodiments, MEAs have even larger active surface areas (excluding pores), or e.g., at least about 650 $cm^2$ or 1500 $cm^2$.

To make MEAs with such large active surface areas, an appropriate manufacturing process must be chosen, i.e., a process that can support large volumes of catalyst ink and large surface areas to which the catalyst ink is applied. Scaling up the catalyst ink requires particular methods of dispersing the catalyst particles to ensure good dispersion in large volumes. The ink may be set at a target dispersity, which dynamic light scattering (DLS) can be used to characterize. The ink should be stable within the time range of the layer deposition.

Additionally, humidity and temperature should be tightly controlled. Evaporation rates and processes impact the resulting deposition, so controlling these things within a 1-2 degree temperature window, and roughly 5% RH range is useful.

For ultrasonic spray deposition, thin lines of catalyst ink are laid down by a moving ultrasonic nozzle. The nozzle movement speed and ink flow rate may need to be increased for larger area MEAs. The flow rate and move speed are at least be doubled going from 25 $cm^2$ to a 650 $cm^2$ scale MEA. Water in the solvent is important and adding more water into the ink helps the stacking of droplets be smoother. For example, about 20% water in the formulation may be used for a 650 $cm^2$ MEA.

Catalyst inks are generally relatively less stable, so in certain embodiments, the MEA fabrication time is designed to be relatively short, even when active area is larger. As an example, for a 650 $cm^2$ spray, a deposition time of about 2 hours for the ionomer layer and 1 hour for the catalyst layer may be used. This is relatively fast for such a larger area and can be achieved using the fast flow rate and move speed.

MEA Scale Up Examples

Below are examples of scaling up MEA fabrication. Examples are provided for scaling from 25 $cm^2$ to 650 $cm^2$.

Solvent mixture adjusted (water to alcohol ratio): depending on the size of the spray scale, solvent adjustment from 10% water to 20% water significantly helps with surface uniformity of the surface Deposition Parameters:
  for the ionomer layer: flow rate is increased from 0.4 mL/min to 0.8 mL/min and move speed is changed from 50 mm/s to 100 mm/s
  for the catalyst layer: flow rate is increased from 0.25 mL/min to 0.5 mL/min and move speed is changed from 80 mm/s to 160 mm/s Morphology and thickness: Thickness can be matched from looking at the thickness of fabricated layers in SEM images. Adjustments can be made on characterization data to match the thickness. The morphology is controlled with parameters such as water content and fabrication.

For further scale up, e.g., to 1500 $cm^2$, flow rate and move speed may be further increased, e.g., with ranges being from 0.25-2 mL/min and 30-200 mm/s.

The speed of deposition can be further increased, e.g., to 5-8 mL/min or 5-15 mL/min, by increasing the weight of solids in the solution. In some embodiments, the solution may be greater than 5 wt. %, greater than 10 wt. %, greater than 20 wt. %, or greater than 30 wt. %.

MEA Post Treatments

After the MEA is fabricated, additional treatments may be used to increase performance. Examples the types of performance improvement include lifetime and voltage. These improvements may be manifest in MEAs that have structural modifications resulting from the treatments including better adhesion between layers.

MEA Post Treatment Examples

Hot pressing: heating the MEA under pressure to bond the layers together. Hot pressing is a step sometimes used in MEA fabrication where the MEA including the membrane and catalyst layers and sometimes GDLs are compressed together for a period of time at a desired temperature. Hot pressing is used to decrease the interfacial resistance and increase adhesion between layers and can help 'melt' layers together to prevent delamination. Example times, temperatures, and pressures are given below:
  Time: about 2 min to 10 min (MEA only); 1.5 min to 2 min (MEA+gas distribution layer (GDL)); the "MEA+GDL" may be pressed at least twice to form a stable assembly
  Temperature: about 100° C. to 195° C.;
  Pressure: between 28 psi and 2900 psi. In one example, between about 300 psi and 600 psi may be used for a 3×3 inch ½ MEA but the MEA can tolerate about 2500 psi without GDL;

The temperature of the hot press is typically selected so that it is above the glass transition temperature of the polymer electrolyte, but below the temperature where any materials of the MEA become structurally or chemically damaged. The glass transition temperature is the temperature above which the polymer-electrolyte becomes soft, which may allow for the polymer-electrolyte at layer interfaces to deform and form a better contact with lower ionic transport resistance and better adhesion.

Hydration: soaking the MEA in water or aqueous solutions to wet the polymer-electrolytes prior to cell assembly Boil Nafion or other polymer electrolyte MEA. This permanently changes the macrostructure of the polymer electrolyte and increases the amount of water in the polymer matrix. This increases ionic conductivity, but also increases water transport number.

Heat to dry. This permanently decrease water content and can reduce the amount of water transported through the polymer electrolyte during operation. Example times and temperatures for heating various MEAs are below.

| MEA | Time (Hour) | Temperature (° C.) |
|---|---|---|
| Nafion 115 25 $cm^2$ ½ MEA | 24 | 10-30 |
| Nafion 115 100 $cm^2$ ½ MEA | 48 | 10-30 |
| Nafion 117 25, 100 $cm^2$ ½ MEA | 24 | 10-30 |

| MEA | Time (Hour) | Temperature (° C.) |
| --- | --- | --- |
| Nafion 212 ½ MEA | 24 | 10-30 |
| Nafion 211 ½ MEA | 24 | 10-30 |

½ MEA refers to the polymer-electrolyte membrane coated with the anode catalyst layer on one side.

Stabilized Interface Between Mea Layers

Water and $CO_2$ formed at the interface of an anion-conducting layer (e.g., a cathode buffer layer) and a cation-conducting membrane (e.g., a PEM) can cause the two layers to separate or delaminate where the polymer layers connect. The reaction at the bipolar interface is depicted in FIGS. 3 and 9.

In addition, it is desirable for the $CO_2$ to return to the cathode of the cell where it can be reduced instead of lost to the anode, so a pathway (e.g., pores) in an anion-exchange layer (e.g., a cathode buffer layer and/or cathode layer) provides both a way to remove water and $CO_2$ from the interface to prevent delamination and return $CO_2$ to the cathode where it can react.

Figure 9:
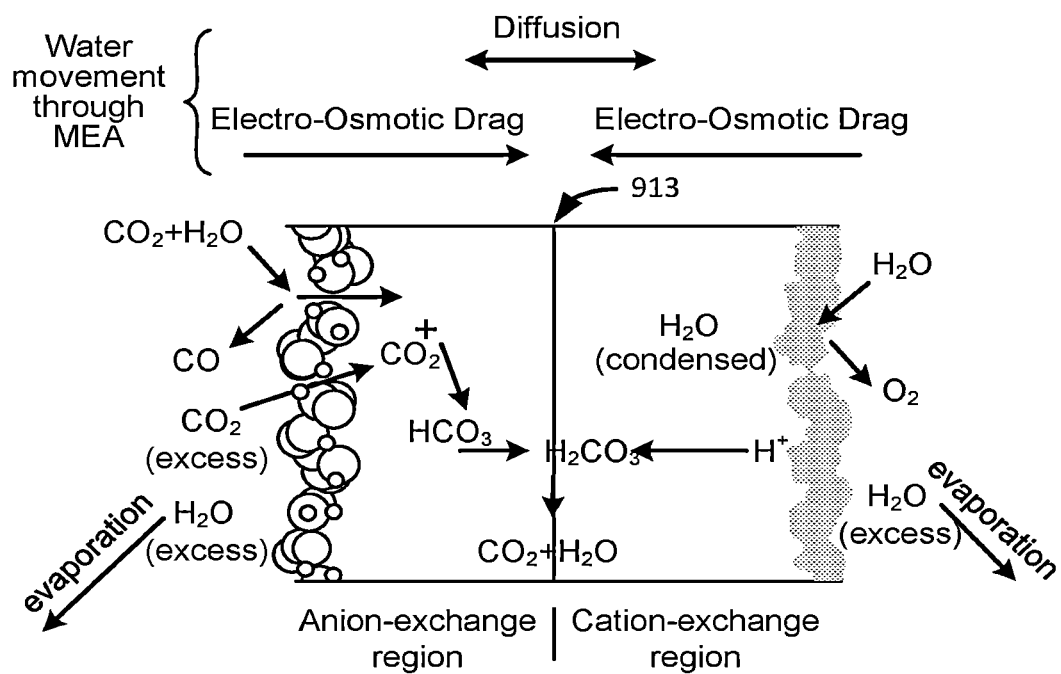
FIG. 9 is a schematic illustration of a bipolar interface of a MEA.

FIG. 9 is similar to FIG. 3, but it includes additional information relevant to mass transport and generation of $CO_2$ and water at a bipolar interface. For example, it shows hydroxide and $CO_2$ reacting on the cathode side to produce bicarbonate ions, which move toward the bipolar interface 913. On the anode side, hydrogen ions produced by water oxidation move toward bipolar interface 913, where they react with the bicarbonate ions to produce water and $CO_2$, both of which should be allowed to escape without damaging the bipolar layers.

Also depicted in FIG. 9 are water transport paths including (a) electroosmotic drag with anions from the cathode to interface 9, (b) electroosmotic drag with cations from the anode to interface 913, and (c) diffusion. Water evaporates at the anode and cathode.

Various MEA designs contain features that resist delamination and optionally provide a pathway for the reaction products to leave the interface area. In some embodiments, the bipolar interface is flat. But in some designs, the interface is provided with a composition gradient and/or interlocking structures. These are described further below with reference to FIGS. 10A, 10B, 10C, and 10D, which illustrate bipolar interfaces of MEA designs configured to resist delamination.

Engineering the interface can be used to reduce undesired co-ion leakage through the anion exchange membrane (AEM) and cation exchange membrane (CEM) and improving the mechanical stability of bipolar membrane with better adhesion. Chemical and physical modifications to the interface can be used to achieve these two goals. As described further below, the AEM and CEM layers can be chemically bonded through multiple cross-linking pathways: side chain, backbone, backbone-to-side-chain, and triple cross-linking. In some embodiments, the AEM and CEM layers interpenetrate. This can include one or more of a gradient of anion-exchange and cation-exchange polymers, a mixture of anion-exchange and cation-exchange polymers, and/or protrusions of at least one polymer extending into the other.

There are also different ways to physically modify the interface. Hot-pressing the AEM and CEM close to their respective glass transition temperature can increase the adhesion between the AEM and CEM. In some embodiments, adhesion is improved by increasing the interfacial surface area through electrospinning anion and cation exchange layers. In such embodiments, the anion and cation exchange ionomers to have similar swelling properties to avoid delamination. Adding a small concentration of a third polymer (e.g. PTFE) to the intertwined ionomers could also facilitate water removal from the interface. The surface of both the CEM and AEM can be intentionally roughened through plasma surface treatment, etching, or hot-pressing with a woven or patterned fabric. One or more of these techniques may be used to increase contact between the AEM and CEM.

In some embodiments, the interface includes a gradient. A gradient may be formed, for example, by using two nozzles during spray deposition and adding anion-exchange polymer with the relative amounts of the polymers varied during deposition of the cation-exchange layer. Similarly, cation-exchange polymer may be added during deposition of the anion-exchange layer. Referring for example to FIG. 9, a gradient may extend through substantially all or a portion of the anion-exchange region and cation-exchange region, such that the anion-exchange region has predominantly anion-exchange polymer adjacent to the cathode with the relative amount of cation-exchange polymer increasing moving from the cathode toward the interface 913. Similarly, the cathode-exchange region has a predominantly cation-exchange polymer adjacent the anode cathode with the relative amount of anion-exchange polymer increasing moving from the anode toward the interface 913. In some embodiments, there are a pure anion-exchange and pure cation-exchange regions with a gradient between the two.

In some embodiments, the layers of the bipolar membrane are melted together. This may be accomplished by choosing an appropriate solvent. For example, Nafion is at least slightly soluble in a water/ethanol mixture. By using that mixture (or another solvent in which the cation-conducting polymer is soluble) as a solvent for the anion-conducting polymer can result in Nafion or other cation-conducting polymer at least slightly dissolvent and melting into the interface. In some embodiments, this results in a thin gradient, e.g., one that extends 0.5-10% into the anion-conducting polymer layer thickness.

Figure 10A:
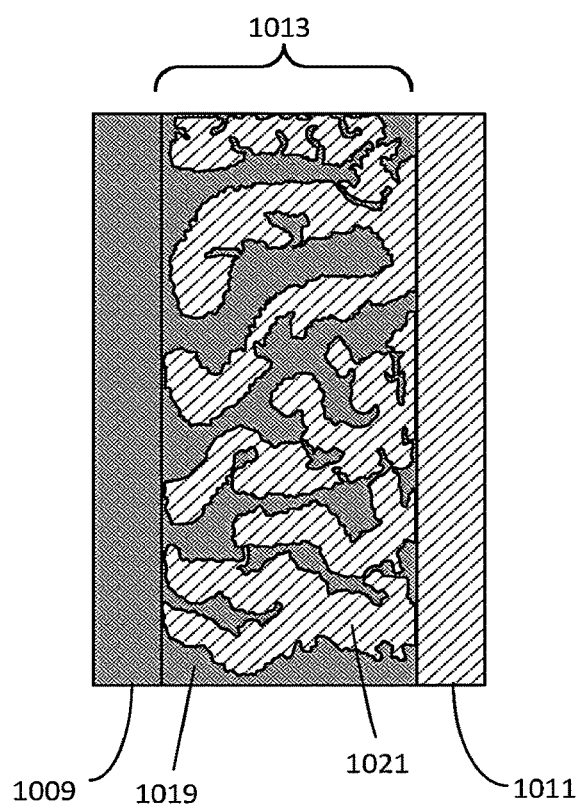
FIGS. 10A-10D are schematic illustrations of bipolar interfaces of MEAs that are configured to resist delamination.

In some embodiments, the interface includes a mixture of the polymers. FIG. 10A illustrates a bipolar interface 1013 in which a cation-conducting polymer 1021 and an anion-conducting polymer 1019 are mixed. In the example of FIG. 10A, a portion of an anion-conducting polymer layer 1009 and a portion of a cation-conducting polymer layer 1011 are shown. The anion-conducting polymer layer 1009 may be a pure anion-conducting polymer and the cation-conducting polymer layer 1011 may be pure cation exchange polymer. The cation-conducting polymer 1021 may be the same or different cation-conducting polymer as in the cation-conducting polymer layer 1011. The anion-conducting polymer 1019 may be the same or different anion-conducting polymer as in the anion-conducting polymer layer 1009.

Figure 10B:
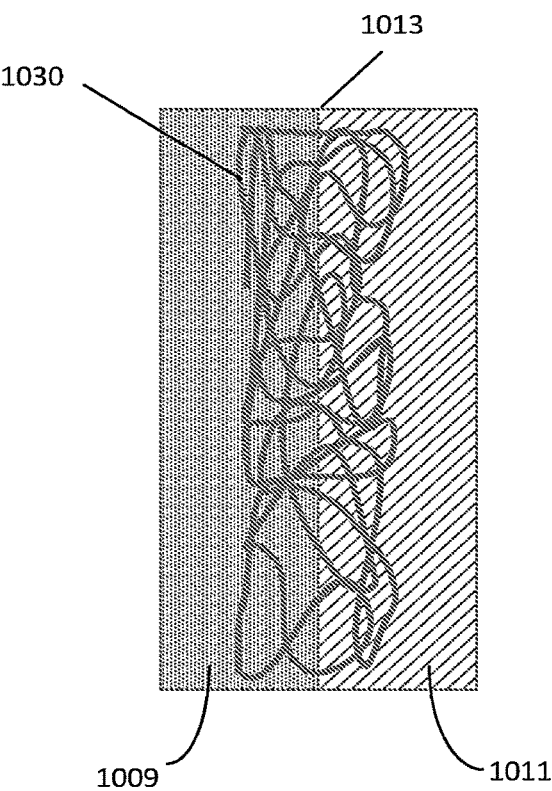

In some embodiments, the interface includes a third material that physically reinforces the interface. For example, FIG. 10B shows an example of a material 1030 that straddles interface 1013. That is, the material 1030 partially resides in an anion-conducting polymer layer 1009 and a cation-conducting polymer layer 1011. Because of this, material 1030 may bind the two layers in a manner that resists delamination. In one example, the material 1030 is an inert material, such as PTFE, polyvinylidene difluoride (PVDF), a charged colloidal sphere such as a surface-modified metal hydroxide sphere such as $Al(OH)_3$ with trimethylaluminum (TMA). The inert material may be in the form of a web or mesh with gaps that can be filled by the ionomers. Such an interface may be fabricated, for example, by casting or otherwise applying the cation-conducting polymer and the anion-conducting polymer on opposite sides of a PTFE mesh or similar structure, followed by hot pressing.

Figure 10C:
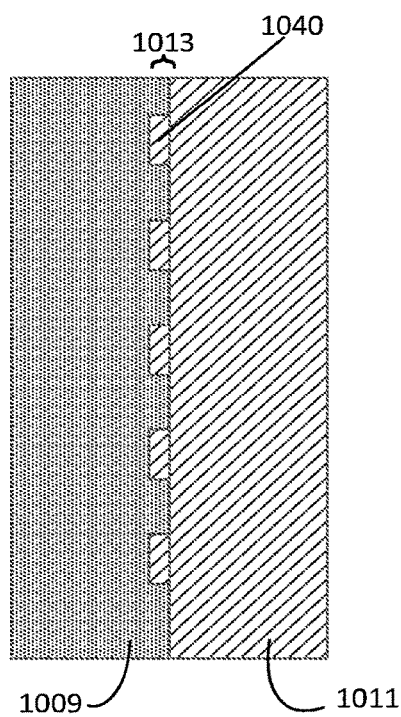

FIG. 10C illustrates a bipolar interface 1013 having protrusions 1040 of the cation-conducting polymer extending from the cation-conducting polymer layer 1011 into the anion-conducting polymer layer 1009. These protrusions may mechanically strengthen interface 1013 so that it does not delaminate when $CO_2$ and water are produced at the interface. In some embodiments, protrusions extend from anion-conducting polymer layer 1009 into cation-conducting polymer layer 1011. In certain embodiments, protrusions extend both directions. Example dimensions are 10 µm-1 mm in the in-plane dimension, though smaller dimensions (e.g., 500 nm—1 µm) are possible. The out-of-plane dimension may be for example, 10-75% or 10-50% of the total thickness of the anion exchange layer. The protrusions may be fabricated for example by any appropriate technique such as lithographic techniques or by spraying the polymer into a patterned mesh that is then removed. Surface roughening techniques may also be used to create protrusions. In some embodiments, protrusions may be formed from a different material, e.g., a non-ion-conducting polymer, a ceramic, or a metal to help interlock the polymer layers and mechanically strengthen the interface.

Figure 10D:
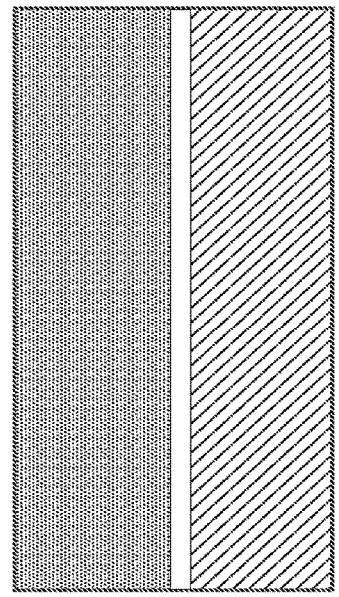

FIG. 10D illustrates a bipolar interface 1013 having a third material 1050 disposed between or mixed one or more of the cation-conducting polymer layer 1011 into the anion-conducting polymer layer 1009. In some embodiments, for example, the third material 1050 can be an additive as discussed further below. In some embodiments, the third material 1050 can be a blend of anion-conducting and cation-conducting ionomers at the interface. For example, it can be a mixture of Nafion 5 wt % ionomer and Orion 2 wt % mTPN1. In some embodiments, the third material may include ion acceptors and donors, either mixed together or provided as distinct layers.

In some embodiments, the interface includes additives to facilitate acid-base reactions and prevent delamination. In some embodiments, the additives may facilitate spreading out the acid base recombination a larger volume instead of just at a 2D interface of the anion conducting polymer and cation conducting polymer. This spreads out water and $CO_2$ formation, heat generation, and may lower the resistance of the membrane by decreasing the barrier to the acid-base reaction. These effects can be advantageous in helping avoid build-up of products, heat, and lowering resistive losses in the MEA leading to a lower cell voltage. Further, it helps avoid degrading materials at the interface due to heat and gas production.

Examples of additives that facilitate acid-base reactions include molecules that are both proton and anion acceptors, such as hydroxide containing ionic liquids with 1-butyl-3-methylimidazolium hydroxide being a specific example. Other ionic liquids may also be used, including those having one of the following ionic groups: N,N,N,N-tetraalkylammonium (e.g., N,N,N,N-tetramethylammonium, N,N-dimethyl-N,N-dipropylammonium, or N-methyl-N,N,N-tri-$C_{1-12}$ alkylammonium), N,N,N-trialkylammonium-1-yl (e.g., N,N,N-trimethylammonium-1-yl, N-methyl-N,N-dipropylammonium-1-yl, or N,N,N-tri-$C_{1-12}$ alkylammonium-1-yl), N,N,N-trialkyl-N-alkoxyalkylammonium (e.g., N,N,N-trimethyl-N-alkoxyalkylammonium, N-methyl-N,N-diethyl-N-methoxyethylammonium, or N,N,N-tri-$C_{1-12}$ alkyl-N—$C_{1-6}$ alkoxy-$C_{1-6}$ alkylammonium), N,N-dialkyl-N-alkoxyalkylammonium-1-yl (e.g., N,N-dimethyl-N-alkoxyalkylammonium-1-yl or N,N-di-$C_{1-12}$ alkyl-N—$C_{1-6}$ alkoxy-$C_{1-6}$ alkylammonium-1-yl), N,N-dialkylpyrrolidinium (e.g., N,N-dimethylpyrrolidinium, N-methyl-N-ethylpyrrolidinium, or N-methyl-N—$C_{1-12}$ alkylpyrrolidinium), N-alkylpyrrolidinium-1-yl (e.g., N-methylpyrrolidinium-1-yl or N—$C_{1-12}$ alkylpyrrolidinium-1-yl), N,N-dialkylpiperidinium (e.g., N,N-dimethylpiperidinium, N-methyl-N-ethylpiperidinium, or N-methyl-N—$C_{1-12}$ alkylpiperidinium), N-alkylpiperidinium-1-yl (e.g., N-methylpiperidinium-1-yl or N—$C_{1-12}$ alkylpiperidinium-1-yl), N,N,4-trialkylpiperidinium (e.g., N,N,4-trimethylpiperidinium, N,4-dimethyl-N-ethylpiperidinium, or N-methyl-N,4-di-$C_{1-12}$ alkylpiperidinium), N,4-dialkylpiperidinium-1-yl (e.g., N,4-dimethylpiperidinium-1-yl or N,4-di-$C_{1-12}$ alkylpiperidinium-1-yl), N,N,3,5-tetraalkylpiperidinium (e.g., N,N,3,5-tetramethylpiperidinium, N,3,5-trimethyl-N-ethylpiperidinium, or N-methyl-N,3,5-tri-$C_{1-12}$ alkylpiperidinium), N,3,5-trialkylpiperidinium-1-yl (e.g., N,3,5-trimethylpiperidinium-1-yl or N,3,5-tri-$C_{1-12}$ alkylpiperidinium-1-yl), N,N,2,6-tetraalkylpiperidinium (e.g., N,N,2,6-tetramethylpiperidinium, N,2,6-trimethyl-N-ethylpiperidinium, or N-methyl-N,2,6-tri-$C_{1-12}$ alkylpiperidinium), N,2,6-trialkylpiperidinium-1-yl (e.g., N,2,6-trimethylpiperidinium-1-yl or N,2,6-tri-$C_{1-12}$ alkylpiperidinium-1-yl), N,N-dialkylazepanium (e.g., N,N-dimethylazepanium, N-methyl-N-ethylazepanium, or N-methyl-N—$C_{1-12}$ alkylazepanium), N-alkylazepanium-1-yl (e.g., N-methylazepanium-1-yl or N—$C_{1-12}$ alkylazepanium-1-yl), N,N-dialkylmorpholinium (e.g., N,N-dimethylmorpholinium, N-methyl-N-ethylmorpholinium, or N-methyl-N—$C_{1-12}$ alkylmorpholinium), N-alkylmorpholinium-4-yl (e.g., N-methylmorpholinium-4-yl or N—$C_{1-12}$ alkylmorpholinium-4-yl), N1,N3-dialkylimidazolium (e.g., N1,N3-dimethylimidazolium, N1-ethyl-N3-methylimidazolium, or N1-$C_{1-12}$ alkyl-N3-methyl-imidazolium), N3-alkylimidazolium-1-yl (e.g., N3-methylpiperidinium-1-yl or N3-$C_{1-12}$ alkylpiperidinium-1-yl), 1-alkyl-1-azabicyclo[2.2.2]octane (e.g., 1-methyl-1-azabicyclo[2.2.2]octane or 1-$C_{1-12}$ alkyl-1-azabicyclo[2.2.2]octane), or 1-azoniabicyclo[2.2.2]octan-1-yl, in which each of these can be optionally substituted (e.g., substituted on a ring with one or more alkyl and/or substituted on an alkyl with one or more heteroatoms).

In some embodiments, an ionomer different from that of the anion-conductive polymer layer and the cation-conductive polymer layer may be used. For example, a relatively high conductivity anion-exchange material such as Sustainion may be used. Such anion-exchange material may not be selective enough to use as a cathode buffer layer but can be used at the interface.

In particular examples, an ionomer may be used at the interface that has a higher ion exchange capacity than at least one of the ionomers of the bipolar membrane. Such an ionomer may not be suitable for the layers of the bipolar membrane, for example, due to propensity to swelling or lack of stability, but can be added at the interface. In particular examples, an ionomer that improves adhesion and physical contact may be used. A polymer at the interface that goes into both layers may be used to improve adhesion. An ionomer at the interface can itself have multiple sublayers. In one example, a third ionomer may have center region having higher void space disposed between denser regions.

In some embodiments, an ionomer used at the interface is an anion exchange ionomer that is different from the anion-conducting polymer of the anion conducting polymer layer and may be referred to as an interface AEM to distinguish it from the bulk AEM of the anion conducting polymer layer.

In some such embodiments, the interface AEM has lower water uptake than the anion-conducting polymer layer to match the water uptake of PFSA or other cation-conducting polymer. This can help prevent delamination at the interface while maintaining a higher ion exchange capacity (IEC). Both the higher IEC and lower water uptake of the interface ionomer may help minimize cation crossover from the anode side. Lower water uptake can result from smaller ion conduction channels in the interface ionomer than in the anion-conducting polymer of the bipolar membrane. Higher IEC can result from a higher concentration of cation functional groups on the interface ionomer. One or both of these characteristics may be present in the interface ionomer and can restrict cations from the cathode.

In particular embodiments, when forward bias is applied across a bipolar membrane, ion recombination occurs at the interface to form products such as water. An interfacial layer should be mechanically robust during ion recombination (i.e., exhibit good adhesion between AEM and CEM of the bipolar membrane) while minimizing undesired co-ion leakage through the AEM and CEM. In some embodiments, an interface AEM has a thickness of 0.1%-10% of the bulk AEM thickness, with examples of bulk AEM thickness being between 5-80 μm. The interface AEM1 and 90 percent by volume may be kept relatively low to avoid additional ohmic resistances across the bipolar membrane. The water uptake of the interface AEM can be between 0%-25% to circumvent membrane delamination due to a mismatch of swelling properties between the adjacent AEM and CEM. In some interface AEM can have an ion exchange capacity (IEC) in the range of 2.5-3.0 mmol/g. In some such embodiments, the IEC of the bulk AEM is lower than that of the interface AEM and may be 1.5-2.5 mmol/g. A high density of positively-charged functional groups (i.e. high IEC) at the interface serves to electrostatically repel undesired co-ion (e.g. H+ or K+) transport to the bulk AEM via the Donnan exclusion effect.

Additional examples of materials that may be present at the interface include block copolymers having different charged groups (e.g., both cation and anion stationary charge groups), cation-and-anion conducting polymers, resin material, ion donors such as oxides including graphene oxide, catalysts for acid/base recombination, catalysts that react $H_2$ and $O_2$ diffusing from the anode and cathode, water splitting catalysts, $CO_2$ absorbing material, and $H_2$ absorbing material.

In some embodiments, the anion-conducting polymer and the cation-conducting polymer of the bipolar membrane have the same backbone, with different stationary charge groups. As an example, Orion ionomers may be used with different stationary charge groups. The ionomers are more compatible and less apt to delaminate.

In the examples above, the interface 1013 may be a three-dimensional volume having thickness that is between 1% and 90% of the overall thickness of the bipolar membrane, or between 5% and 90%, or between 10% and 80%, or between 20% and 70%, or between 30% and 60% of the overall thickness of the bipolar membrane. In some embodiments, it less than half the overall thickness, including between 1% and 45%, 5% and 45%, 5% and 40%, or 5% and 30%.

Any of the bipolar interfaces described above may be hot pressed. Particularly between the anion-exchange and cation exchange membrane layers, hot pressing can soften the polymer electrolytes and allow them to meld together.

In some embodiments, the bipolar AEM/PEM interface includes a relatively smooth PEM layer in contact with a rougher AEM layer. For example, a PEM arithmetic mean height (Sa) in such embodiments can range from near 0 to 0.2 μm. The AEM layer in contact with the PEM layer can have higher roughness, and in some embodiments have an Sa in the 0.2 to 0.5 μm range, in the 0.4 to 1.5 μm range, or in the 0.6 to 1 μm range. The roughness of the AEM with the PEM can create a discontinuous interface. The Sa of the AEM layer in contact with the PEM can be lowered to near 0 to 0.2 μm or near 0 to 1 μm through changes to fabrication parameters, such as treatment with solvent that partially dissolves the polymer electrolyte before evaporating to leave behind a smoother surface or hot pressing. The AEM layer may be substantially continuous and non-porous, or it may contain pores with typical porosity ranges can be 0.1 to 90%, 1-20%, and 5-15% that allow for gas and/or water movement.

In another embodiment, the surface of the PEM membrane may be roughened to an Sa of 5 to 10 μm, 1 to 5 μm, 0.2 to 1 μm, or 0.4 to 0.6 μm. In some such embodiments, the AEM layer in contact with the PEM membrane may have Sa near 0 to 1 μm or near 0 to 0.2 μm, or it may be rougher, with a Sa in the 2 to 5 μm range, in the 0.4 to 1.5 μm range, or in the 0.6 to 1.0 μm range. The AEM may be substantially continuous and non-porous, or it may contain pores with typical porosity ranges of 0.1 to 90%, 1-20%, and 5-15% that allow for gas and/or water movement.

In some embodiments, a cross-linker may be added to covalently cross-link the two polymers of the bipolar membrane. A crosslinker can be used at an interface between ion-conducting polymer layers. Each layer can include one or more polymers, in which each polymer can be characterized by a backbone and a side chain attached to the backbone. A crosslinking reaction can occur at the interface, as well as between a crosslinker and (i) two or more side chains, (ii) two or more backbones, or (iii) a combination of two or more side chain(s) and backbone(s).

The crosslinker can be bivalent, trivalent, tetravalent, or other higher valency. In this way, the crosslinker can react with any number of reactive groups present at the interface within the cation-conducting, anion-conducting, or mixed cation-and-anion-conducting polymer layers. In some embodiments, the crosslinker includes:

in which Ak is an optionally substituted aliphatic, alkylene, cycloaliphatic, or cycloalkylene; Ar is an optionally substituted aromatic, arylene, heteroaromatic, or heteroarylene; L is a linking moiety (e.g., any herein); L3 is an integer that is 2 or more; and X is halo, hydroxyl, optionally substituted amino (e.g., $NR^{N1}R^{N2}$ in which each of $R^{N1}$ and $R^{N2}$ is, independently, H or optionally substituted alkyl), carboxyl, acyl halide (e.g., —C(O)—R, in which R is halo), carboxyaldehyde (e.g., —C(O)H), or optionally substituted alkyl.

Non-limiting crosslinkers can include terephthalaldehyde, glutaraldehyde, ortho-xylene, para-xylene, meta-xylene, or a multivalent amine, such as diamine, triamine, tetraamine, pentaamine, etc., including 1,6-diaminohexane (hexanediamine, DHA), N,N'-dimethyl-1,6-hexanediamine, N,N,N'N'-tetramethyl-1,6-hexanediamine (TMHDA), 1,3-diaminopropane, N,N'-dimethyl-1,3-propanediamine, N,N,N', N'-tetramethyl-1,3-propanediamine, 1,4-diaminobutane, N,N'-dimethyl-1,4-butanediamine, N,N,N',N'-tetramethyl-1, 4-butanediamine, 1,8-diaminooctane, N,N'-dimethyl-1,8-octanediamine, N,N,N',N'-tetramethyl-1,8-octanediamine, propane-1,2,3-triamine, [1,1':3',1''-terphenyl]-4,4'',5'-triamine, 1,3,5-triazine-2,4,6-triamine (melamine), and others.

In some embodiments, a crosslinker is used for crosslinking between side chain groups of the first and second polymer layers. The side chain group can include a reactive group that is either present within the material or installed in any useful manner.

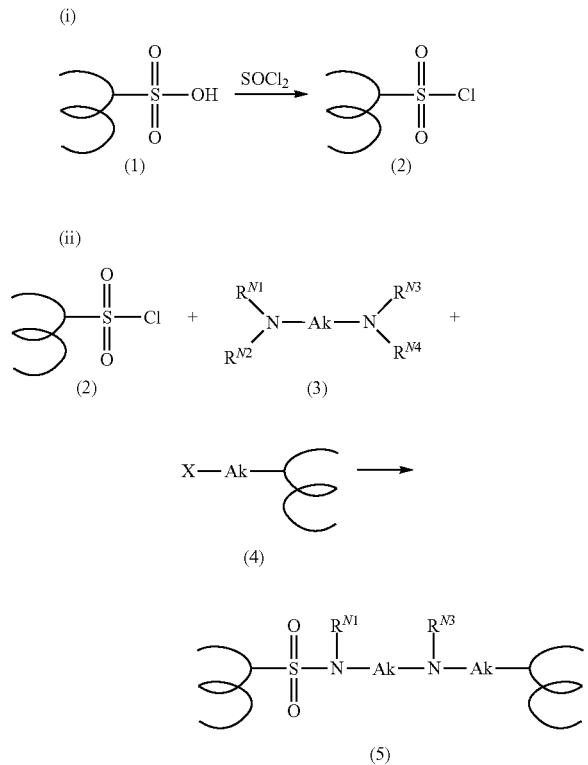

For instance, if a polymer layer includes an ionic or ionizable side chain group (e.g., —SO$_2$OH, —CO$_2$H, etc.), then this group can be converted to provide a reactive group (e.g., a halo or a leaving group). In one non-limiting embodiment, as seen in step (i) of Scheme I above, the first polymer (1) includes an ionic side chain group (—SO$_2$OH), which is converted to a reactive group (—SO$_2$Cl in (2)) by use of thionyl chloride. The second polymer, in turn, can also include a reactive side chain group(s) (e.g., a halide, such as —Br, haloalkyl, or another leaving group), as in (4). By using a crosslinker, crosslinks are formed between reactive groups. As seen in step (ii) of Scheme I above, the reactive groups in the first polymer (2) and the second polymer (4) are reacted with a crosslinker that is a multivalent amine (3). In this way, crosslinks (5) are formed at the interface and between the side chain groups. In one instance, the polymer layers can be crosslinked based on the formation of two or more covalent bonds (e.g., an N—S covalent bond, N—C covalent bond, or C—C covalent bond).

In other embodiments, a crosslinker forms crosslinks between backbone(s) of the first and second polymer layers.

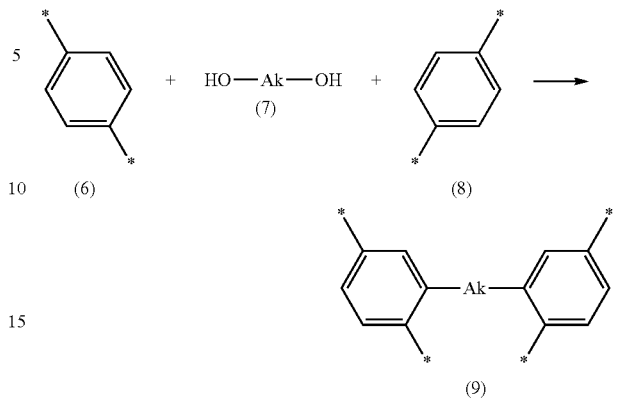

In one non-limiting embodiment, as seen in Scheme II above, the first polymer (6) and the second polymer (8) include an aryl backbone. Then, a crosslinker is used to react with backbone groups. If the crosslinker is a multivalent hydroxyalkyl as in (7), then the two polymer layers can be crosslinked by way of a be an acid-catalyzed in the presence of a proton source, such as an organic acid (e.g., trifluoromethanesulfonic acid, sulfuric acid, methanesulfonic acid, trifluoroacetic acid, p-toluenesulfonic acid, etc.). In one instance, the hydroxyalkyl crosslinker can be a tertiary alcohol, which is protonated by a Bronsted acid, lose water as a byproduct, and form a tertiary carbocation intermediate. This intermediate, in turn, can readily react with the π electrons of the aromatic backbone based on electrophilic substitution. In this method, aromatic backbone from the polymer layers could be grafted with a crosslinker to from a high-density polymer matrix.

In yet other embodiments, a crosslinker is used for crosslinking between side chain group(s) of the first polymer layer and backbone(s) of the second polymer layer. For instance, the side chain group can be converted into a nucleophile, and the backbone can include an electrophile.

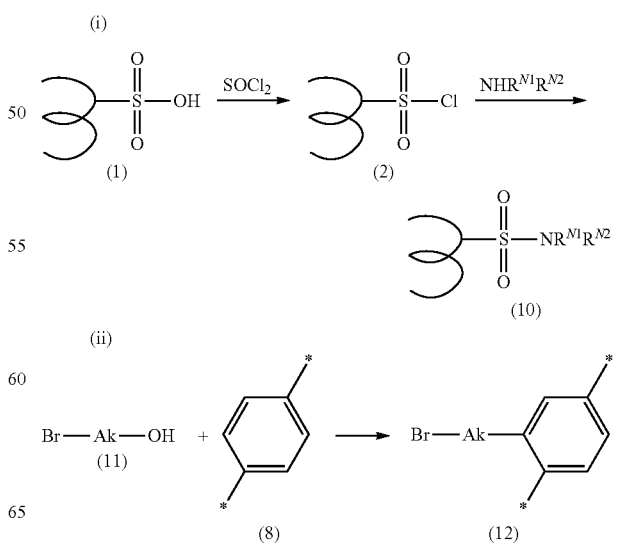

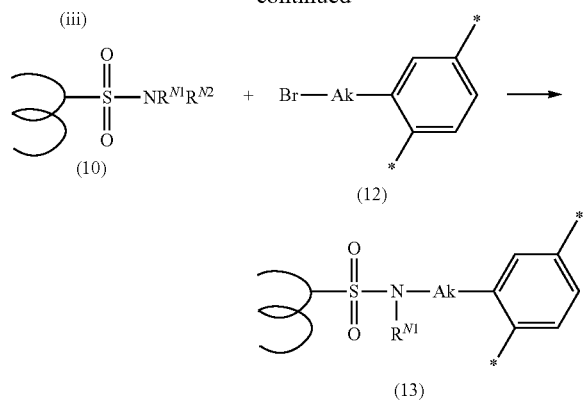

In one non-limiting embodiment, as seen in Scheme III above, the first polymer (1) includes an ionic side chain group (—$SO_2OH$), which is converted to a reactive group (—$SO_2Cl$ in (2)) by use of thionyl chloride and then aminated to provide a reactive nucleophilic group (e.g., a sulfonamide, such as —$SO_2NR^{N1}R^{N2}$ in (10)). The second polymer (8) can include an aryl backbone, which can be reacted with a multivalent crosslinker. For instance, the crosslinker (11) can be a hydroxyhaloalkyl, which can react by way of an acid-catalyzed Friedel-Crafts alkylation reaction to provide an alkylated polymer (12). Finally, the first polymer (10) having a nucleophilic group can be reacted with the second polymer (12) having an electrophilic group to provide a crosslinked polymer (13). Alternative chemistries, reactive groups, electrophiles, and nucleophiles can be used to provide reactive pairs in the first and second polymers that can react at the interface.

Thickness of Layers of MEA

In certain embodiments, a polymer electrolyte membrane and an adjoining cathode buffer layer or other anion-conducting polymer layer may have relative thickness that facilitate the fabrication and/or operating performance of an MEA.

Figure 11:
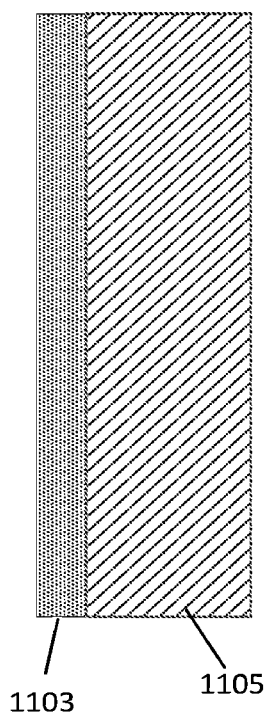
FIG. 11 is a schematic illustration of layers of a MEA, including an anion-conducting polymer layer (AEM) and a polymer electrolyte membrane (PEM).

FIG. 11 depicts an example of partial layers of an MEA, which partial layers includes an anion-conducting polymer layer (AEM) 1103, which may be a cathode buffer layer, and a polymer electrolyte membrane (PEM) 1105, which may be cation-conducting polymer layer (e.g., a proton exchange polymer layer) or an anion-conducting polymer layer. In this example, the PEM 1105 is relatively thicker than the anion-conducting polymer layer 1103. For example, the PEM 1105 may be 120 micrometers compared with about 10-30 or 10-20 micrometers thick for the AEM 1103. The PEM 1105 may provide mechanical stability to the AEM 1103.

In some cases, anion-conducting polymers such as those used in anion-conducting polymer layer 1103 are substantially less conductive than cation-conducting polymers such as those used in PEM 1105. Therefore, to provide the benefits of a cathode buffer layer (e.g., anion-conducting polymer layer 1103) without substantially increasing the overall resistance of the MEA, a relatively thin cathode buffer is used. However, when a cathode buffer layer becomes too thin, it becomes difficult to handle during fabrication of the MEA and in other contexts. Therefore, in certain embodiments, a thin cathode buffer layer is fabricated on top of a relatively thicker PEM layer such as a cation-conducting polymer layer. The anion-conducting polymer layer may be fabricated on the PEM layer using, for example, any of the fabrication techniques described elsewhere herein.

In various embodiments, the polymer electrolyte membrane layer is between about 20 and 200 micrometers thick. In some embodiments, the polymer electrolyte membrane layer is between about 60 and 120 micrometers thick. In some embodiments, a thin polymer electrolyte membrane layer is used, being between about 20 and 60 micrometers thick. In some embodiments, a relatively thick polymer electrolyte layer is used, between about 120 and 200 micrometers thick.

In some embodiments, a thinner cathode buffer layer is used with a thinner polymer electrolyte membrane. This can facilitate movement of the $CO_2$ formed at the interface back to cathode, rather than to the anode. In some embodiments, a thicker cathode buffer layer is used with a thicker polymer electrolyte membrane. This can result in reducing cell voltage in some embodiments.

Factors that can influence the thickness of a cathode buffer layer include the ion selectivity of the anion-conducting polymer, the porosity of the anion-conducting polymer, the conformality of the anion-conducting polymer coating the polymer electrolyte membrane.

Many anion-conducting polymers are in the range of 95% selective for anions, with about 5% of the current being cations. Higher selectivity anion-conducting polymers, with greater than 99% selectivity for anions can allow for a reduction in a significant reduction in thickness while providing a sufficient buffer.

Mechanical strength of an anion-conducting layer can also influence its thickness, with mechanical stable layers enabling thinner layers. Reducing porosity of an anion-conducting polymer may reduce the thickness of the anion-conducting layer.

In some implementations, a cathode buffer layer or other anion-conducting polymer layer that abuts the polymer electrolyte membrane is between about 5 and 50 micrometers, 5 and 40 micrometers, 5 and 30 micrometers, 10 and 25 micrometers, or 10 and 20 micrometers thick. Using a >99% selective polymer can allow the cathode buffer layer to be reduced to between 2 and 10 microns in some embodiments.

In some cases, the ratio of thicknesses of the polymer electrolyte membrane and the adjoining anion-conducting polymer layer is between about 3:1-90:1 with the ratios at the higher end used with highly selective anion-conducting polymer layers. In some embodiments, the ratio is 2:1-13:1, 3:1-13.1, or 7:1-13.1.

In certain embodiments, a relatively thinner PEM improves some aspects of the MEA's performance. Referring to FIG. 11, for example, polymer electrolyte membrane 1105 may have a thickness of about 50 micrometers, while the anion-conducting layer may have a thickness between about 10 and 20 micrometers. A thin PEM favors movement of water generated at the AEM/PEM interface to move toward the anode. The pressure of gas on the cathode side of the cell can be 80-450 psi, which causes the water at the interface to move to the anode. However, in some instances, a thick PEM can cause the majority of water to move through the AEM to the cathode, which leads to flooding. By using a thin PEM, flooding can be avoided.

In some embodiments, a thin PEM may have a thickness of 10 micrometers to 50 micrometers, 30 micrometers to 50 micrometers, or 25 micrometers to 35 micrometers. In some such embodiments, the AEM may have a similar thickness to the PEM, such as 5 micrometers to 50 micrometers, 5 micrometers to 30 micrometers, or 10 micrometers to 20 micrometers. The ratio of PEM:AEM thicknesses could be 1:2 to 1:1 when PEMs with thicknesses of 10-30 micrometers are used, 1:2 to 2:1 when PEM thickness is 30-50 micrometers, or 1:1 to 3:1 when PEM thickness is 20-35 micrometers. As described further below, AEMs in these thickness ranges may be useful for water management.

Commercially available anion exchange membranes and cation exchange membranes typically have known thicknesses. For example, Nafion® membranes have the following dry thicknesses:

| Membrane Type | Thickness (µm) |
|---|---|
| Nafion 117 | 183 |
| Nafion 115 | 127 |
| Nafion 211 | 25.4 |

Such known thickness can be used to determine thickness ratios. For example, if an AEM has a thickness between approximately 200 nm and 100 µm, between 300 nm and 75 µm, between 500 nm and 50 µm as described above in the discussion of the cathode buffer layer, the PEM:AEM thickness ratio can be determined as follows:

| PEM Membrane Type | Example ranges of PEM:AEM |
|---|---|
| N117 | 1.83-915; 2.44-610; 3.66-366 |
| N115 | 1.27-635; 1.69-423; 2.54-254 |
| N211 | 0.25-127; 0.34-84.7; 0.51-50.8 |

An AEM may have a thickness that aids in water management, as discussed further below.

Water Management

As described above, one of the key challenges in a $CO_x$ electrolyzer is managing water in the cathode due to the need to have water present to hydrate the polymer-electrolyte and/or participate in the $CO_x$ reduction reaction but not so much water that it blocks the transport of $CO_x$ to the cathode catalyst. Water can transport predominantly by two methods in a polymer electrolyte system: by electro-osmotic drag and by diffusion. Through diffusion, water will move from areas of high concentrations to low concentrations, the rate of water transport depends on the diffusion coefficient that is an inherent property of the polymer electrolyte material. Electro-osmotic drag is the movement of water molecules with ions as they travel through the polymer-electrolyte. Water in a cation exchange membrane system will transport along with the movement of cations from the anode to the cathode, whereas water moves in the opposite direction with anions in an anion exchange membrane system.

With a bipolar membrane (including a cation exchange membrane and an anion exchange membrane), the net movement of water from the anode to the cathode can be managed by changing the thickness of the anion-exchange and cation-exchange polymer electrolyte layers and/or their material properties.

In some embodiments, an AEM may have a thickness between 5 and 80 micrometers, 5 and 50 micrometers, 5 and 40 micrometers, or 5 and 30 micrometers. As described below, relatively thick AEMs can aid in water management and in preventing delamination, which prolongs lifetime. However, the thickness also contributes to higher voltages and lower efficiencies. Thus, in some embodiments, the AEM may be no more than 50 microns thick.

The tables below show net water transported from the anode to the cathode of the $CO_x$ electrolyzer per ionic charge moved through the polymer-electrolyte when the thickness of the anion-exchange polymer electrolyte layer and cation-exchange membrane thickness are varied. When the anion-exchange polymer-electrolyte layer thickness increases, the net movement of water from the anode to the cathode decreases. Increasing the molecular weight of the anion-exchange polymer, which reduces the diffusion coefficient of water through the anion-exchange layer has a similar effect of decreasing the net movement of water per ionic charge from the anode to the cathode of the device.

Nafion 115 (PFSA cation exchange membrane thickness 127 microns)

| Anion-exchange polymer electrolyte layer thickness (um) | Anion-exchange polymer-electrolyte MW (kg/mol) | Water moved from anode to cathode of COx electrolyzer per charge |
|---|---|---|
| 14-15 | 33 | 3.07 |
| 17.5-18.5 | 33 | 2.80 |
| 20-21 | 33 | 2.44 |

Nafion 212 (PFSA cation exchange membrane thickness 50.8 microns)

| Anion-exchange polymer electrolyte layer thickness (um) | Anion-exchange polymer-electrolyte MW (kg/mol) | Water moved from anode to cathode of COx electrolyzer per charge |
|---|---|---|
| 22 | 33 | 1.25 |
| 8 | 33 | 2.16 |

Thus, in some embodiments, the ratio of the cation exchange membrane thickness:anion exchange membrane thickness (i.e., the PEM:AEM ratio) in a bipolar MEA is no more than 7:1, 5:1, 3:1, 2:1, 1.5:1, 1:1, or 1:1.5.

Nafion 115 (PFSA cation exchange membrane thickness 127 microns) with anion-exchange polymer electrolyte layers with different molecular weights.

| Anion-exchange polymer electrolyte layer thickness (um) | Anion-exchange polymer-electrolyte MW (kg/mol) | Water moved from anode to cathode of COx electrolyzer per charge |
|---|---|---|
| 14-15 | 33 | 3.07 |
| 14-15 | 77 | 2.55 |
| 14-15 | 90 | 2.48 |

Thus, in some embodiments, the molecular weight of the anion exchange polymer electrolyte may be at least 50 kg/mol, at least 60 kg/mol, at least 70 kg/mol, at least 80 kg/mol, or at least 90 kg/mol.

In some embodiments, the AEM polymer may be cross-linked to decrease water movement from the anode to the cathode.

Figure 12:
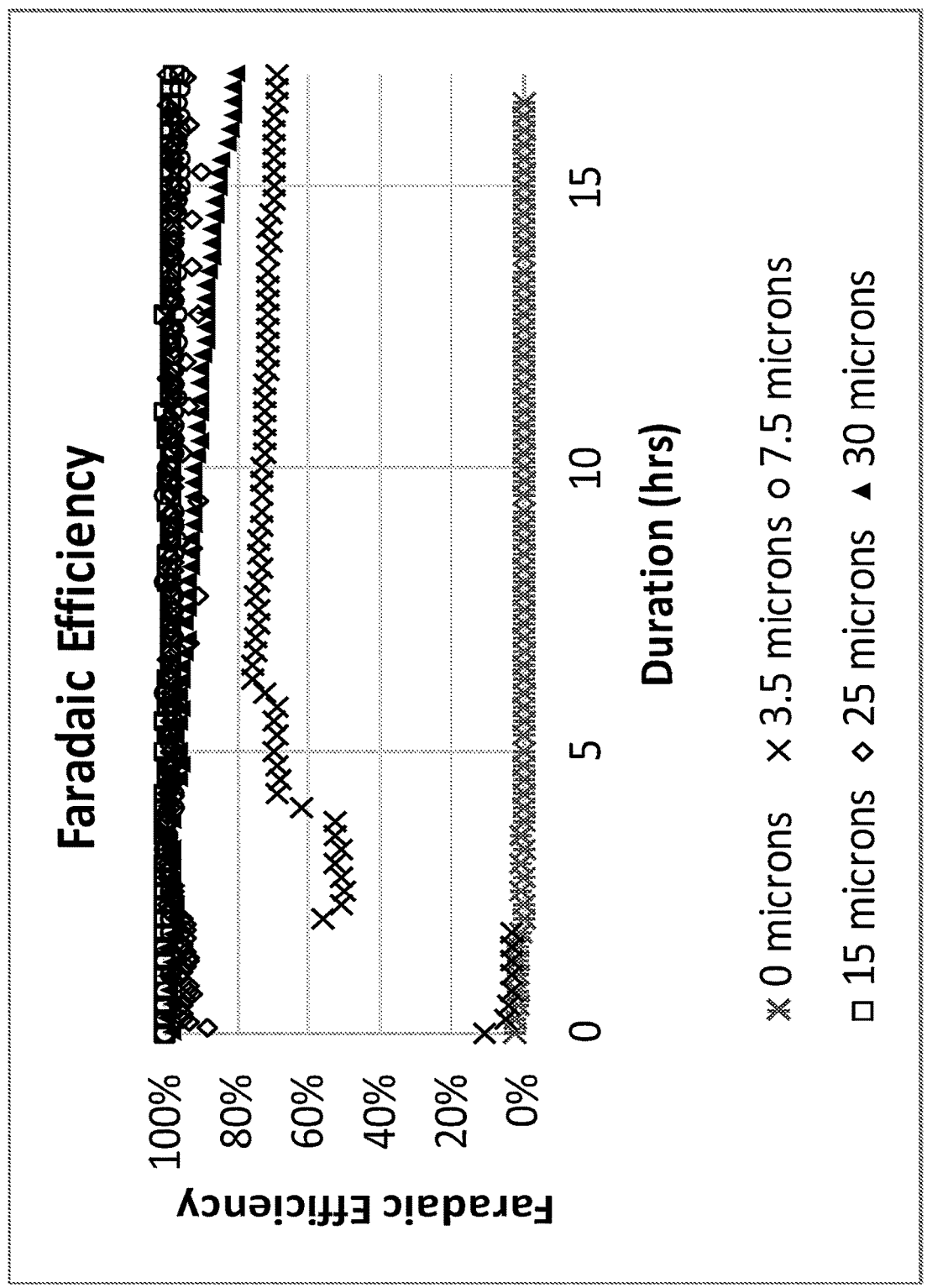
FIG. 12 shows Faraday efficiency for COx electrolyzers having bipolar MEAs with different thicknesses of AEM.
Figure 13:
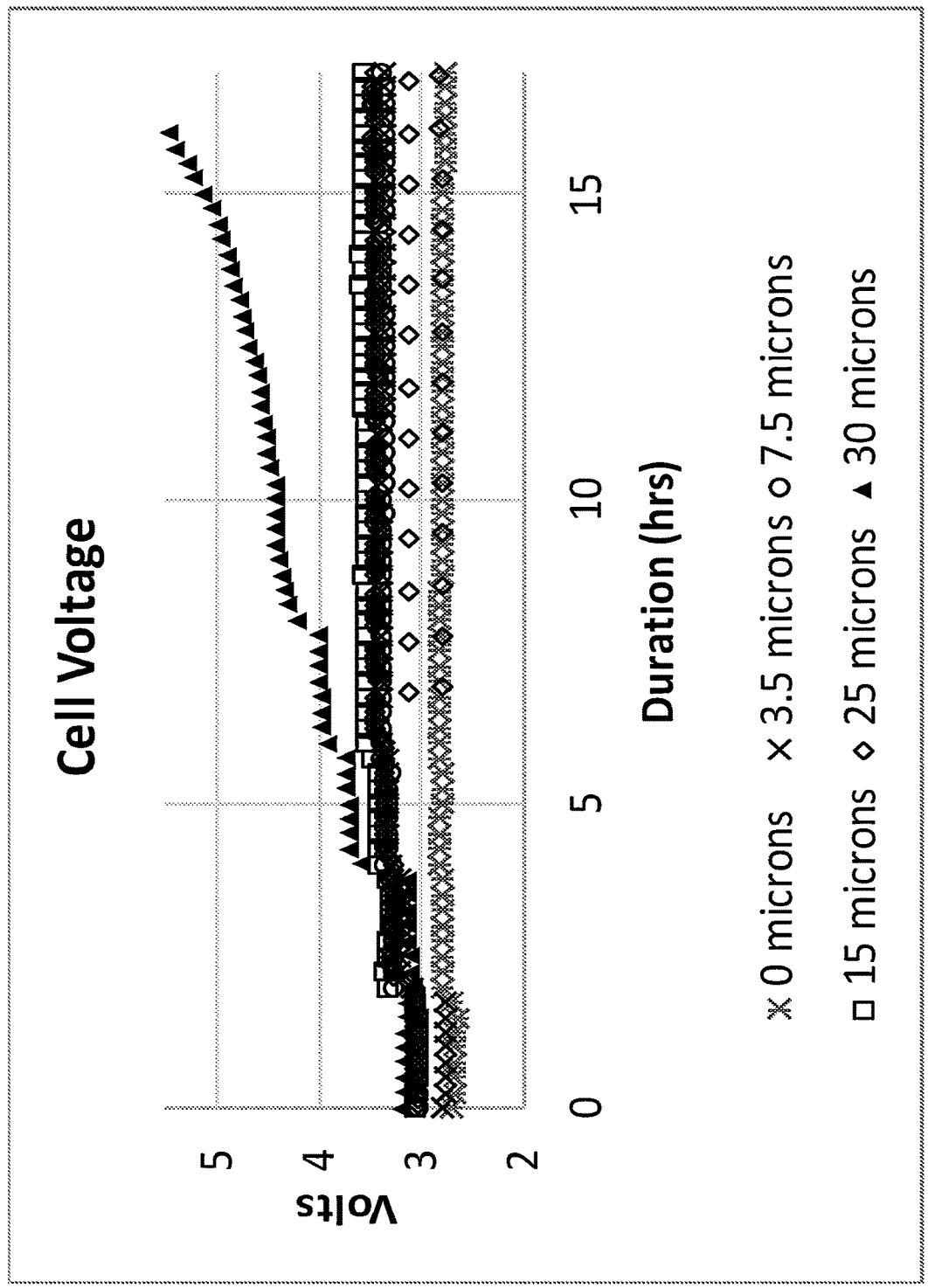
FIG. 13 shows cell voltages for COx electrolyzers having bipolar MEAs with different thicknesses of AEM.

FIG. 12 shows Faraday efficiency for COx electrolyzers having bipolar MEAs with different thicknesses of AEM. Nafion 115 (127 micron) was used for the PEM. Also shown are results for an MEA with no AEM. FIG. 13 shows cell voltages.

The electrolyzers were ramped to a high current density of 300 mA/cm². Faraday efficiency is the efficiency with which charge is transferred in a system facilitating an electrochemical reaction. Notably, the 0 microns (no AEM) has a Faraday efficiency near 0 and the MEA with the 3.5 micron AEM has a Faraday efficiency below 80%. This indicates that there is a minimum thickness of AEM for good performance in a bipolar MEA, which in some embodiments, may be 5 microns, or 7 microns. Similar results are expected for other operating conditions and bipolar MEAs.

MEAs with AEMs between 7.5 microns and 25 microns had near 100% Faraday efficiencies over the course of operation. The 30 micron AEM MEA operated with near 100% Faraday efficiency at onset with performance decreasing at around 6 hours. This indicates that there may be delamination occurring. Modifications to the fabrication and/or operating conditions may be made to reduce delamination and achieve performance comparable to the 7.5, 15, and 25 micron AEM MEAs for MEAs having AEMs up to and 50 microns.

In the description above, the terms "micrometers" and "microns" and the abbreviations "μm" and "um" are used interchangeably to mean microns. Unless otherwise noted, ranges in this document (e.g., 10 micrometers to 20 micrometers, 0.25-127, between 1 and 90%, etc.) include the endpoints of those ranges.

The invention claimed is:

1. A membrane electrode assembly comprising:
   a cathode catalyst layer;
   an anode catalyst layer; and
   a bipolar membrane disposed between the cathode catalyst layer and the anode catalyst layer, wherein the bipolar membrane comprises an anion-conducting polymer layer, a cation-conducting polymer layer, and a bipolar interface between the anion-conducting polymer layer and the cation-conducting polymer layer, wherein the cation-conducting polymer layer is disposed between the anode catalyst layer and the anion-conducting polymer layer, wherein the bipolar interface comprises covalent crosslinking of the cation-conducting polymer layer and anion-conducting polymer layer and wherein the covalent crosslinking comprises a material comprising a structure of one of formulas (I)-(V):

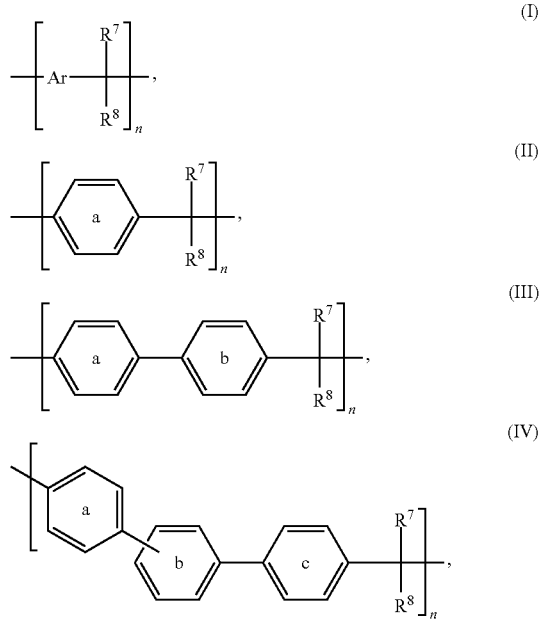

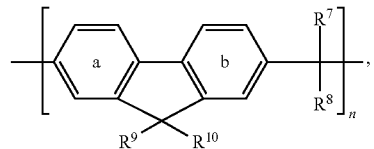

or a salt thereof,
wherein:
   each of $R^7$, $R^8$, $R^9$, and $R^{10}$ is, independently, an electron-withdrawing moiety, H, optionally substituted aliphatic, alkyl, heteroaliphatic, heteroalkylene, aromatic, aryl, or arylalkylene, wherein at least one of $R^7$ or $R^8$ can include the electron-withdrawing moiety or wherein a combination of $R^7$ and $R^8$ or $R^9$ and $R^{10}$ can be taken together to form an optionally substituted cyclic group;
   Ar comprises or is an optionally substituted aromatic or arylene;
   each of n is, independently, an integer of 1 or more;
   each of rings a-c can be optionally substituted; and
   rings a-c, $R^7$, $R^8$, $R^9$, and $R^{10}$ can optionally comprise an ionizable or ionic moiety, and
   wherein $R^7$ or $R^8$ comprises the electron-withdrawing moiety selected from the group consisting of an optionally substituted haloalkyl, cyano, phosphate, sulfate, sulfonic acid, sulfonyl, difluoroboranyl, borono, thiocyanato, and piperidinium.

2. The membrane electrode assembly of claim 1, wherein the covalent crosslinking comprises a material comprising one or more ionizable or ionic moieties selected from the group consisting of -$L^A$-$X^A$, -$L^A$-$(L^{A'}$-$X^A)_{L2}$, -$L^A$-$(X^A$-$L^{A'}$-$X^{A'})_{L2}$, and -$L^A$-$X^A$-$L^{A'}$-$X^{A'}$-$L^{A''}$-$X^{A''}$; wherein:
   each $L^A$, $L^{A'}$, and $L^{A''}$ is, independently, a linking moiety;
   each $X^A$, $X^{A'}$, and $X^{A''}$ comprises, independently, an acidic moiety, a basic moiety, a multi-ionic moiety, a cationic moiety, or an anionic moiety; and
   L2 is an integer of 1 or more.

3. The membrane electrode assembly of claim 2, wherein each $X^A$, $X^{A'}$, and $X^{A''}$ comprises, independently, carboxy, carboxylate anion, guanidinium cation, sulfo, sulfonate anion, sulfonium cation, sulfate, sulfate anion, phosphono, phosphonate anion, phosphate, phosphate anion, phosphonium cation, phosphazenium cation, amino, ammonium cation, heterocyclic cation, or a salt form thereof.

4. The membrane electrode assembly of claim 1, wherein the covalent crosslinking comprises a material comprising a structure of one of the following formulas:

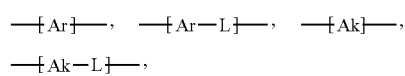

or a salt thereof, wherein:
   Ar is or comprises an optionally substituted arylene or aromatic;
   Ak is or comprises an optionally substituted alkylene, haloalkylene, aliphatic, heteroalkylene, or heteroaliphatic; and
   L is a linking moiety, and
   wherein one or Ar, Ak, and/or L is optionally substituted with one or more ionizable or ionic moieties.

5. The membrane electrode assembly of claim 4, wherein the linking moiety comprises a covalent bond, spirocyclic bond, —O—, —NR$^{N1}$—, —C(O)—, —C(O)O—, —OC(O)—, —SO$_2$—, optionally substituted aliphatic, alkylene, alkyleneoxy, haloalkylene, hydroxyalkylene, heteroaliphatic, heteroalkylene, aromatic, arylene, aryleneoxy, heteroaromatic, heterocycle, or heterocyclyldiyl.

6. The membrane electrode assembly of claim 1, wherein the cathode catalyst layer comprises a catalyst configured to reduce $CO_2$.

7. The membrane electrode assembly of claim 1, wherein the cathode catalyst layer comprises a combination of metal catalyst materials.

8. The membrane electrode assembly of claim 7, wherein the metal catalyst materials comprise a transition metal.

9. The membrane electrode assembly of claim 1, wherein the cathode catalyst layer comprises metal catalyst particles supported on a conductive substrate.

10. The membrane electrode assembly of claim 1, wherein the bipolar interface is characterized by interpenetration of the anion-conducting polymer layer and the cation-conducting polymer layer and wherein the bipolar interface comprises: (a) protrusions having a dimension of between 10 μm-1 mm in a plane parallel to the anion-conducting polymer layer (the in-plane dimension); and/or (b) protrusions each having a thickness of between 10% to 75% of the total thickness of the anion-conducting polymer layer.

11. The membrane electrode assembly of claim 1, wherein the bipolar interface is characterized by interpenetration of the anion-conducting polymer layer and the cation-conducting polymer layer and wherein the bipolar interface comprises: (a) a gradient of the anion-conducting polymer and/or the cation-conducting polymer; and/or (b) a mixture of the anion-conducting polymer and/or the cation-conducting polymer.

12. A membrane electrode assembly comprising:
a cathode catalyst layer;
an anode catalyst layer; and
a bipolar membrane disposed between the cathode catalyst layer and the anode catalyst layer, wherein the bipolar membrane comprises an anion-conducting polymer layer, a cation-conducting polymer layer, and a bipolar interface between the anion-conducting polymer layer and the cation-conducting polymer layer, wherein the cation-conducting polymer layer is disposed between the anode catalyst layer and the anion-conducting polymer layer, wherein the bipolar interface comprises covalent crosslinking of the cation-conducting polymer layer and anion-conducting polymer layer and wherein the covalent crosslinking comprises a crosslinker comprising a structure of one of the following formulas:

$$\text{Ak}\!-\!\!\left[\text{X}'\right]_{\overline{L3}}, \quad \text{Ar}\!-\!\!\left[\text{X}'\right]_{\overline{L3}}, \quad \text{or}$$

$$\text{Ar}\!-\!\!\left[\text{L}\!-\!\text{X}'\right]_{\overline{L3}},$$

wherein:
Ak is an optionally substituted aliphatic or an optionally substituted alkylene;
Ar is an optionally substituted aromatic or an optionally substituted arylene;
L is a linking moiety;
L3 is an integer that is 2 or more; and
X' is absent, —O—, —NR$^{N1}$—, —C(O)—, or -Ak-, in which R$^{N1}$ is H or optionally substituted alkyl, and Ak is optionally substituted alkylene, optionally substituted heteroalkylene, optionally substituted aliphatic, or optionally substituted heteroaliphatic, wherein the covalent crosslinking comprises a material comprising one or more ionizable or ionic moieties selected from the group consisting of -L$^A$-X$^A$, -L$^A$-(L$^{A'}$-X$^A$)$_{L2}$, -L$^A$-(X$^A$-L$^{A'}$-X$^{A'}$)$_{L2}$, and -L$^A$-X$^A$-L$^{A'}$-X$^{A'}$-L$^{A''}$-X$^{A''}$; wherein:
each L$^A$, L$^{A'}$, and L$^{A''}$ is, independently, a linking moiety;
each X$^A$, X$^{A'}$, and X$^{A''}$ comprises, independently, an acidic moiety, a basic moiety, a multi-ionic moiety, a cationic moiety, or an anionic moiety; and
L2 is an integer of 1 or more.

13. The membrane electrode assembly of claim 12, wherein each X$^A$, X$^{A'}$, and X$^{A''}$ comprises, independently, carboxy, carboxylate anion, guanidinium cation, sulfo, sulfonate anion, sulfonium cation, sulfate, sulfate anion, phosphono, phosphonate anion, phosphate, phosphate anion, phosphonium cation, phosphazenium cation, amino, ammonium cation, heterocyclic cation, or a salt form thereof.

14. The membrane electrode assembly of claim 12, wherein the linking moiety comprises a covalent bond, spirocyclic bond, —O—, —NR$^{N1}$—, —C(O)—, —C(O)O—, —OC(O)—, —SO$_2$—, optionally substituted aliphatic, alkylene, alkyleneoxy, haloalkylene, hydroxyalkylene, heteroaliphatic, heteroalkylene, aromatic, arylene, aryleneoxy, heteroaromatic, heterocycle, or heterocyclyldiyl.

15. The membrane electrode assembly of claim 12, wherein the cathode catalyst layer comprises a catalyst configured to reduce $CO_2$.

16. The membrane electrode assembly of claim 12, wherein the cathode catalyst layer comprises a combination of metal catalyst materials.

17. The membrane electrode assembly of claim 16, wherein the metal catalyst materials comprise a transition metal.

18. The membrane electrode assembly of claim 12, wherein the cathode catalyst layer comprises metal catalyst particles supported on a conductive substrate.

19. The membrane electrode assembly of claim 12, wherein the bipolar interface is characterized by interpenetration of the anion-conducting polymer layer and the cation-conducting polymer layer and wherein the bipolar interface comprises: (a) protrusions having a dimension of between 10 μm-1 mm in a plane parallel to the anion-conducting polymer layer (the in-plane dimension); and/or (b) protrusions each having a thickness of between 10% to 75% of the total thickness of the anion-conducting polymer layer.

20. The membrane electrode assembly of claim 12, wherein the bipolar interface is characterized by interpenetration of the anion-conducting polymer layer and the cation-conducting polymer layer and wherein the bipolar interface comprises: (a) a gradient of the anion-conducting polymer and/or the cation-conducting polymer; and/or (b) a mixture of the anion-conducting polymer and/or the cation-conducting polymer.

* * * * *